(12) United States Patent
Suchowski et al.

(10) Patent No.: US 11,513,314 B2
(45) Date of Patent: Nov. 29, 2022

(54) 3D MODULAR OPTICS FOR 3D OPTICAL ALIGNMENTS

(71) Applicant: RAMOT AT TEL-AVIV UNIVERSITY LTD., Tel-Aviv (IL)

(72) Inventors: Haim Suchowski, Kfar Mordechai (IL); Assaf Levanon, Mazkeret Batia (IL)

(73) Assignee: RAMOT AT TEL-AVIV UNIVERSITY LTD., Tel-Aviv (IL)

( * ) Notice: Subject to any disclaimer, the term of this patent is extended or adjusted under 35 U.S.C. 154(b) by 321 days.

(21) Appl. No.: 16/464,714

(22) PCT Filed: Nov. 29, 2017

(86) PCT No.: PCT/IB2017/057498
§ 371 (c)(1),
(2) Date: May 29, 2019

(87) PCT Pub. No.: WO2018/100508
PCT Pub. Date: Jun. 7, 2018

(65) Prior Publication Data
US 2019/0310441 A1    Oct. 10, 2019

(51) Int. Cl.
*G02B 7/18* (2021.01)
*G02B 7/00* (2021.01)
*G01M 11/04* (2006.01)

(52) U.S. Cl.
CPC ........... *G02B 7/1805* (2013.01); *G01M 11/04* (2013.01); *G02B 7/00* (2013.01); *G02B 7/003* (2013.01); *G02B 7/006* (2013.01)

(58) Field of Classification Search
None
See application file for complete search history.

(56) References Cited

U.S. PATENT DOCUMENTS 3,005,282 A    10/1961    Christiansen
4,919,635 A    4/1990    Bertrand
(Continued)

OTHER PUBLICATIONS

International Search Report PCT/IB2017/057498 Completed Mar. 25, 2018; dated Mar. 26, 2018 4 pages.
(Continued)

*Primary Examiner* — Jennifer D. Carruth
(74) *Attorney, Agent, or Firm* — The Roy Gross Law Firm, LLC; Roy Gross

(57) ABSTRACT

An optical setup, comprising one or more platforms having a plurality of fixation locations repeatedly arranged, and defining a discrete position coordinate system; and a plurality of modular optical units, each comprising an optical portion defining an optical axis fixedly attached to at least one mounting surface comprising complementary geometry to the fixation locations; wherein a releasable attachment of the plurality of modular optical units at the fixation locations defines a plurality of optical axes at least a portion of the optical axes overlapping across the discrete position coordinate system In some embodiments, the modular optical units include standard optical elements In some embodiments, the platform includes an attachment interface to an optical table and/or another platform In some embodiments, laser pulses are synchronized by fixing a discrete path length over the fixation locations In some embodiments the fixation locations are located on multiple planes in 3D space.

17 Claims, 46 Drawing Sheets

(56) References Cited

U.S. PATENT DOCUMENTS

| | | | |
|---|---|---|---|
| 5,148,235 A | | 9/1992 | Tank et al. |
| 5,153,675 A | * | 10/1992 | Beauchaine ............ G01J 3/453 |
| | | | 250/339.08 |
| 5,825,558 A | | 10/1998 | Farmiga et al. |
| 5,828,502 A | | 10/1998 | Afshari |
| 5,993,283 A | | 11/1999 | Cyrus et al. |
| 6,163,417 A | * | 12/2000 | Nunnally ............... G01M 11/04 |
| | | | 359/811 |
| 8,049,881 B2 | | 11/2011 | Myrick et al. |
| 8,091,303 B2 | | 1/2012 | Losonczi |
| 8,172,412 B2 | | 5/2012 | Solyar et al. |
| 8,201,370 B1 | | 6/2012 | Goodwin |
| 8,401,236 B2 | | 3/2013 | Kassouf et al. |
| 9,689,809 B2 | * | 6/2017 | Buchwald ................ B65B 3/04 |
| 2002/0021446 A1 | | 2/2002 | Lund et al. |
| 2004/0165285 A1 | | 8/2004 | Galpin |
| 2004/0204909 A1 | | 10/2004 | Abitan et al. |
| 2005/0034413 A1 | | 2/2005 | Weber |
| 2007/0035856 A1 | | 2/2007 | Galpin et al. |
| 2016/0003307 A1 | | 1/2016 | Grumer et al. |

OTHER PUBLICATIONS

Written Opinion of the International Searching Authority PCT/IB2017/057498 dated Mar. 26, 2018 5 pages.
Quercioli F et al.; "Optomechanics with Lego"; Applied Optics, Optical Society of America, Washington, DC, US, vol. 37, No. 16, Jun. 1, 1998, pp. 3408-3416, 9 pages.

* cited by examiner

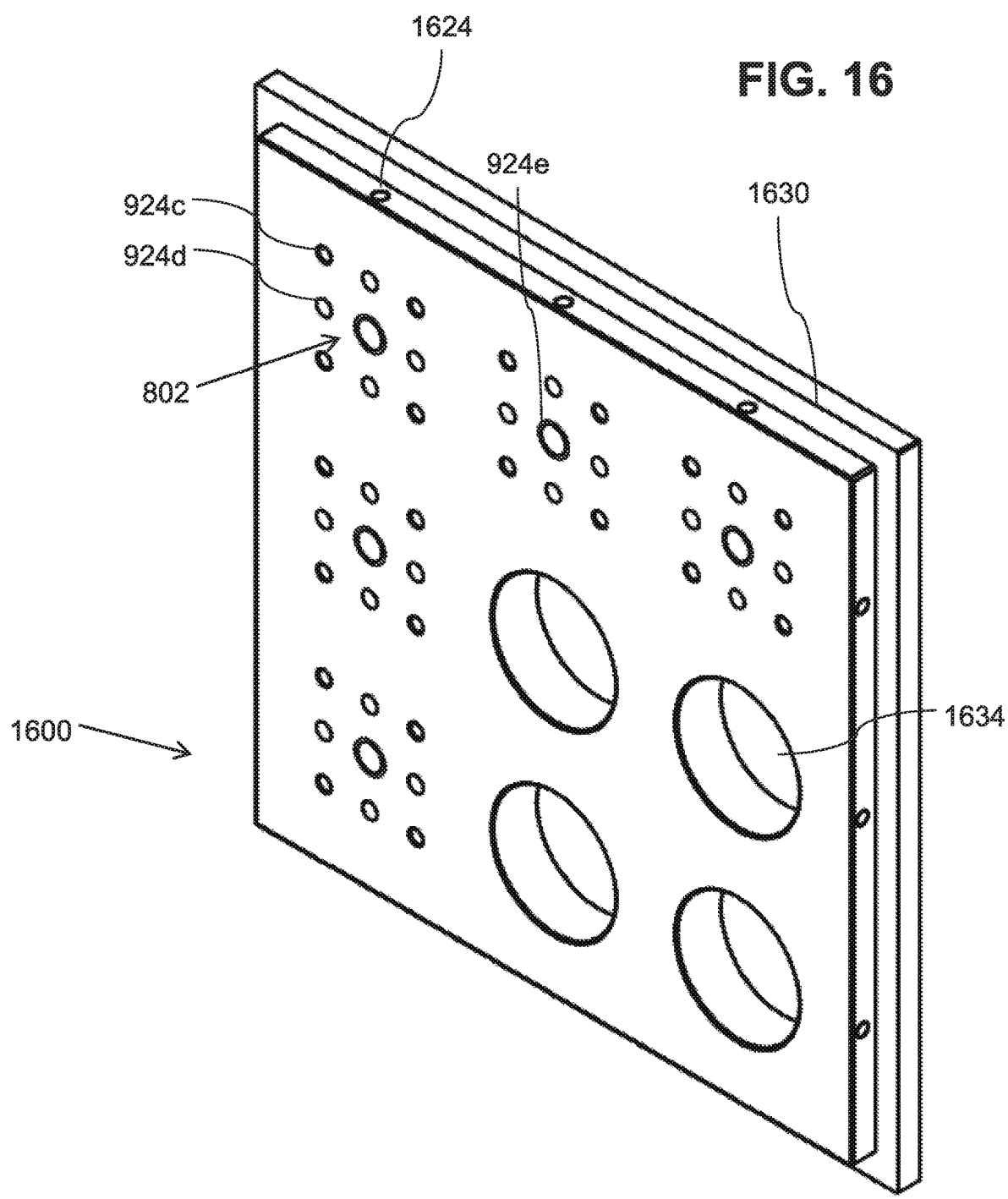

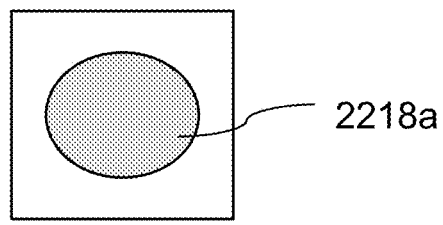
FIG. 22A — 2218a
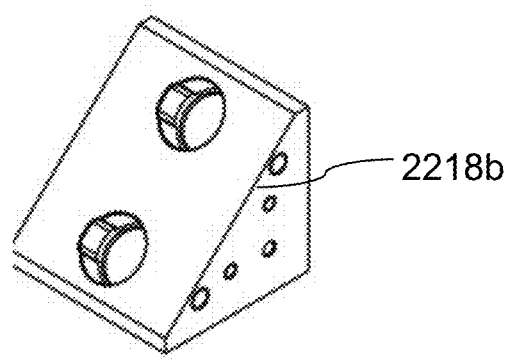
FIG. 22B — 2218b

2546

2548

2550

2552

2654

2648

2650

3D MODULAR OPTICS FOR 3D OPTICAL ALIGNMENTS

RELATED APPLICATIONS

This application is a National Phase of PCT Patent Application No. PCT/IB2017/057498 having International filing date of Nov. 29, 2017, which claims the benefit of priority of under U.S. Provisional Application No. 62/427,194 filed 29 Nov. 2016 and U.S. Provisional Patent Application No. 62/563,757 filed Sep. 27, 2017. The contents of the above applications are all incorporated by reference as if fully set forth herein in their entirety.

FIELD AND BACKGROUND OF THE INVENTION

The present invention, in some embodiments thereof, relates to an optical setup and, more particularly, but not exclusively, to a modular three-dimensional optical setup.

U.S. Pat. No. 5,825,558 discloses a three-dimensional Universal Mounting Component (UMC) system of UMC blocks provides general mounting for use in optical research in constructing layouts for experiments and breadboard-type prototypes. In such optical layouts laser beams or other light beams are directed about complex paths, often on several planes or levels. Use of the invention overcomes the problem of creating three-dimensional optical layouts with less standardized, and much more expensive, mounting adapters and posts. An economical, standardized set of UMC blocks, each with a number of holes in grid configurations, enables users to construct custom three-dimensional optical layouts.

U.S. Published Patent Application 2016/0033075 appears to disclose "kits for constructing an apparatus" . . . "which, in some embodiments, can demonstrate desirable modularity, adjustability, and reconfigurability. A kit for constructing an apparatus described herein comprises a plurality of modular blocks and fastening sleeves, sleeve pins and coupling pins for connecting the modular blocks to one another. A modular block comprises a series of first apertures for receiving one or more of the fastening sleeves and series of second apertures for receiving the sleeve pins to secure the fastening sleeves in the first apertures, wherein the second apertures intersect the first apertures."

U.S. Pat. No. 5,993,283 appears to disclose "A modular building for a toy building set includes a planar member, or foundation, having raised ribs on its top and a wall member having a wall portion and a base portion. The wall portion of the wall member is substantially orthogonal to the base portion of the wall member. The base portion of the wall member has a cleft therein sized to receive one of the ribs of the foundation to removably attach the wall member to the foundations. A substantially planar coupler connects at least two or more of the foundation. The coupler has at least two clefts therein. The clefts are sized to receive the ribs on each of the two foundations for removable attachment of the foundation to the coupler.

Additional background art which might be related includes Lazer Maze™ available from ThinkFun Inc. 1321 Cameron Street, Alexandria, Va. 22314 USA www(dot)thinkfun(dot)com/products/laser-maze/, U.S. Pat. Nos. 3,005,282, 4,919,635, 8,091,303, U.S. Patent Application No. US2005/0034413, U.S. Pat. Nos. 8,049,881, 8,201,370 and 8,401,236.

SUMMARY OF THE INVENTION

According to an aspect of some embodiments of the invention, there is provided a 3D optical setup, including: at least one base connected at an angle to at least one wall, each of the at least one base and at least one wall having a plurality of fixation locations repeatedly arranged, thereby defining a discrete 3D position coordinate system; a plurality of modular optical units, each including an optical portion defining an optical axis, the optical portion fixedly attached to at least one mounting surface including complementary geometry to the fixation locations; wherein a releasable attachment of some of the plurality of modular optical units at the fixation locations of the at least one base defines a first set of optical axes and a releasable attachment of some of the plurality of modular optical units at the fixation locations of the at least one wall defines a second set of optical axes; and wherein at least a portion of the first set of optical axes and at least a portion of the second set of optical axes overlap across the discrete 3D position coordinate system.

According to some embodiments of the invention, the base and the wall are fixedly connected.

According to some embodiments of the invention, the base and the wall are releasably connected.

According to some embodiments of the invention, the optical portion is at an angle to the mounting surface.

According to some embodiments of the invention, each of the at least one wall and at least one base comprise a first edge having complementary fitting with a second edge.

According to some embodiments of the invention, the complementary fitting includes at least one complementary threaded cavity in each of the first edge and the second edge.

According to some embodiments of the invention, the complementary fitting includes complementary interference fitting members.

According to some embodiments of the invention, the angle is 90 degrees.

According to some embodiments of the invention, the angle is between 45 to 90 degrees.

According to some embodiments of the invention, the angle is between 0 to 45 degrees.

According to some embodiments of the invention, the angle is between 90 to 135 degrees.

According to some embodiments of the invention, the angle is between 135 to 180 degrees.

According to some embodiments of the invention, the fixation locations comprise a plurality of fixation points.

According to some embodiments of the invention, the plurality of fixation points are radially symmetric.

According to some embodiments of the invention, the plurality of fixation points are axially symmetric.

According to some embodiments of the invention, the complementary surface of the modular optical units comprise a quadrangular shape.

According to some embodiments of the invention, the complementary surface of the modular optical units comprise a triangular shape.

According to some embodiments of the invention, the complementary surface of the modular optical units comprise a trapezoid shape.

According to some embodiments of the invention, the modular optical units comprise a cuboid shape.

According to some embodiments of the invention, at least one of the modular optical units comprises a prism shape.

According to some embodiments of the invention, the at least one unit includes a triangular face.

According to some embodiments of the invention, at least one face of the at least one unit is directed at 45 degrees to at least one the mounting surface of the at least one unit.

According to some embodiments of the invention, the at least one unit includes the at least one mounting surface and at least another mounting surface and wherein the at least one face is perpendicular to the at least another other mounting surface.

According to some embodiments of the invention, the optical portion of the at least one unit is mounted on the at least one face.

According to some embodiments of the invention, the complementary geometry connects with the fixation locations in at least one of a male-female connection, a male-male connection, a female-female connection, complementary screw holes, complementary holes for pins and a magnet.

According to some embodiments of the invention, the complementary surface fits across a plurality of the fixation locations.

According to some embodiments of the invention, the complementary surface fits across a portion of the fixation locations.

According to some embodiments of the invention, the setup further includes at least one ceiling, connected at a second angle to the at least one wall.

According to some embodiments of the invention, the setup further includes at least one translocator operably connected to the at least one base.

According to some embodiments of the invention, the attachment centers the optical element with respect to the fixation location.

According to some embodiments of the invention, the base is configured for connection to an optical table with a regular pattern of the plurality of fixation locations of the base coinciding with attachment locations of the optical table.

According to some embodiments of the invention, the optical set up includes 1" optical elements are 1" and a distance between fixation locations that is an integral multiple of 0.375".

According to some embodiments of the invention, the optical set up includes 1" optical elements are 1" and a distance between fixation locations that is an integral multiple of 0.333".

According to some embodiments of the invention, the optical set up includes 0.5" optical elements and a distance between fixation locations that is an integral multiple of 0.125".

According to some embodiments of the invention, the optical set up includes 2" optical elements and a distance between fixation locations that is an integral multiple of 0.125".

According to some embodiments of the invention, the optical set up includes 25 mm optical elements and the distance between fixation locations that are an integral multiple of 9.875 mm.

According to some embodiments of the invention, the optical set up includes 12.5 mm optical elements and the distance between fixation locations that are multiples of one of 37.5 mm, 18.75 mm and 9.875 mm.

According to some embodiments of the invention, a modular optical unit of the plurality of modular optical units includes a mount for a standard optical element.

According to some embodiments of the invention, a synchronization light between a first path and a second path is preserved when the first path and the second path traverse an equal number of the fixation locations.

According to an aspect of some embodiments of the invention, there is provided a method for generating a 3D optical axis defined by a plurality of modular optical units, each modular optical unit defining an optical line, including: connecting at an angle at least one wall to at least one base, each of the wall and the base having a plurality of fixation locations repeatedly arranged; releasably connecting a first set of the plurality of modular optical units at the fixation locations of the at least one base, defining a first set of optical axes; and releasably connecting a second set of the plurality of modular optical units at the fixation locations of the at least one wall, defining a second set of optical axes, thereby aligning at least a portion of the first set of optical axes and at least a portion of the second set of optical axes, generating a 3D optical axis.

According to some embodiments of the invention, the connecting at an angle at least one wall to at least one base includes fixedly connecting.

According to some embodiments of the invention, the connecting at an angle at least one wall to at least one base includes releasably connecting.

According to some embodiments of the invention, the method further includes connecting a plurality of the bases with a plurality of the walls.

According to some embodiments of the invention, the method further includes connecting at least one ceiling.

According to an aspect of some embodiments of the invention, there is provided a system of optical units including: a platform including a plurality of fixation locations, each fixation location having a respective connector an attachment interface for attachment to an optical table at a fixed location and direction; a modular optical unit including an optical element having an optical axis and a complementary connector for attachment to any respective connector on to retain the optical axis in one of a number of discrete directions and wherein for an element located at a first position of the plurality of fixation positions with a first optical axis directed in one of the number of discrete directions, the first optical axis overlaps a second optical axis of a second element at a second location of the fixation locations directed in a second direction for predetermined pairs of the second location and second direction.

According to some embodiments of the invention, the first location is on a first platform attached to the optical table at a first position and the second location is on a second platform connected to the optical table at a second position.

According to some embodiments of the invention, the first platform is does not contact the second platform.

According to some embodiments of the invention, for each of the predetermined pairs, a discrete path length from the first location to the second location is predetermined.

According to some embodiments of the invention, the first location and the second location fall on a grid and wherein the discrete path length is determined by a relative difference in coordinates on the grid between the first location and the second location.

According to an aspect of some embodiments of the invention, there is provided a system of optical units including: a first platform including 1st plurality of fixation locations, each fixation location having a connector a second platform including a 2nd plurality of fixation locations, each fixation location having a connector an attachment interface for attachment of the 1st platform to the 2nd platform with the 1st plurality of fixation locations aligned to the 2nd plurality of fixation locations; a plurality of modular optical units including an optical element and a complementary connector for attachment to the connector on the fixation location to retain the optical element in one of a discrete number of locations and/or directions on the platform.

According to some embodiments of the invention, the attachment between the modular optical units and the platform is reversible.

According to some embodiments of the invention, the attachment centers the optical element with respect to the fixation location.

According to some embodiments of the invention, the first platform is configured for connection to an optical table with a regular pattern of the fixation locations coinciding with attachment locations of the optical table.

According to some embodiments of the invention, including 1" optical elements are 1" and a distance between fixation locations that is a multiple an integral multiple of 0.375".

According to some embodiments of the invention, the optical set up includes 1" optical elements are 1" and a distance between fixation locations that is an integral multiple of 0.333".

According to some embodiments of the invention, the system includes the 0.5" optical elements and a distance between fixation locations that is an integral multiple of 0.125".

According to some embodiments of the invention, the system includes 2" optical elements and a distance between fixation locations that is an integral multiple of 0.125".

According to some embodiments of the invention, the system includes 25 mm optical elements and the distance between fixation locations that are multiples of one of 18.75 mm, 12.5 mm and 9.875 mm.

According to some embodiments of the invention, the system includes 12.5 mm optical elements and the distance between fixation locations that are multiples of one of 37.5 mm, 18.75 mm and 9.875 mm.

According to some embodiments of the invention, a modular optical units plurality of modular optical units includes a mount for a standard optical element.

According to some embodiments of the invention, a synchronization of light between a first path and a second path is preserved when the first path and the second path traverse an equal number of the fixation locations.

According to an aspect of some embodiments of the invention, there is provided an optical setup, including: A first platform and a second platform, each of the first platforms and the second platform having a plurality of fixation locations, to form repeatedly arranged, thereby defining a discrete position coordinate system; a plurality of modular optical units, each including an optical portion defining an optical axis, the optical portion fixedly attached to at least one mounting surface including complementary geometry to the fixation locations; wherein a releasable attachment of a first subset of the plurality of modular optical units at the fixation locations of the first platform defines a first set of optical axes; wherein a releasable attachment of a second subset of the plurality of modular optical units at the fixation locations of the second platform defines a second set of optical axes; and a single repeated arrangement of including the fixation locations of the first platform and the second platform and wherein at least a portion of the a first set of optical axes and at least a portion of the second set of optical axes overlap across the discrete position coordinate system.

According to some embodiments of the invention, each modular optical unit can be moved from a first the fixation location to a second the fixation location while preserving a relative geometry of the plurality of fixation locations.

According to some embodiments of the invention, each modular optical unit can be moved from a first the fixation location to a second the fixation location while preserving a relative geometry of each other of the plurality of modular optical units.

According to some embodiments of the invention, the first platform is reversibly attached to second platform.

According to some embodiments of the invention, the first platform and the second platform are reversibly attached to an optical table.

According to some embodiments of the invention, the attachment centers the optical element with respect to the fixation location.

According to some embodiments of the invention, the first platform is configured for connection to an optical table with a regular pattern of the fixation locations coinciding with attachment locations of the optical table.

According to some embodiments of the invention, the optical set up includes 1" optical elements are 1" and a distance between fixation locations that is an integral multiple of 0.375".

According to some embodiments of the invention, the optical set up includes 1" optical elements are 1" and a distance between fixation locations that is an integral multiple of 0.333".

According to some embodiments of the invention, the optical set up includes the 0.5" optical elements and a distance between fixation locations that is an integral multiple of 0.125".

According to some embodiments of the invention, the optical set up includes 2" optical elements and a distance between fixation locations that is an integral multiple of 0.125".

According to some embodiments of the invention, the optical set up includes 25 mm optical elements and the distance between fixation locations that are multiples of one of 18.75 mm, 12.5 mm and 9.875 mm.

According to some embodiments of the invention, the optical set up includes 12.5 mm optical elements and the distance between fixation locations that are multiples of one of 37.5 mm, 18.75 mm and 9.875 mm.

According to some embodiments of the invention, a modular optical unit of the plurality of modular optical units includes a mount for a standard optical element.

According to some embodiments of the invention, a synchronization light between a first path and a second path is preserved when the first path and the second path traverse an equal number of the fixation locations.

According to an aspect of some embodiments of the invention, there is provided a system of optical units including: a platform including a plurality of fixation locations, each fixation location having a respective connector a plurality of optical units each optical unit including an optical portion defining an optical axis, a complementary connector for attachment to any respective connector on to retain the optical axis in one of a number of discrete directions and wherein for an element located at a first position of the plurality of fixation positions with a first optical axis directed in one of the number of discrete directions, the first optical axis overlaps a second optical axis of a second element at a second location of the fixation locations directed in a second direction for predetermined pairs of the second location and second direction, and wherein at least one of the plurality of optical units including a mount for a standard optical element.

According to some embodiments of the invention, the first location is on a first platform attached to an optical table at a first position and the second location is on a second platform connected to the optical table at a second position.

According to some embodiments of the invention, the first platform does not contact the second platform.

According to some embodiments of the invention, for each of the predetermined pairs, a discrete path length from the first location to the second location is predetermined.

According to some embodiments of the invention, the first location and the second location fall on a grid and wherein the discrete path length is determined by a relative difference in coordinates on the grid between the first location and the second location.

According to some embodiments of the invention, the attachment between each of the plurality of optical units and the platform is reversible.

According to some embodiments of the invention, the attachment centers the optical element with respect to the fixation location.

According to some embodiments of the invention, the platform is configured for connection to an optical table with a regular pattern of the fixation locations coinciding with attachment locations of the optical table.

According to some embodiments of the invention, the standard optical element includes a 1" optical element and a distance between the fixation locations is an integral multiple of 0.375".

According to some embodiments of the invention, the optical set up includes 1" optical elements are 1" and a distance between fixation locations that is an integral multiple of 0.333".

According to some embodiments of the invention, the standard optical element includes a 0.5" optical element and a distance between the fixation locations is an integral multiple of 0.125".

According to some embodiments of the invention, the standard optical element includes a 2" optical element and a distance between the fixation locations is an integral multiple of 0.125".

According to some embodiments of the invention, the standard optical element includes a 12.5 mm optical element and a distance between the fixation locations is an integral multiple of 9.875 mm.

According to some embodiments of the invention, the standard optical element includes a 25 mm optical element and a distance between the fixation locations is a multiple of at least one of 37.5 mm, 18.75 mm and 9.875 mm.

According to some embodiments of the invention, a synchronization of light between a first path and a second path is preserved when the first path and the second path traverse an equal number of the fixation locations.

According to some embodiments of the invention, the at least one optical unit can be moved from a first the fixation location to a second the fixation location while preserving a relative geometry of the plurality of fixation locations.

According to some embodiments of the invention, each at least one optical unit can be moved from a first the fixation location to a second the fixation location while preserving a relative geometry of each other of the plurality of optical units.

According to an aspect of some embodiments of the invention, there is provided a method of preserving synchronization of a first light source pulse traveling a first with a second laser pulse traveling a second path including: defining a discrete coordinate system of fixation locations located on a regular grid; releasably attaching a plurality of modular optical units at selected the fixation locations to define a plurality of optical axes wherein at least a portion of the optical axes overlap across the discrete coordinate system to define a first path and a second path; selecting the selected fixation locations to ensure that the first path and the second path traverse an equal number of grid spaces.

According to some embodiments of the invention, the method further includes: centering on a respective fixation location an optical element of each of the plurality of optical units.

According to an aspect of some embodiments of the invention, there is provided a connector for attaching a modular optical unit to a platform including: at least two holes configured to fit a mounting pin; at least one hole configured to fit a tightening element.

According to some embodiments of the invention, the method further includes: a hole for configured for attachment to an optical table.

According to some embodiments of the invention, the hole for configured for attachment to the optical table is centered with respect to the at least two holes configured to fit the mounting pin.

According to an aspect of some embodiments of the invention, there is provided a connector for attaching a modular optical unit to a platform including: at least two mounting pins and at least one tightening element.

According to an aspect of some embodiments of the invention, there is provided a kit for an interferometer including: at least four mounting platforms including at least two bases, at least two walls, each the mounting platform including a plurality of fixation locations repeatedly arranged, thereby defining a discrete position coordinate system; a plurality of modular optical units, including at least four modular mirror units each the mirror unit including an optical portion defining an optical axis, the optical portion fixedly attached to at least one mounting surface including complementary geometry to the fixation locations; and wherein a releasable attachment of the plurality of modular mirror units at the fixation locations defines a first set of optical axes defining the interferometer.

According to some embodiments of the invention, the kit includes an instruction manual for assembling the interferometer.

According to some embodiments of the invention, the instruction manual includes a list of optomechanical parts and optical parts and a list of instruction assembly path.

According to some embodiments of the invention, the kit includes, a light source mounted on an optical table having a share optical axis with the interferometer.

According to some embodiments of the invention, the kit includes, one or more of the device selected from the group consisting of a characterization optical tool, a spectrometer optical apparatus, an imaging apparatus including at least two mounting platform, each the platform having a plurality of fixation locations repeatedly arranged, thereby defining a discrete position coordinate system; the at least two mounting platforms connected with the plurality of fixations on a first of the at least two mounting platforms arranged orthogonally to the plurality of fixations locations on a second of the at least two mounting platforms; a plurality of modular optical units, including at least four modular mirror units each including an optical portion defining an optical axis, the optical portion fixedly attached to at least one mounting surface including complementary geometry to the fixation locations; and wherein a releasable attachment of the plurality of modular mirror units at the fixation locations defines a first set of optical axes; and wherein the device and the interferometer are mounted on an optical chamber to form a compound device.

EXAMPLE 1

A three dimensional (3D) optical setup, comprising at least one base connected at an angle to at least one wall, each of the at least one base and at least one wall having a plurality of fixation locations repeatedly arranged, thereby defining a discrete 3D position coordinate system; a plurality of modular optical units, each comprising an optical portion defining an optical axis, the optical portion fixedly attached to at least one mounting surface comprising complementary geometry to the fixation locations; wherein a releasable attachment of some of the plurality of modular optical units at the fixation locations of the at least one base defines a first set of optical paths and a releasable attachment of some of the plurality of modular optical units at the fixation locations of the at least one wall defines a second set of optical paths; and wherein at least a portion of the first set of optical paths and at least a portion of the second set of optical paths overlap across the discrete 3D position coordinate system.

EXAMPLE 2

The setup of example 1, wherein the base and the wall are fixedly connected.

EXAMPLE 3

The setup of example 1, wherein the base and the wall are releasably connected.

EXAMPLE 4

The setup of any of examples 1-3, wherein the optical portion is at an angle to the mounting surface.

EXAMPLE 5

The setup of any of examples 1-4, wherein each of the at least one wall and at least one base comprise a first edge having complementary fitting with a second edge.

EXAMPLE 6

The setup of example 5, wherein the complementary fitting comprises at least one complementary threaded cavity in each of the first edge and the second edge.

EXAMPLE 7

The setup of example 5, wherein the complementary fitting comprises complementary interference fitting members.

EXAMPLE 8

The setup of any of examples 1-7, wherein the angle is 90 degrees.

EXAMPLE 9

The setup of any of examples 1-8, wherein the fixation locations comprise a plurality of fixation points.

EXAMPLE 10

The setup of example 9, wherein the plurality of fixation points are radially symmetric.

EXAMPLE 11

The setup of example 9, wherein the plurality of fixation points are axially symmetric.

EXAMPLE 12

The setup of any of examples 1-11, wherein the complementary surface of the modular optical units comprise a quadrangular shape.

EXAMPLE 13

The setup of any of examples 1-12, wherein the complementary surface of the modular optical units comprise a triangular shape.

EXAMPLE 14

The setup of any of examples 1-13, wherein the complementary surface of the modular optical units comprise a trapezoid shape.

EXAMPLE 15

The setup of any of examples 1-14, wherein the modular optical units comprise a cuboid shape.

EXAMPLE 16

The setup of any of examples 1-15, wherein the modular optical units comprise a prism shape.

EXAMPLE 17

The setup of any of examples 1-15, wherein the complementary geometry connects with the fixation locations in a male-female connection.

EXAMPLE 18

The setup of any of examples 1-17, wherein the complementary surface fits across a plurality of the fixation locations.

EXAMPLE 19

The setup of any of examples 1-18, wherein the complementary surface fits across a portion of the fixation locations.

EXAMPLE 20

The setup of any of examples 1-19, further comprising at least one ceiling, connected at a second angle to the at least one wall.

EXAMPLE 21

The setup of any of examples 1-20, further comprising at least one translocator operably connected to the at least one base.

EXAMPLE 22

A method for generating a 3D optical path defined by a plurality of modular optical units, each modular optical unit defining an optical line, comprising connecting at an angle at least one wall to at least one base, each of the wall and the base having a plurality of fixation locations repeatedly arranged; releasably connecting a first set of the plurality of modular optical units at the fixation locations of the at least one base, defining a first set of optical paths; and releasably connecting a second set of the plurality of modular optical units at the fixation locations of the at least one wall, defining a second set of optical paths, thereby aligning at least a portion of the first set of optical paths and at least a portion of the second set of optical paths, generating a 3D optical path.

EXAMPLE 23

The method of example 22, wherein the connecting at an angle at least one wall to at least one base comprises fixedly connecting.

EXAMPLE 24

The method of example 22, wherein the connecting at an angle at least one wall to at least one base comprises releasably connecting.

EXAMPLE 25

The method of any of examples 22-24, further comprising connecting a plurality of the bases with a plurality of the walls.

EXAMPLE 26

The method of any of examples 22-25, further comprising connecting at least one ceiling.

According to an aspect of some embodiments of the invention, there is provided a prismatic optical unit including: an angled face; an optical element mounted on the angled face; a first mounting surface at an angle of between 25 to 75 degrees to the angled face; a second mounting surface perpendicular to the angled face.

According to some embodiments of the invention, second mounting surface second mounting surface is triangular.

According to some embodiments of the invention, angled face is directed at 45 degrees to the first mounting surface.

According to some embodiments of the invention, the second mounting surface has a right triangular shape.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 16 is a perspective drawing of a board for mounting modular units in accordance with an embodiment of the current invention;

FIGS. 22A-22B are perspective drawings of fixed mirrors in accordance with embodiments of the current invention;

DESCRIPTION OF SPECIFIC EMBODIMENTS OF THE INVENTION

Figure 1:
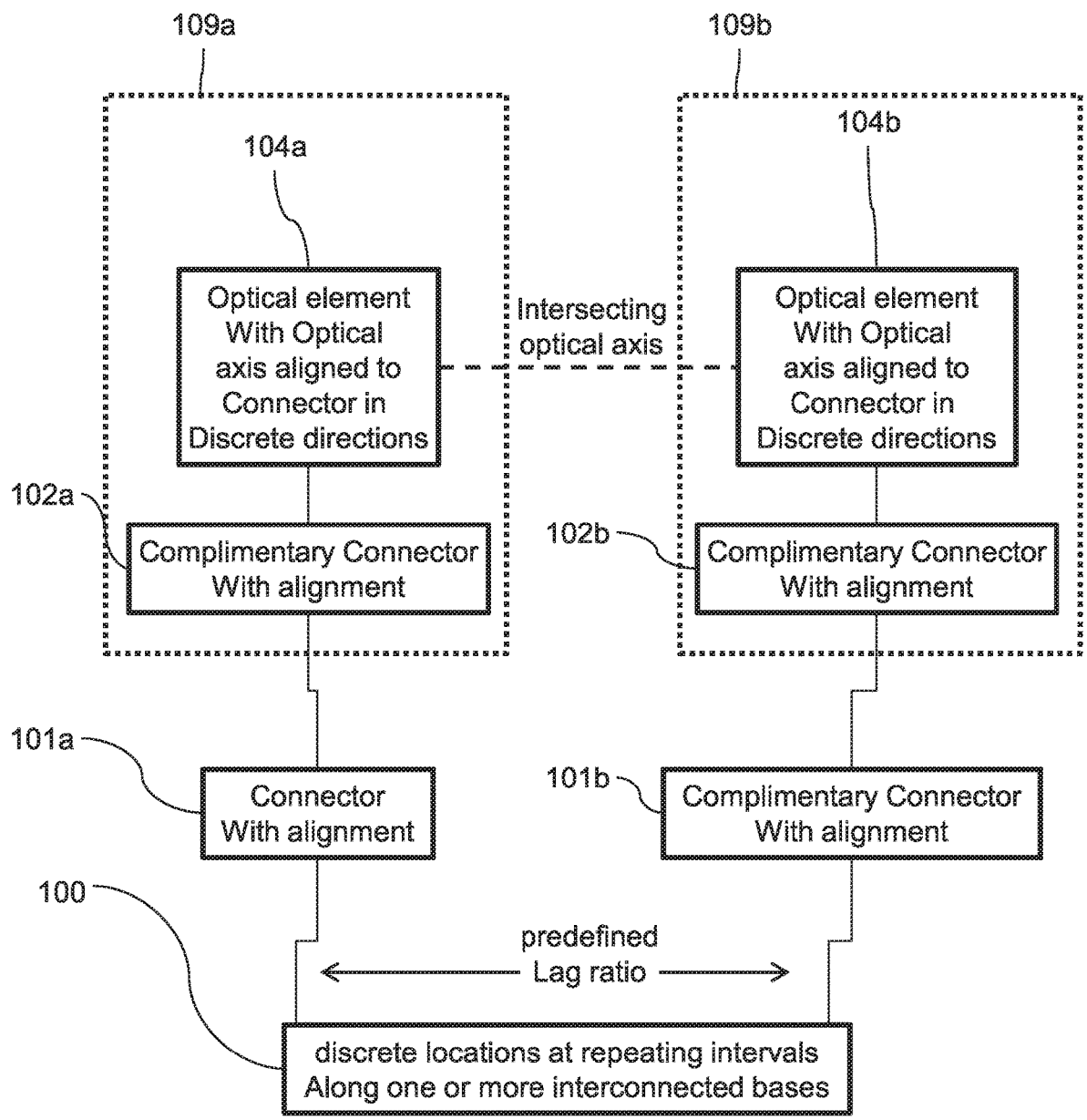
FIG. 1 is a block diagram illustration of a modular optical mounting system in accordance with an embodiment of the current invention.

The present invention, in some embodiments thereof, relates to an optical setup and, more particularly, but not exclusively, to a modular three-dimensional optical setup.

Overview

Several embodiments of the invention relates to a system for generating an optical network. For example, the optical network may include a plurality of optical axes interconnecting a plurality of modular optical units. In some embodiments, the system includes a discrete set of fixation locations and a discrete set of directions. Optionally, interconnecting optical axes are defined by selecting a pair locations and/or directions from the discrete set. For example, a plurality of modular units (e.g. modular optical units) may each have a defined position and optical axis. Optionally, the units are arranged at the selected locations with the optical axes orients in the selected directions to form the network.

An aspect of some embodiments of the current invention relates to an expandable platform that defines a plurality of fixation locations. Optionally, releasable attachment of a modular optical unit at a fixation location defines a discrete set of directions for the optical axis of the unit (for example 4 or less directions and/or 8 or less directions and/or 16 or less directions and/or 32 or less directions and/or 64 or less directions). Optionally, discrete positional coordinates are provided by fixation locations repeatedly arranged over the expandable platform. For example, for a selected direction, an optical axis may intersect fixation locations at a defined discrete vector distance (for example defined as a number of fixation locations in one, two, or three directions).

In some embodiments, the discretization of path length may facilitate synchronizing pulses. For example, two synchronized pulses may be formed (e.g. by splitting a single pulse). Optionally, the two initially synchronized pulses may be sent of two separate paths. In some embodiments, it may be desired to synchronize the two pulses as they leave the separate paths. For example, it may be desired to recombine the pulses and/or compare the pulses. Some embodiments of the present invention facilitate the formation of paths having discrete path lengths. Optionally, using discrete length paths may facilitate synchronization of pulses across multiple paths. For example, using the discrete length feature of some embodiments of the current invention it may make it easier to design two paths having equal lengths (for example each path having the same number of discrete sections). For example, two pulses pass along paths of equal length may retain their original synchronization. For example, the two pulses remain synchronized and/or may reach a sensor together at the end of the paths at the same time. For example the two pulses may simultaneously reach a combiner at the end of the paths and/or be combined.

In some embodiments, the modular optical units are modularly arranged in a 2D arrangement by releasable attachment to fixation locations. For example, fixation locations may be placed along surface to form a grid at fixed distances one from another. For example, fixation locations may be arranged along orthogonal axes. Optionally, lag distances between fixation locations may be equal in one or more directions and/or may vary by integral multiples.

In some embodiments, each discrete position comprises one fixation location. In some embodiments, a single fixation location comprises a plurality of fixation points. For example, a location may include at least two fixation points, or at least three, or at least four, or at least five fixation points. Optionally, the plurality of fixation points is arranged symmetrically across an area of the discrete position. In some embodiments, a symmetric arrangement comprises axis symmetry. Alternatively or additionally, a symmetric arrangement comprises rotational symmetry. Optionally, a unit attached to a fixation location may be oriented in one of a discrete set of orientations.

In some embodiments, the board may include an attachment feature for attachment to an optical table that is aligned with the fixation locations. For example, at least one of the discrete optical axes of fixation may be parallel to an axis of attachment locations on the optical table. Optionally two of the discrete optical axes fixation may be parallel to an axis of attachment locations on the optical table. In some embodiments at least one axis of fixation locations is aligned to an axis of attachment locations of the optical table. Additionally or alternatively, a sequence of axes of fixation locations is aligned to a sequence of axes of attachment locations of the optical table. For example, attachment locations of an optical table may be located along lines and/or rows one inch apart. Optionally, lines and/or rows of fixation locations on a board may arranged along lines and/or rows that are 1.5 inches apart and/or aligned with the columns and/or rows of the optical table. For example, every third column and/or row of the board may coincide to every fourth row and/or column of the optical table when the board is attached to the table. For example a attachment location for the optical table may be centered on a fixation location on the board. In some embodiments, fixation locations and/or connectors and/or attachment locations for an optical table may be separated by a separation distance, for example 37.5 mm and/or 1" and/or 25 mm and/or 0.5" and/or 12.5 mm. Optionally, fixation locations and/or connectors and/or attachment locations for an optical table are distanced apart by a separation distance and/or by a multiple of separation distances.

In some embodiments two platforms may be attached to a table in alignment and/or at a fixed distance. For example the distance between the platforms may be fixed at a multiple of the distance between fixation locations on each board. For example, the two boards may be spatially synchronized (the fixation locations on one platform may be a continuation of the pattern the other platform). This spatial synchronization may occur in cases where the platforms are not directly attached to each other and/or are at a distance from each other. The alignment may be in the horizontal plane and/or in the vertical. For example multiple layers of two platforms may be aligned and/or may serve as continuations on of another. For example, optical units placed on discrete locations on separate boards may share an optical axis. Optionally alignment and/or sharing of an optical axis may be done over distance larger than the platform on which the devices are built and/or for disconnected platforms. In this way optical elements may be connected optically across a distance larger than the platform on which the elements are mounted and/or various units may be placed in discrete locations and/or share optical axes over different platforms.

In some embodiments, a path length may be synchronized across platforms. For example, paths from platform to platform and/or across distances greater than a single platform may have a discretized path length. For example, discretization may facilitate producing multiple paths of equal length. The discretization of path length may be used for example to synchronized pulses traveling different paths between two different platforms. For example, two pulses may travel different paths, cross different platforms. The arrival of the two pulses may optionally be synchronized, for example by ensuring the both pulses travel on paths of equal length. Designing equal length paths is optionally facilitated by discretization. For example, the initially synchronized pulses may travel down two equal length paths and/or the two pulses may arrive at one or more sensors at the same time. For example, the two pulses may arrive at the same time at a junction simultaneously and/or may be reunited. This may facilitate comparison of pulses and/or production of various compound pulses for various purposes.

In some embodiments, a modular unit includes a frame supporting a standard optical element. The frame is optionally configured to retain the optical element positioned in a way that is independent of the angle of fixation of the frame to the fixation location. For example the optical element may be centered on a fixation location. For example the optical element may be positioned symmetrically with respect to the discrete directions of alignment of the fixation locations.

In some embodiments, fixation points comprise geometrical elements suitable for an interference fit, such as a male-female fit. For example, it may be a protuberance, or a male portion, such as a pin, and/or a knob, and or a bulge, and/or a projection. Alternatively or additionally, it may be a cavity, or a female portion, such as a hole, and/or a pit, and/or a socket, and/or a notch. Alternatively or additionally, the fixation points comprise interlocking members suitable for latch attachments, for example, a fastener, and/or a clasp, and/or a joint, and/or a hook, and/or a link.

Alternatively or additionally, the fixation locations comprise a geometrical mechanical alignment fit. For example, a groove and/or a protrusion having a defined geometrical shape boundary, such as a "+" sign, and/or a square, and/or a circle, and/or a trapezoid, and/or a hexagon, or any other geometrical shape. In such embodiments, the modular optical units complementary surface optionally comprises matching geometrical shapes fitting with the geometrical shape of the fixation location and complementary in direction, e.g. when a fixation location is provided with a groove, the complementary surface is provided with a protrusion, and vice versa.

In some embodiments, a complementary geometry comprises a plurality of complementary interference members, such as for example, complementary males and/or complementary female members. Alternatively or additionally, a complementary surface comprises complementary latch. Alternatively or additionally, the complementary surface comprises holes complementary in position to holes in the fixation locations. Optionally, the holes are threaded and suitable for a connection using a screw. Alternatively or additionally, a magnet and/or a pin may be used for connecting parts. Optionally the magnet and/or pin may be used in conjunction with a hole.

In some embodiments, one or more modular optical units may be added and/or removed from a platform without disturbing the spatial relationship between other units attached to the platform. For example, one unit may be removed and/or replaced at the same location by another unit. Optionally, multiple platforms may be connected together to form a single expanded arrangement of fixation locations. For example, the expanded arrangement may preserve properties of the arrangement of one or more of the platforms. For example, a first optical system may be built on a first platform and a second optical system may be built on a second platform. The first and second optical systems may optionally be combined by attaching the first platform to the second platform and/or by providing a shared optical axis. For example, an output axis of the first platform may be directed to an input axis of the second platform and/or a combiner modular optical unit may be added to the first and/or second platform to combine an optical axis and/or a blocker element may be removed from the first and/or second platform to combine the networks.

In some embodiments, an attachment interface may be provided to platforms. For example, the interface may attach one platform to another platform. For example, the interface may attach an edge of a planar arrangement of fixation locations to an edge of a second planar arrangement to for a large integrated arrangement of fixation locations. Optionally, the attachment interface is configured for attachment while a platform remains in place. For example, a platform may have a rear face that is supported on a surface and a front face that is exposed. Attachment to a second platform may be achieved entirely from the exposed face. In some embodiments one or more platforms may be included in an optical bread board. Optionally, a platform of discrete fixation locations may be configured for attachment to a standard optical breadboard, standard modular optical units, breadboard components (for example handles and/or mounting brackets) and/or an optical table.

In some embodiments, the modular optical units are modularly arranged in a 2D arrangement by releasable attachment to a planar surface of a platform (e.g. a board) for example as explained above. In some embodiments, a plurality of platforms may be arranged into a 3D positional configuration. For example, a 3D box may comprise a base and/or at a wall fixedly connected to the base at an angle and/or a ceiling facing the base. In some embodiments, the modular optical units are attached at discrete position coordinates defined by the 3D box. Optionally, a plurality of optional units may be attached to each one of the base, ceiling and/or the wall of the 3D box. Optionally, a shared optical axis may be defined between units mounted on a base and/or a ceiling and/or wall by selecting a discrete vector distance between the units and a direction for each unit from the discrete set of directions. In some embodiments, the system may include multiple layers.

In some embodiments, a 3D modular system functions as an extendable 3D optical breadboard. For example the system may be moved onto and/or removed from an optical table. Optionally, the 3D system takes less space on a table than a similar 2D system.

In some embodiments, the modular optical unit further comprises threaded holes for securely screwing the units onto the 3D box. Optionally, the modular optical unit further comprises magnetic mounts on the complementary geometry.

In some embodiments, a modular optical unit has a 3D box shape, optionally cubic, cuboid or rectangular. Alternatively or additionally, a modular optical unit comprises a prism shape. Optionally, the prism comprises a right angle and/or isosceles angles. In some embodiments, the modular optical unit comprises an optical portion, optionally a frame protected reflector or mirror. Alternatively or additionally, the optical portion comprises a filter, or a camera, optionally frame protected. In some embodiments, an optical portion is provided on a separate wall of the 3D unit other than the complementary surface. In some embodiments, the optical element comprised in the optical portion of the modular optical unit is adjustable with respect to the mount mechanically holding the optical element.

In some embodiments, the modular optical unit defines an optical axis. In some embodiments, an optical axis comprises a propagating direction. In some embodiments, by positioning the modular optical units across a 3D box having discrete positions, an optical axis is generated between the modular optical units. In some embodiments, the positions are configured in such spaces as to enable an overlap between an optical axis generated on one plane, such as on the base, with an optical axis generated by a second plane, such as the wall. In some embodiments, an overlap is generated between an optical axis generated on a wall and an optical axis generated on a ceiling. Optionally, an optical axis generated on the ceiling is aligned with an optical axis generated on the base.

In some embodiments, at least a portion of a first set of optical axes created by releasably arranged modular optical units on a first plane and at least a portion of a second set of optical axes created by releasably arranged modular optical units on a second plane, overlap across the planes by defining in the planes a discrete 3D position coordinate system. In some embodiments, positioning across the positional system allows aligning optical axes which are much larger than the modular optical units themselves. For example, a modular optical unit may have dimensions of about 10 cm$^3$, and an aligned optical axis may span over at least 10-15 meters.

In some embodiments, the complementary surface serves as a base, or a platform, upon which the optical portion is fixedly mounted. For example, a complementary surface may be a 3D quadrangular having two main surfaces and a height there between. Optionally, one surface comprises the complementary geometry or complementary members and the other surface comprises the mounted optical portion. In some embodiments, a mounted optical portion is in the form of another 3D quadrangular having two main surfaces and a height there between. Optionally, the two surfaces define the frame which holds the optical element spanning across at least a portion of the height between the surfaces. In some embodiments, the angle between the complementary base and the mounted optical portion is 90 degrees. Alternatively, the angle between the complementary base and the mounted optical portion is more or less than 90 degrees, for example, ranging between about 90 and about 120, or ranging between about 90 and about 45 and/or ranging between 0 to 45 degrees. In some embodiments, the angle between the complementary base and the mounted optical portion is adjustable. Alternatively or additionally, boards may be attachable in the same plane, for example to extend a board while preserving an alignment and/or geometry of fixation locations.

In some embodiments, a complementary surface of a modular optical unit may span over a single fixation location. Alternatively or additionally, a complementary surface may span over a plurality of fixation locations, such as for example two, or three, or four. Alternatively, the complementary surface of a modular optical unit may span over a portion of the fixation location, for example, a prism shaped unit may span over a triangular portion which might be half of a square fixation location.

Optionally, the modular optical units comprise at least two complementary surfaces. In some embodiments, modular optical units are releasably attachable to each other. In some embodiments, the modular optical units are attached while being adjacent to one another on the same plane, such as for example for increasing the stability of the units. Alternatively or additionally, the units are attached one on top of the other, resulting in an optical axis which intersects with the plane defined by the board on which the modular optical units are assembled.

An aspect of some embodiments of the invention relates to a modular 3D position system suitable for discretely attaching optical elements, such that an optical axis transmitted through the optical elements overlaps with the positional coordinate system. In some embodiments, a 3D modular system comprises a 3D box having connecting units in the form of at least one base and/or at least one wall, and optionally at least one ceiling. In some embodiments, the 3D modular position system is modular in size, by increasing or decreasing the number of connecting units. In some embodiments, the 3D modular position system is modular in shape, such as by having a variable number of walls and optional ceiling.

In some embodiments, the connecting unit in a form of a base and/or a wall comprises a board having fixation locations in a repeated pattern across its surface. In some embodiments, a repeated pattern is a repetitive matrix of square positions, each position comprising one of the fixation locations. Alternatively, the repeated pattern is a repetitive pattern of another shape, such as a triangle, a hexagon and the like.

In some embodiments, the base and/or the wall comprise a limited number of fixation locations repetitions, such as for example, only 4, or only 9, or only 12, or only 16, or only 25 fixation locations, optionally arranged in a square or rectangular arrangement. A potential advantage of providing the board of the base and/or the wall having a limited number of repetitions is that the size of the 3D box being constructed from such boards is also modular.

Alternatively, a base and/or a wall may be in another shape, such as a triangular shape, trapezoid, hexagon, and any shape which can be repeatedly matched.

In some embodiments, a base comprises at least one edge having complementary fitting with at least one edge of a second base. Optionally, each base comprises the two kinds of fittings, such that a base may connect and also be connected to. In some embodiments, at least two edges, optionally adjacent to each other, have a first complementary portion. In some embodiments, the complementary portions comprise a threaded cavity which can be secured by a screw. In some embodiments, a plurality of connecting units' arrangements is provided. For example, a matrix of 3×3 of connecting bases and/or walls and/or ceilings is provided, or a matrix of 9×9, or a matrix of 3×6, and/or a matrix of 6×6 and/or a matrix if 1×3 and/or 2×3 and/or a matrix if 1×4 or a matrix if 2×4 and/or any square or rectangular combination of 1, 2, 4, 5, 6, 7, 8, 9, 10 11, 12, and/or more and so forth.

In some embodiments, a wall comprises at least one edge suitable for fitting with another wall edge. In some embodiments, a board being a wall and/or a base comprises an extending edge projecting into a distinct plane than the plane defined by the surface of the board. In some embodiments, an extending edge is used for interconnecting a board with another board at an angle. Optionally, interconnecting is releasable and modular. Alternatively, interconnecting is fixed. Optionally, an angle between base board and a wall board is about 90 degrees. Alternatively, an angle between a base board and a wall board is in a range larger than 90 degrees, for example, a range of 90-100 degrees, or a range of 100-120 degrees, or a range of 120-135 degrees, or a range from 135 to 180 degrees. Alternatively, an angle between a base board and a wall board is in a range smaller than 90 degrees, for example, a range of 90-60 degrees, or a range of 60-45 degrees, or a range from 45 to 0 degrees.

Alternatively or additionally, a connector is provided for connecting the base and the wall at an angle. In some embodiments, a connector may be an elongated member having two planes at a fixed angle, each plane having complementary fitting to an edge of a base and/or an edge of a wall.

Optionally, a 3D box comprises a ceiling. In some embodiments, a ceiling comprises a board, optionally similar to the boards comprising the base and/or the wall, which is connected at an angle to a wall board. In some embodiments, the angle between the base and the wall is the same as the angle between the wall and the ceiling. Alternatively, the angle between the base and the wall is distinct than the angle between the wall and the ceiling, optionally, complementary to 180 degrees. For example, if an angle between the base and the wall is 120 degrees, the angle between the wall and the ceiling may be 60 degrees, such that the base and the ceiling are parallel to one another.

In some embodiments, base boards are connected to each other to create a larger board than a single unit of a base board. In some embodiments, wall boards are connected to each other larger board than a single unit of a wall board. In some embodiments, ceiling boards are connected to each other larger board than a single unit of a ceiling board. In such embodiments, the boards of the base, and/or wall, and/or ceiling are being used as building blocks for assembling a 3D box which is modular in size.

In some embodiments, more than one 3D box is provided. Optionally, two different devices may be supplied in interchangeable boxes. For example, two different devices may be supplied in identical 3D boxes and/or with identical input and output paths. For example, one device may be substituted for the other device in a system without changing the geometry of the system and/or without moving other parts of the system. Alternatively or additionally, two different devices will be supplied with identical path lengths. For example, the two devices may be substituted for one another in a system without changing the path length of the system. For example, one device may be placed in a path of a first pulse and the second device may be placed in a path of a second synchronized pulse and/or the synchronization of the pulses may be preserved. For example, each substitutable box may include a characterization optical tool (e.g. an autocorellator, a FROG), a spectrometer optical apparatus, an imaging apparatus (e.g. a microscope, a telescope) an interferometer and/or a pump-probe and/or a polarization rotator and/or another device. Alternatively, the boxes are distinct in size and/or in shape. In some embodiments, a translocator may axially translate a 3D box. Optionally, at least one 3D box is stationary while at least one other 3D box is movable.

In some embodiments one surface may overhang another surface. Optionally, in a multi-layer structure, one layer may extend past another layer. For example, a wall may extend further than a base. For example a base and/or a ceiling may extend beyond a wall and/or beyond an intermediated floor.

In some embodiments, an optical axis may cross a board. For example, a board may include a hole through which a beam can pass. Alternatively or additionally, a beam may pass a platform beyond an end therefore. Optionally the beam may be intercepted by an overhanging element and redirected to an element attached to the board. For example, a beam may pass from an element mounted on a first board to an element on a far side of a board mounted parallel to the first board.

In some embodiments, fixation locations on different planes may be aligned. For example, where a base is oriented along an x-y plane, fixation locations on a wall and/or a ceiling may be aligned with the fixation locations of the base in the x-y plane. For example, the lag distance between repeated fixation locations may be the same on different planes and/or in different directions. Alternatively or additionally, the lag distance between repeated fixation locations on different planes and/or different directions may be integral multiples of one another. For example, the coordinate systems of different boards of a 3D structure may combine as an orthogonal coordinate system. For example, a base and/or a ceiling may lie in an x-y plane. A side wall may lie in an x-z plane and/or a front and/or rear wall may fall in a y-z plane.

In some embodiments, a box may include multiple layers of parallel boards. Optionally, a board may include fixation locations on multiple sides therefore. For example, a board may form a ceiling of a first layer and/or a base for a subsequent layer. Alternatively or additionally, a first board may be mounted as a ceiling and a second board may be placed back to back with the ceiling to form an upper floor (e.g. a base at a new level. Optionally fixation locations on one side of a two sided board and/or on opposite faces of two back to back boards fix optical elements to a ceiling of a first layer and/or fixation locations on a base of the subsequent layer.

In some embodiments, a modular unit may include an optical element and/or a connector on one face and/or a complementary connector on another face. For example, the first face may connect to a board and/or the second face may include a complementary fixation element to which another modular unit is attached. In some embodiments, a dimension of a modular unit may be equal to a lag distance between fixation elements of a board. Alternatively or additionally, a dimension of the modular unit may be equal to an integral multiple and/or factor of the distance between fixation elements of a board. For example, an element attached to a block may be aligned to a 3D coordinates of an element attached to orthogonal boards.

An aspect of several embodiments of the invention relates to a modular optical kit used for optical alignment during assembly of a specific device. In some embodiments, the modular apparatus is used in a variety of optical setups, such as, for example, auto-correlator and/or cross-correlator. For example, the modular apparatus may be used for a pump-probe apparatus and/or an interferometer and/or spectroscopy (for example time-resolved spectroscopy) and/or polarization rotation and/or Fourier transform infrared and/or a pulse shaper and/or a telescope and/or a microscope and/or any of their combinations. Optionally, modular devices may preserve synchronization and/or modify timing of optical pulses according to a in a discretized manner. Optionally, the modular optical apparatus allows optical alignment in planar (2D) configuration. Alternatively or additionally, the modular optical apparatus allows optical alignment in 3D configurations. In some embodiments, the modular optical apparatus enables a fairly simple way for optical alignment in planar (2D) and/or 3D configurations. Optionally the system includes discretization in 4D (e.g. the position of an optical element and/or beam and/or pulse is discretized one, two or three spatial directions and/or the timing of a pulse is discretized (for example by discretizing the path length)). For example, discretization may simplify alignment in one, two, three or four dimensions.

In some embodiments, the apparatus includes at least two boxes. In some embodiments, the boxes are provided with a plurality of holes, optionally in fixed distances. In some embodiments, the apparatus includes a plurality of modular optical units, each having a plurality of elements sized and shaped to fit the plurality of holes. In some embodiments, the modular optical units serve as building blocks for optical system design. Alternatively or additionally, the modular optical units include a plurality of elements sized and shaped to fit with a plurality of holes provided in the optical system.

In some embodiments, the modular optical units in the modular design concept are screwed to reinforce the structure. Optionally, the modular optical units are connected by at least two screws for each modular optical unit, having the potential advantage of reducing movements. In some embodiments, the providence of screwing features offers assembly of different types of currently available and/or commercial optical setups (for example using pins and/or magnets). A potential advantage of using currently available optical setups, which could be complicated and/or expensive, with the modular optical setup herein is the robust and/or modular nature of the connection. Potentially, the modular design allows tunable assembly of complex setups which might provide an accurate optical setup by a non-expert in optics.

For example, at least one of the optic elements is a protected mirror, optionally in a triangle configuration, optionally non-dispersive and/or configurable and/or compact and/or extremely broadband (for example, spanning bandwidth in a range of 400-25000 nm). Optionally, a protected mirror is used for ultrashort pulses and/or broadband light and/or continuous wave alignment. Alternatively or additionally, at least one of a build-in delay line, and/or a beam splitter, and/or a filter, and/or an acoustic optic modulator can be part of the optic elements. A potential advantage of providing a variety of optic elements is increasing the variety of optical setups that can be assembled.

An aspect of some embodiment of the current invention relates to a prismatic in shaped modular optical unit. For example, an angled face of the unit may be at a non-square angle to at least one mounting surface of the optical unit. For example, the non-square angle may be 45 degrees and/or may range between 25 to 75 degrees. Optionally the prismatic unit may include a second mounting surface. For example, the angled face of the prism may be perpendicular to the second mounting surface. For example, the unit may have a right triangular prismatic shape. Optionally, an optical element is mounted on the angled face. For example the optical element may include a mirror. Optionally each mounting surface of the unit may include a connector for discrete connection to a platform.

An aspect of some embodiment of the current invention relates to a connector for attaching a modular optical element to a platform. The connector may include holes for at least two pins and at least one tightening element. For example, a pin and/or pin hole may fix the location of the modular unit along the surface of the platform and/or the tightening element may hold the unit to the pins and/or fix the unit in a direction normal to the surfaced of the platform. Optionally, the pins may be cylindrical and/or tapered and/or conical and/or press fit. For example a tightening element may include a screw and/or a threaded hole. For example the tolerance for positioning of the modular unit may range for example between 0.01% to 0.07% and/or between 0.07% to 0.15% and/or between 0.15% to 1% and/or between 1% to 5% of the size of connector. For example the tolerance for positioning of the modular unit may range for example between 0.001 to 0.007 inch and/or between 0.007 to 0.015 inch and/or between 0.015 inch to 0.01 inch and/or between 0.01 to 0.05 inch and/or between 0.05 to 0.1 inch.

An aspect of several embodiments of the invention relates to precisely fixed optical elements configured for a modular 2D and/or 3D optical system configuration. In some embodiments, a specific typical distance in the system design is used, potentially aiding in alignment of the optical setup, especially in the alignment of ultrashort pulses and broadband light.

In some embodiments, a discrete number of optical elements serve as building blocks for the optical system. Optionally, each element is distinct in its optical role.

In some embodiments, the optical system including platforms and/or frames and/or modular units and/or optical elements is provided as a kit. Alternatively or additionally, the platforms and/or frames and/or modular units and/or optical elements are provided independently.

In some embodiments, standard optical elements are mounted to frames. For example, the frames may be configured for 1 inch optical elements, 0.5 inch optical elements, 2 inch optical elements, 12.5 mm optical element and/or 25 mm optical elements and/or a combination thereof. For example, an optical element may include a disk of the specified diameter. For example an optical element may include a mirror and/or a lens, and/or a filter, and/or a beam splitter, and/or an iris. Also other optical elements, such as polarization cube, Brewster slabs, optical fibers, etc. can be combined with a modular optical system.

In some embodiments, the typical distance between interlocking fixation locations is fitted to a conventional optical elements size. For example:
1. Platform for Imperial (inch) optics:
   a. 1" optics platform:
      i. Platform distance between fixation locations—1.5 inch and/or multiples thereof
      ii. frames—outer dimension 1.5 inch*1.5 inch*1.5 inch or less or multiples thereof
      iii. Freedom to locate the optical elements in discrete locations distanced by multiples of 1.5" as well as 0.75" and/or 0.375"
   b. alternative 1" optics platform:
      i. Platform distance between fixation locations—1.33 inch and/or multiples thereof.
      ii. frames—outer dimension 1.33 inch*1.33 inch*1.33 inch or less or multiples thereof
      iii. Freedom to locate the optical elements in discrete locations distanced by multiples of 1.33" as well as 0.66" and/or 0.333"
   c. 0.5" optics platform:
      i. Platform distance between fixation locations—1 inch and/or multiples thereof
      ii. frames—outer dimension 1 inch*1 inch*1 inch or less or multiples thereof
      iii. Freedom to locate the optical elements in discrete locations distanced apart by multiples of 1" as well as 0.5" and/or 0.25"
   d. 2" optics platform:
      i. Platform distance between fixation locations—3 and/or 2.25 inch and/or multiples thereof
      ii. frames—outer dimension 3 inch*3 inch*3 inch and/or 2.25 inch*2.25 inch*2.25 inch or less or multiples thereof
      iii. Freedom to locate the optical elements in discrete locations of distanced by multiples of 3", 2.25" and/or 1.5" as well as 0.75", 0.5 and/or 0.375"
   e. Combination between these dimensions:
      i. 0.5 inch optics in 1 inch platform.
      ii. 0.5 inch optics in 2 inch platform
      iii. 1 inch optics in 2 inch platform
   f. There may be allowed error of up to 0.01 inch and/or 0.1 inch and/or 0.5 inch.
2. Metric optics
   a. 25 mm optics platform:
      i. Platform distance between fixation locations—37.5 mm and/or multiples thereof
      ii. frames—outer dimension 37.5 mm*37.5 mm*37.5 mm or less or multiples thereof
      iii. Freedom to locate the optical elements in discrete locations of distanced by multiples of 37.5 mm as well as 18.75 mm and/or 9.875 mm
   b. An alternative 25 mm optics platform:
      i. Platform distance between fixation locations—33.87 mm and/or multiples thereof
      ii. frames—outer dimension 33.87 mm*33.87 mm*33.87 mm or less or multiples thereof
      iii. Freedom to locate the optical elements in discrete locations of distanced by multiples of 33.87 mm as well as 16.93 mm and/or 8.467 mm
   c. 12.5 mm optics platform:
      i. Platform distance between fixation locations—25 mm and/or multiples thereof
      ii. frames—outer dimension 25 mm*25 mm*25 mm or less or multiples thereof
      iii. Freedom to locate the optical elements in discrete locations of distanced by multiples of 25 mm as well as 12.5 mm and/or 6.75 mm
   d. 2" optics platform:
      i. Platform distance between fixation locations—75 mm or 56.25 mm and/or multiples thereof
      ii. frames—outer dimension 75 mm*75 mm*75 mm or less or multiples thereof and/or 56.25 mm*56.25 mm*56.25 mm or less or multiples thereof
      iii. Freedom to locate the optical elements in discrete locations of distanced by multiples of 75 mm, 56.25 mm, and/or 37.5 mm as well as 18.75 mm, 12.5 mm and 9.875 mm
   e. Combination between all these dimensions:
      i. 12.5 mm optics in 25 mm platform.
      ii. 12.5 mm optics in 50 mm platform
      iii. 25 mm optics in 50 mm platform
   f. Examples will be given to the 25 mm, There may be allowed error of ranging up to 0.025 mm and/or/or 0.25 mm and/or 0.5 mm.
   g. In some embodiments, adapters may have dimensions that are combinations of any of the different sizes listed herein above. Alternatively or additionally, an adapter may have a size that compensates between dimensions of different systems. For example, an adapter may fill a difference between dimensions of different systems. For example, an adapter may be sized to link optical axes between optical units of systems having sizes listed herein above. For, example an adaptor may align an optical path of a unit of one discrete size to an optical path of a unit of a different size. Alternatively or additionally units may have sizes that are not listed here.
   h. In some embodiments, back to back boards may have outward facing faces that are distance by a discretization distance of the fixation locations and/or an integral multiple of the discretization distance and/or an integral factor of the discretization distance (for example the multiple and/or factor may be 1, 2, 3, 4, 5, 6, 7, 8, or more). For example, the thickness of the boards may fit the discretization system of the fixation locations. For example, the thickness of each board may be an integral multiple of the discretization distance and/or an integral factor of the discretization distance (for example the multiple and/or factor may be 1, 2, 3, 4, 5, 6, 7, 8, or more). Alternatively or additionally a spacer may be positioned between boards mounted back to back.

i. In some embodiments, the thickness of a board may be ½ the discretization distance between fixation locations. For example, two boards may be placed and/or attached back to back with the fixation location of one face being located at one discretization distance from the fixation locations of the opposite face. Optionally the boards are attachable in alignment. For example, when two boards are attached back to back, the fixation locations on one board may be aligned in the plane of the board to the fixation locations of the opposite face of the other board. For example, for a 1" system with 1.5" fixation location discretization, the thickness of a board may be 0.75" and/or a multiple thereof. For example, for a 1" system with 1.33" fixation location discretization, the thickness of a board may be 0.66" and/or a multiple thereof. For example, for a ½" system with 1." fixation location discretization, the thickness of a board may be 0.5" and/or a multiple thereof. For example, for a 2" system with 3" or 2.25" fixation location discretization, the thickness of a board may be 1.5" and/or 1.125" and/or a multiple thereof. For example, for a 25 mm system with 37.5 mm or 33.87 mm fixation location discretization, the thickness of a board may be 18.75 mm and/or 16.93 mm and/or a multiple thereof. For example, for a 12.5 mm system with 25 mm fixation location discretization, the thickness of a board may be 12.5 mm and/or a multiple thereof. For example, for a 2" system with 75 mm or 56.25 mm fixation location discretization, the thickness of a board may be 37.5 mm or 28.125 mm and/or a multiple thereof.

ii. In some embodiments, the thickness of a board may be ¼ the discretization distance between fixation locations. For example, two boards may be placed and/or attached back to back with the fixation location of one face being located at ½ discretization distance from the fixation locations of the opposite face. Optionally the boards are attachable in alignment. For example, when two boards are attached back to back, the fixation locations on one board may be aligned in the plane of the board to the fixation locations of the opposite face of the other board. For example, for a 1" system with 1.5" fixation location discretization, the thickness of a board may be 0.375" and/or a multiple thereof. For example, for a 1" system with 1.33" fixation location discretization, the thickness of a board may be 0.33" and/or a multiple thereof. For example, for a ½" system with 1." fixation location discretization, the thickness of a board may be 0.25" and/or a multiple thereof. For example, for a 2" system with 3" or 2.25" fixation location discretization, the thickness of a board may be 0.75" and/or 0.5625" and/or a multiple thereof. For example, for a 25 mm system with 37.5 mm or 33.87 mm fixation location discretization, the thickness of a board may be 9.375 mm and/or 8.47 mm and/or a multiple thereof. For example, for a 12.5 mm system with 25 mm fixation location discretization, the thickness of a board may be 6.25 mm and/or a multiple thereof. For example, for a 2" system with 75 mm or 56.25 mm fixation location discretization, the thickness of a board may be 18.75 mm or 14.0625 mm and/or a multiple thereof.

iii. In some embodiments, a board may have a thickness equal to the discretization distance between fixation locations. For example a board may have fixation locations on two opposite faces with the fixation location of one face being located at one discretization distance from the fixation locations of the opposite face. The fixation locations on one face may be aligned in the plane of the board to the fixation locations of the opposite face.

iv. In some embodiments, thinner platforms may fit back to back with outwardly facing faces centered at discretization locations. For example a spacer and/or connector may be positioned between two boards mounted back to back.

Alternatively or additionally, a system may include a combination between dimensions for example, 12.5 mm optics in a 25 mm platform and/or 12.5 mm optics in a 50 mm platform and/or 25 mm optics in 50 mm platform. Error tolerance may range for example between 0.01% to 0.07% and/or between 0.07% to 0.15% and/or between 0.15% to 1% and/or between 1% to 5%. A potential advantage of a conventional typical distance is compatibility with existing optical elements of other optical systems.

In some embodiments, a modular unit may be configured such that the position of an optical element is independent of the angle at which the unit is attached to a fixation location. For example, an optical element (and or a set of optical elements) may be mounted in a patter having optical symmetry. For example, the symmetry may be around an axis of the unit and/or an axis of a connector. For example, the modular unit may be configured such that when the unit is mounted to a fixation location, the optical element is centered with respect to the fixation location.

In some embodiments, a system may have one or more discretization distance. The discretization distance is defined as the largest distance which is a divisor of any portion of the optical path of a device between optical elements of different modular units. An x-axis discretization distance is defined as the largest distance which is a divisor of any portion of the optical path aligned with the x-axis of a device between optical elements of different modular units. A 2 orthogonal axis discretization distance is defined as the largest distance which is a divisor of any portion of the optical path aligned with either of two orthogonal axes of a device between optical elements of different modular units. A 3 orthogonal axis discretization distance is defined as the largest distance which is a divisor of any portion of the optical path aligned with one of three orthogonal axes of a device between optical elements of different modular units. A discretization distance between fixation locations along an axis will be a divisor of the distance between any two discretization locations located on a line parallel to the axis. For example, for a set of fixation locations, there may be a maximal discretization distance which is the maximum divisor of the distance between any two fixation locations along an axis and/or two orthogonal axes and/or three orthogonal axes.

In some embodiments, the discretization distance between fixation locations may be chosen so that multiple fixation locations are aligned and/or coincide to attachment holes on an optical table. For example, a modular optical system may be made to fit a one inch optical table. For example, the two axis fixation location discretization distance in the horizontal plane may be (n+1)/n*1" such that for any integral n greater or equal to 1 such that a distance between every n+1 discretization locations is an integral multiple of the 1" spacing of the optical table. For example, for n=2 the two axes discretization distance in the horizontal plane may be 1.5 inch such that every third fixation location fits to an attachment hole of the optical table. For example, for n=3 the two axes discretization distance in the horizontal plane may be ⁴⁄₃ inch such that every forth fixation location fits to an attachment hole of the optical table. For example, for 1" optical elements the discretization distance may be described by (n+1)/n*1" for any integral n greater or equal to 1 or for n 1, 2, 3, 4, 5, 6, 7, or 8. Optionally for different sized optical elements the discretization distance may be chosen to be slightly larger than the element. For example, for 2" optical elements the discretization distance may be described by (n+1)/n*2" for any integral n greater or equal to 1 or for n 1, 2, 3, 4, 5, 6, 7, or 8. For example, for ½" optical elements the discretization distance may be described by (n+1)/n*½" for any integral n greater or equal to 1 or for n 1, 2, 3, 4, 5, 6, 7, or 8.

In an example for an optical path in an interferometer:

The beam is directed to a 50%-50% beam-splitter (positioned in 45 degree) that divides the pulse into two beams—one which continues straight and the other which makes a 90 degrees turn. Each beam travels the same (discrete) distance and can be manipulate independently (e.g. one can change polarization; the other can travel in different media, etc.). With mirrors, the beams can be directed into another 50%-50% beam splitter that will combine the two separate beams.

After the combination, one can see an interference pattern between the beams that can be analyzed—and will possibly allow the retrieval of the optical response of materials.

In another example for a simpler apparatus for polarization:

The light beam has certain polarization in the input. With 5 mirrors that are located each in 45 degrees, the polarization can change its degree by 90 degrees—i.e. from Horizontal polarization to a vertical polarization (or vice versa).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

2D Modular Optic System

FIG. 1 is a block diagram illustration of a modular optical system in accordance with an embodiment of the current invention. In some embodiments, a platform 100 includes a plurality of discrete fixation locations. Each fixation location includes a connector 101a, 101b defining a location and/or direction of an optical axis 104a, 104b. Optionally, multiple modular optical units 109a, 109b are configured to connect to the fixation locations. For example, each unit 109a, 109b includes a complementary connector 102a, 102b configured to connect to any of the connectors 101a, 101b of the platform 100. Optionally, each modular optical unit 109a, 109b defines an optical axis 104a, 104b. In some embodiments, connection between each unit 109a, 109b and a connector 101a, 101b constrains the direction of the optical axis 104a, 104b to a discrete number of defined directions (for example one of four, six, eight, ten, twelve, sixteen, twenty, 32 directions and/or an intermediary number of directions and/or more directions). Optionally, the directions may be aligned to the locations. For example, fixation locations may fall along a row and/or a column on the platform and/or an optical axis 104a, 104b may pass along an axis of the row and/or column. Optionally an optical axis may intersect a fixed interval of locations. For example a 45 degree axis may intersect equidistant fixations locations by moving an equal number of locations over a number of rows and up an equal number of columns. Optionally for row spacing that is double column spacing a 45 degree angle may be defined as one up and two over and so forth for other row and/or column spacing. Optionally for other angles other ratios of grid movements may apply.

In some embodiments, the interaction between optical axes 104a, 104b of two modular optical units 109a, 109b may be fixed by selecting one of a discrete number of locations and/or one of a discrete number of directions for each of the modular optical units 109a, 109b. Optionally, the platform has a planar face including a plurality of fixation locations. Optionally the fixation locations are located at regular intervals along one or more axes on the face. For example, the fixation locations may be located along a grid. For example, the fixation location may be located at every grid location along a regular grid. Alternatively or additionally, the fixation locations are located some but not necessarily all points along a regular grid. For example, the distances between fixation locations may be defined as multiples of some set base distance.

In some embodiments, a unit may be replaced without affecting other units and/or the board. For example, a unit 109a may be replaced by another unit 109b while the other units on a board remain aligned. For example, an optical axis 104a of a unit 102a may be aligned to a network of units. Optionally, unit 109a may be replaced by another unit, for example new unit may be aligned to and/or connected to the network by selecting a location on the grid and/or a direction from a finite number of directions.

In some embodiments, the aligned fixation locations may all be on a surface of a single platform for example, on a planar surface of a single board. Alternatively or additionally, the aligned fixation locations may be on aligned surfaces of multiple inter connected platforms. For example, platforms may be directly connected one to another. For example, boards may be directly interconnected with aligned surfaces. Alternatively or additionally, disconnected platforms may be interconnected by an alignment object. For example, multiple boards may be attached at non-contiguous locations to an optical table. The connection to the optical table may align surface of the boards one to another. Optionally, each board will include mounts to the optical table that align the board to the table in one of a discrete number of alignment positions.

In some embodiments, a network of modular units may be expandable. For example, units may be added and/or removed. Optionally, alignment of units 102a, 102b is dependent on their respective orientations and/or positions on a board 100. For example, addition or removal of one unit will not affect orientation of other units. Optionally, a board containing a plurality of units may be combined with another board to form a shared network. For example, boards may connect to preserve a pattern of fixation locations over the combined boards. Optionally boards may have connector to attach them edge to edge (for example as illustrated in FIGS. 6B, 6C).

Figure 2:
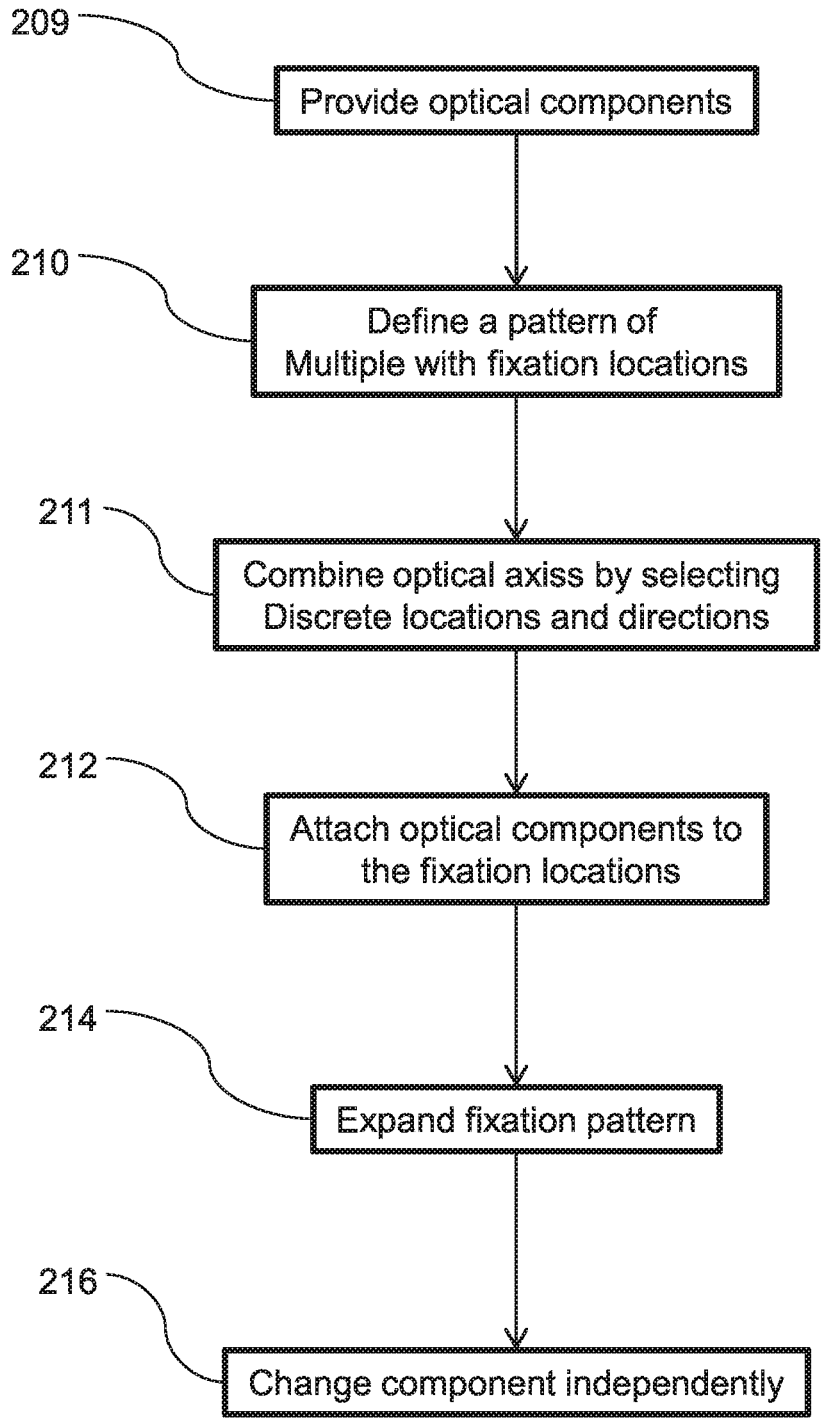
FIG. 2 is a flow chart of a method of mounting modular optical units accordance with an embodiment of the current invention.

FIG. 2 is a flow chart of a method of mounting modular optical units accordance with an embodiment of the current invention. In some embodiments, a plurality of discrete fixation locations and directions are defined 210. For example, a platform may be supplied having a fixed pattern of fixation locations and/or a discrete set of fixation orientations. Optionally, a network of modular optical units is defined by selecting 211 locations and directions for each of a plurality of optical units within the pattern.

In some embodiments, multiple modular optical units may be provided 209. For example, a modular optical unit may include an optical element (for example a mirror and/or an optical filter and/or a lens and/or an iris and/or a mirror). The modular optical unit optionally includes a fixation element (for example a complementary connector to a connector at a fixation location of a platform). For example, the connection may limit the optical element and/or an optical axis associated to the element to a finite number of discrete locations and/or directions. Optionally, the unit includes a frame including complementary connector to a platform and/or a standard mount for a standard optical element. For example, providing 209 the unit may include frame the optical element to the mount of the frame.

In some embodiments, optical axes of two modular optical units are aligned automatically according to a selection of discrete locations and directions. Optionally, units placed on the pattern are automatically aligned without requiring further adjustment. For example, parts may not include adjustable directions and/or positions outside of the discrete pattern. In some embodiments this makes it simple to place and/or replace 216 units in an optical network. For example, a unit may be changed (e.g. added, replaced and/or removed) independently. For example, changing a unit will not disturb relationships between other units in the network. Optionally, a new unit may be aligned to old units automatically based on the selection of discrete fixation location and/or direction.

In some embodiments, a pattern of fixation locations may be expanded 214. For example, an expansion board may be added to an existing board. Optionally a new board may be connected to an old board. Alternatively or additionally, the fixation pattern may be expanded 214 by mounting the existing board and/or the expansion board may to an alignment object. For example, two boards may be interaligned by attachment to an optical table. Optionally, each board may include mounts that limit attachment to the optical table to discrete locations, heights and/or alignments. For example, alignment of optical axes across multiple boards may be determined by the choice of rows and/or columns of attachment locations on the optical table. The alignment is optionally achieved without further calibration of the optical axes. For example, a coupling may be supplied to position and/or orient multiple boards to form a shared pattern. For example, an extension board may continue a pattern defined by the existing board. For example, a shared axis defined by a relationship between fixation locations on a board may on the board and/or between the board and additional board. In some embodiments, a first optical network and/or device on one board may be combined with a second optical network and/or device on a second board by interconnecting the boards. Optionally, the interconnection between the boards is delimitated by a discrete set of positions and/or directions. For example, selecting a position and/or direction of each board from a discrete set automatically aligns and/or combines the boards. For example, alignment of boards does not require calibration of any continuous adjustment. Alternatively or additionally, the devices may be combined by adding and/or removing units at selected locations and/or directions selected from a discrete set. In some embodiments, boards may be interconnected and/or aligned without movement of an existing board. For example, where a new board is attached to an existing board, the attachment may be achieved with exposed surfaces of the existing board (e.g. without having to access a bottom of board that may be supported on a surface).

3D Modular Optic System

Figure 3:
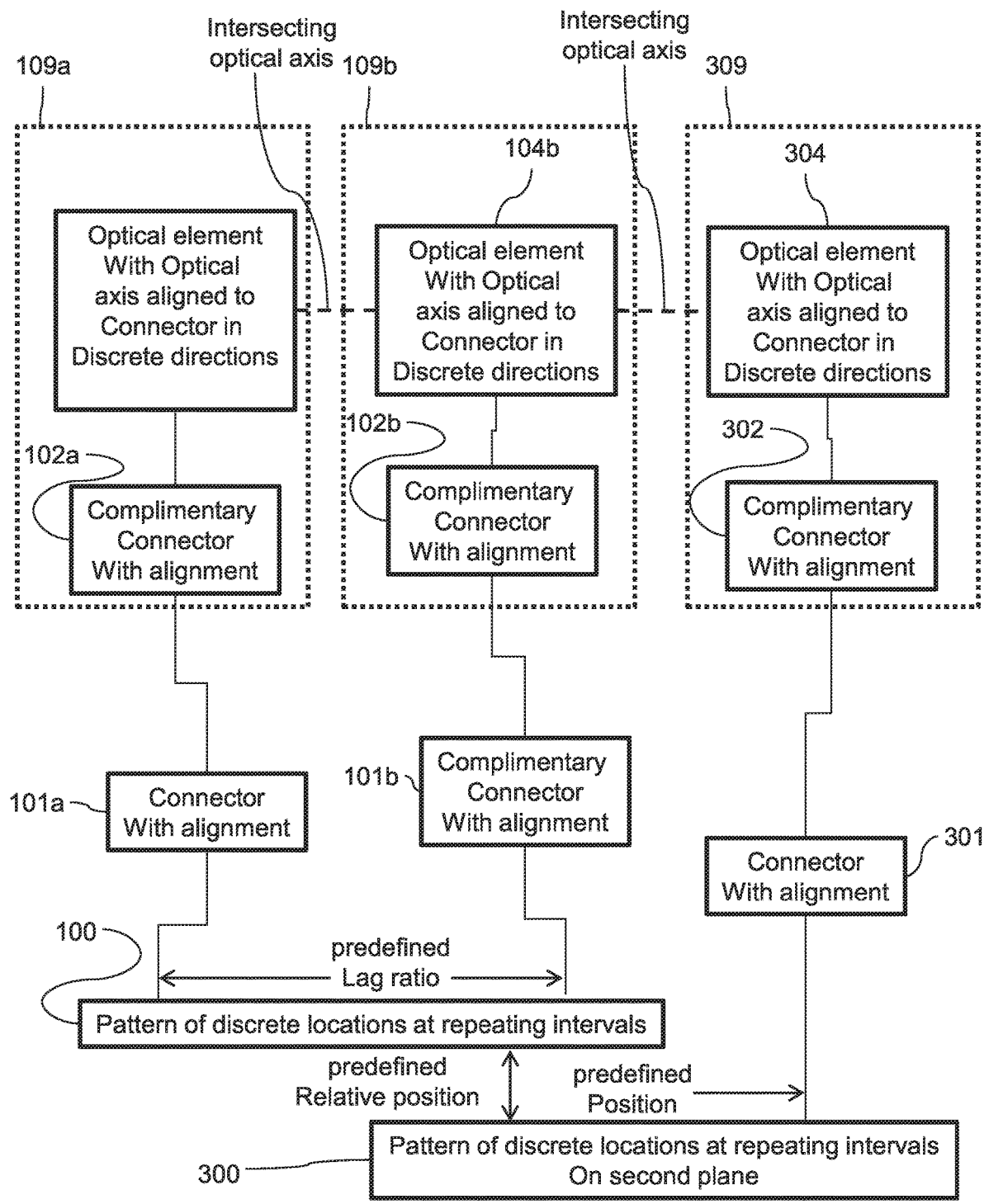
FIG. 3 is a block diagram illustration of a 3D modular optical mounting system in accordance with an embodiment of the current invention.

FIG. 3 is a block diagram illustration of a 3D modular optical mounting system in accordance with an embodiment of the current invention. In some embodiments, a pattern of fixation locations and/or directions may be defined in a 3D space. For example, fixation locations may fall on multiple planes in 3D space.

In some embodiments, a pattern 100 of fixation locations may be defined on a first plane and/or a complementary pattern 300 may be defined on a second plane. Optionally, the relationship between fixation locations in different planes may be matched. For example, shared optical axes between modular optical units may be defined by discrete axes 304, locations and/or directions with respect to the different planes by a set of discrete spacings and/or angles. For example, the spaces between fixation locations in different dimensions may be equal and/or related by simple multiples. For example, the first and second planes may be orthogonal and/or parallel. Optionally, a modular optical unit 309 may include an optical element having an optical axis 304 connected to a complimentary connector 302. The modular optical unit 309 is optionally attached to a connector 301 at a fixation location within pattern 300 such that optical axis 304 intersects a modular optical unit 102b on a pattern 100 on a different plane. In some embodiments, the intersection of axes 104a, 104b, 304 on one plane with units located on a different plane (and/or not located on the first plane) may be determined by a finite number of discrete locations and/or directions. For example, a network of intersecting axes may be built by merely choosing locations and direction among a discrete set without further calibration. Alternatively or additionally, the length of the optical axis may be fixed by the number of fixation locations that it passes. For example, a length of intersecting axes may be determined by merely choosing locations and direction among a discrete set without further calibration.

Optionally the discretization of path length may facilitate synchronizing pulses. For example, two pulses formed at the same time (e.g. split from a single pulse) may be sent along two paths (for example a path may include elements that condition one of the two pulses). In order to synchronize the two pulses at the end of the two paths, the two paths may be designed to have equal path lengths. Discretizing path length, in accordance embodiments of the current invention, may facilitate designing paths of specified (for example equal) lengths. For example, after two pulses travel on the two separate paths, a discrete addition may be added to the shorter path to make the two path lengths equal and/or to synchronize the pulses. For example, the synchronized pulses may reach a sensor and/or joiner at the same time. For example, synchronization may facilitate combining and/or comparing the two pulses.

In some embodiments, a mount for a modular optical unit may include a complementary connector for connection to a platform on one surface and/or a connection for another modular optical unit on another surface. For example, the complementary connector may be configured for attaching a modular unit including a first optical element to a platform. Optionally, the connector on the other surface may be configured for attaching a second modular optical unit including a second optical element to the first optical unit. For example, a first modular optical unit may be attached to a base and a second modular optical unit attached to the top of the first unit. Optionally the second modular optical unit will be rotationally aligned to the base (for example directed in one of the discrete component directions defined by the base). Optionally, the second modular optical unit will be aligned with a wall platform. For example the height of the first modular optical unit may be equal to the distance between fixation locations on a wall platform (and/or an integral multiple of that distance). In some embodiments a spacer unit may be used to raise a modular optical unit away from a board. For example, a spacer unit may be sized to hold a modular optical unit at a fixation location defined in 3D space by orthogonal platforms.

Figure 4:
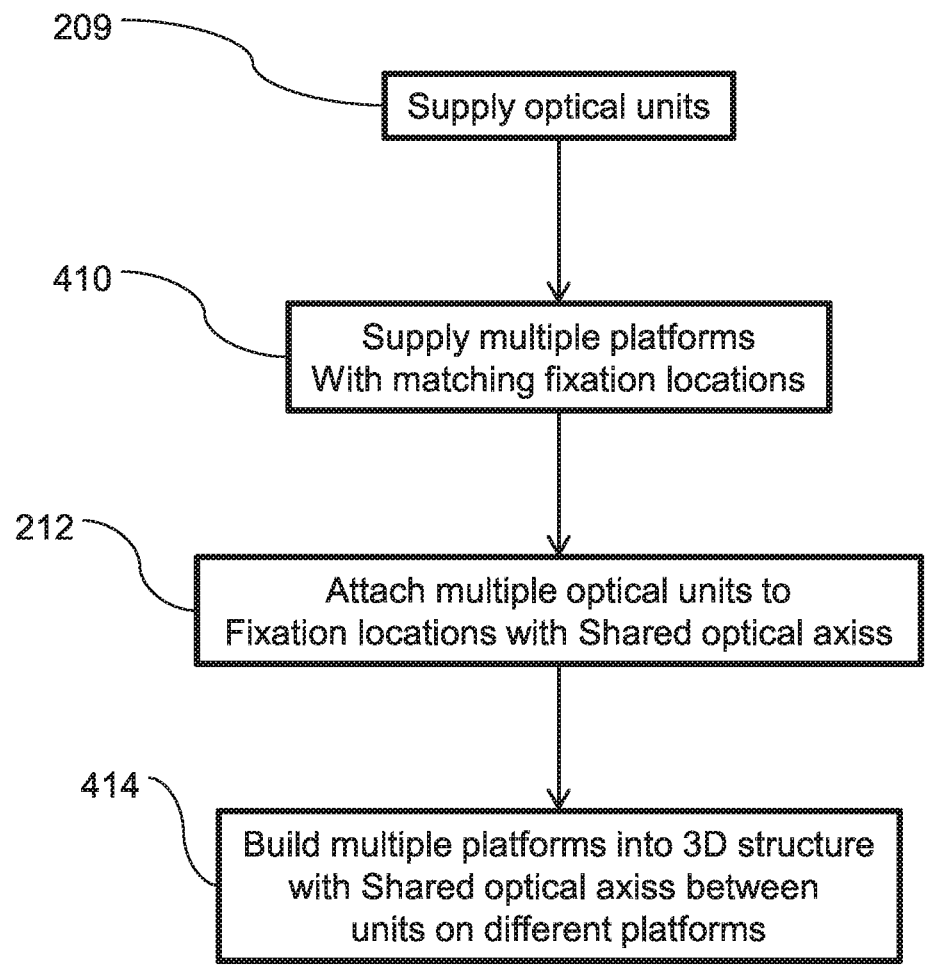
FIG. 4 is a flow chart of a 3D method of mounting modular optical units in accordance with an embodiment of the current invention.

FIG. 4 is a flow chart of a 3D method of mounting modular optical units in accordance with an embodiment of the current invention. In some embodiment fixation locations may be supplied on multiple planes. For example, fixation locations may be organized on a 3D grid. A plurality of modular optical units may be attached to fixations locations on various planes. Optical axes of the devices may intersect for example to build a network of interconnected devices.

In some embodiments, multiple platforms may be supplied 410, each platform having a pattern of fixation locations. Optionally, the patterns on different platforms may match up. For example, the fixation locations may be arranged as a grid on each platform may have a simple integral ratio relationship to the locations on another platform. For example, grid spacing may be equal on different platforms and/or may have a simple multiple relationship (for example grid spacing on one platform may be twice that of another platform) and/or have an integral ratio (two spacings on one grid may equal three spacings on another grid).

In some embodiments, modular optical units may be attached 212 to each platform. For example, attachment 212 may be constrained to discrete location and/or discrete directions. Optionally, by designating locations and directions one may define a network of intersecting optical axes. Optionally, attaching 212 the units to the designated locations in the designated directions automatically aligns the optical axes, for example without need to calibrate the units.

In some embodiments, the different platforms are built 414 into a 3D structure with shared optical axes across platforms to form a large network. For example, a set of units and/or fixation locations and/or optical axes may all fall in a first plane. For example, a second set of units and/or fixation locations and/or optical axes may all fall in a second plane outside of the first plane. Optionally, the platforms are built 414 into a structure such there is at least one shared axis that intersects at least one unit the first set of units and at least one unit of the second set of units. Optionally, a beam and/or a pulse travels, between elements of the first set and then along the shared axis to the second set of elements and is transferred between units of the second set of units. For example, a platform containing the first set of units may be attached a platform containing the second set of units in a predetermined geometry to form the shared axis. Alternatively or additionally, the a platform containing the first set of units and the platform containing the second set of units may be attached to a joining element in a predetermined geometry to form the shared axis. For example, the two platforms may be attached to an optical table in the predetermined geometry.

In some embodiments an ultra-short pulse may be split along two paths. Optionally the paths contain discrete sections and/or the path length is determined by the number of fixation locations in each discrete section. For example, each path may pass and equal number of fixation locations. After being split to the two paths, the pulse may be reunited. Alternatively or additionally, distance between fixation locations may along different paths may be related by an integral ratio and/or the path may pass an equivalent ratio of locations before being reunited.

In some embodiments, platforms and/or patterns of elements and/or optical axes may be arranged along orthogonal surfaces and/or along parallel surfaces. For example, platforms may be built 414 into a structure having walls orthogonal to a base and/or a roof. Optionally a beam and/or a pulse will be transferred between paths along parallel and/or orthogonal surfaces. Alternatively or additionally, a single beam and/or pulse may be split and parts of the beam and/or pulse may travel along paths on various parallel and/or orthogonal surface. Subsequently the beam and/or pulse is optionally reunited.

In some embodiments, platforms may be built into boxes and/or stacked one on top of another. Optionally one or more shared axes will transfer a beam between units of different boxes. Optionally a unit and/or a network of units (for example a box) may be replaced while the rest of the network remains in place. Thus a new functional group may be added and/or removed from a complex laser device. Optionally, positioning of platforms and/or boxes is constrained to discrete positions and/or directions and/or distances. For example, coordination of shared axes and/or units and/or functional groups may be determined by choosing a discrete location and/or direction for each unit and/or group. Optionally the shared axes are joined by the discrete positioning without calibration. Alternatively or additionally, a calibration element (for example an adjustable mirror) may be supplied at an access point to adjust the shared axis between devices.

In some embodiments, a plurality of platforms may be built 414 into a 3D structure and then multiple modular optical units may be attached 212 to the platforms. For example the multiple modular optical units may form a 3D network and/or a shared pathway for a laser beam and/or pulse traveling between modular units attached to one or more of the platforms.

Example of Modular Optic Units and Relationships

Figure 5A:
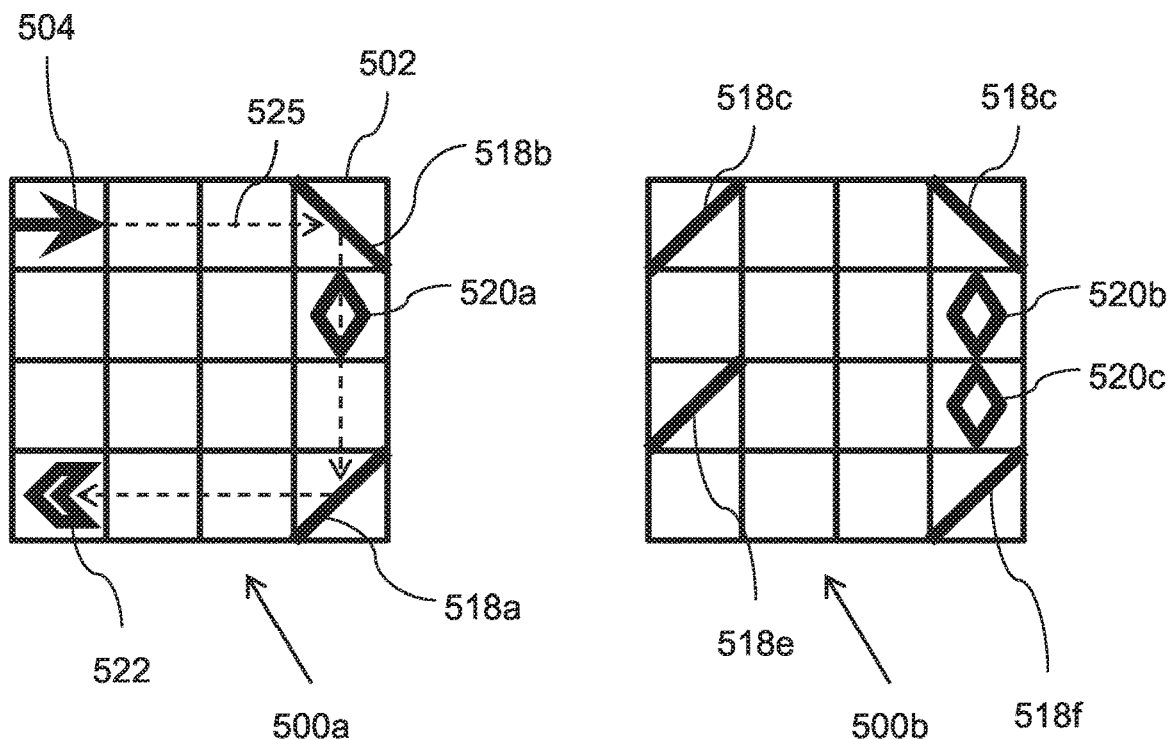
FIG. 5A is a schematic drawing of reconfiguring a modular optical device in accordance with an embodiment of the current invention.
Figure 5B:
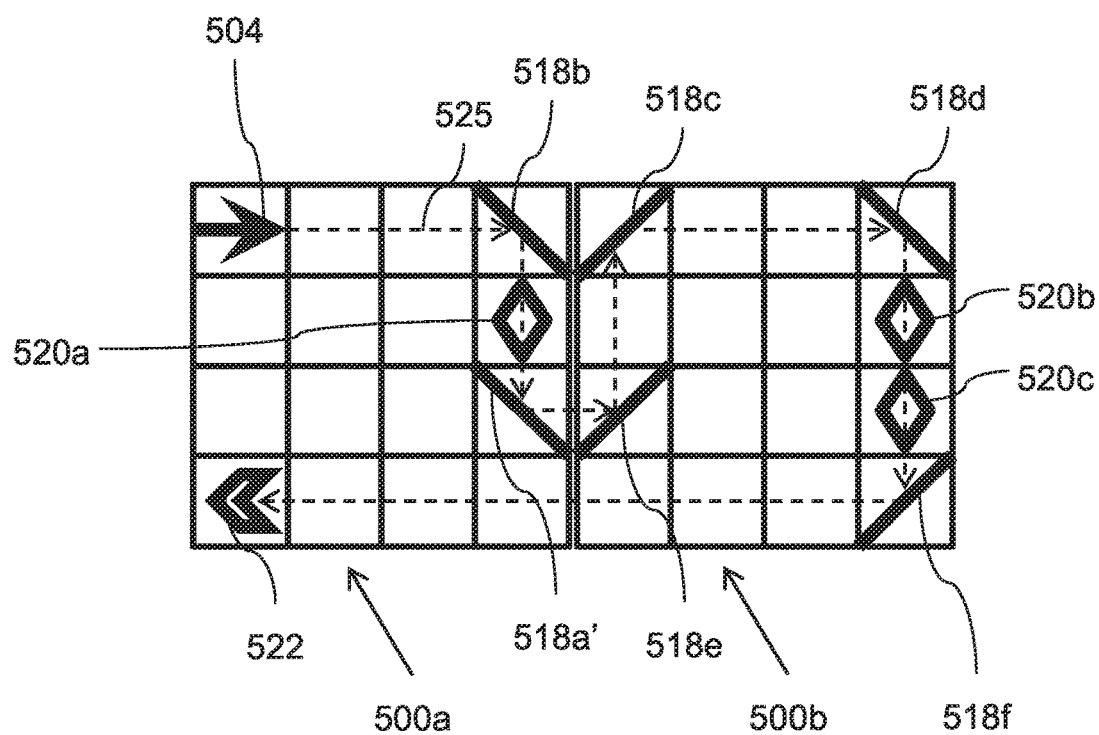
FIG. 5B is a schematic drawings of reconfiguring a modular optical device in accordance with an embodiment of the current invention.

FIGS. 5A and 5B are schematic drawings of reconfiguring a modular optical device in accordance with an embodiment of the current invention. Optionally units may be reversibly attached to a grid of 16 fixation locations illustrated as boxes on each platform 500a, 500b. Optionally units can be attached on each grid in one of for orthogonal directions.

For example, FIG. 5A illustrates two disconnected platforms 500a and 500b. A laser light 504 is directed through an access path of platform 500a. The light travels along a path 525 intersecting a first unit including a mirror 518b directing the beam across an element 520a (for example a filter). The light passes element 520a and strikes a mirror 518a which directs the light to an exit 522. For example, in FIG. 5A, platform 500b includes 4 mirrors and two elements that preserve direction.

In some embodiments, two platforms may be built into a compound device. For example, as illustrated in FIG. 5B, platform 500b is connected to platform 500a and/or mirror 518a is moved up one grid space and rotated one rotation unit of 90 degrees to position 518a'. Connecting the platforms and/or moving mirror 518a optionally has no effect on the interconnections of other units on the two platforms. For example, after joining the boards 500a, 500b the same light 504 enters by the same access path 525, is redirected by the same mirror 518b and/or passes the same element 520a. When the beam hits mirror 518a' it is optionally directed along platform 500b to mirror 518e, mirror 518c, mirror 518d, through two elements 520b and 520c, to mirror 518f and out exit 522. The beam optionally enters and exits along the same path as before combination of platforms 500a and 500b, but has now passed through more elements 520b, 520c and/or a longer path length.

In some embodiments, the path length is discretized. For example, the path length may be determined by the number of fixation locations crossed. Optionally each fixation location is a square block. Optionally, each unit is centered on a fixation location. For example, beam 525 crosses half of the block fixation location 502 hitting mirror 518b at the center of the block and then crosses half of the block before reaching the block of device 520a. For example, the path in FIG. 5A crosses ten blocks and optionally has a length of ten units. For example, the path in FIG. 5B crosses 22 blocks and/or has a length of 22 units. For example if each block is square with a side length of 1.5 inches then the path length in FIG. 5A is 15 inches and/or the path length in FIG. 5B is 33 inches. Discretization of path length may facilitate constructing devices with exact path lengths which in some embodiments may facilitate joining pulses of light passing over separate paths. Optionally centering optical elements on a fixation location facilitates discretization of path length. For example, by centering mirror 518a on a fixation location, the length of path entering and exiting the block of mirror 518a is independent of the direction in which mirror 518a is oriented.

Figure 6A:
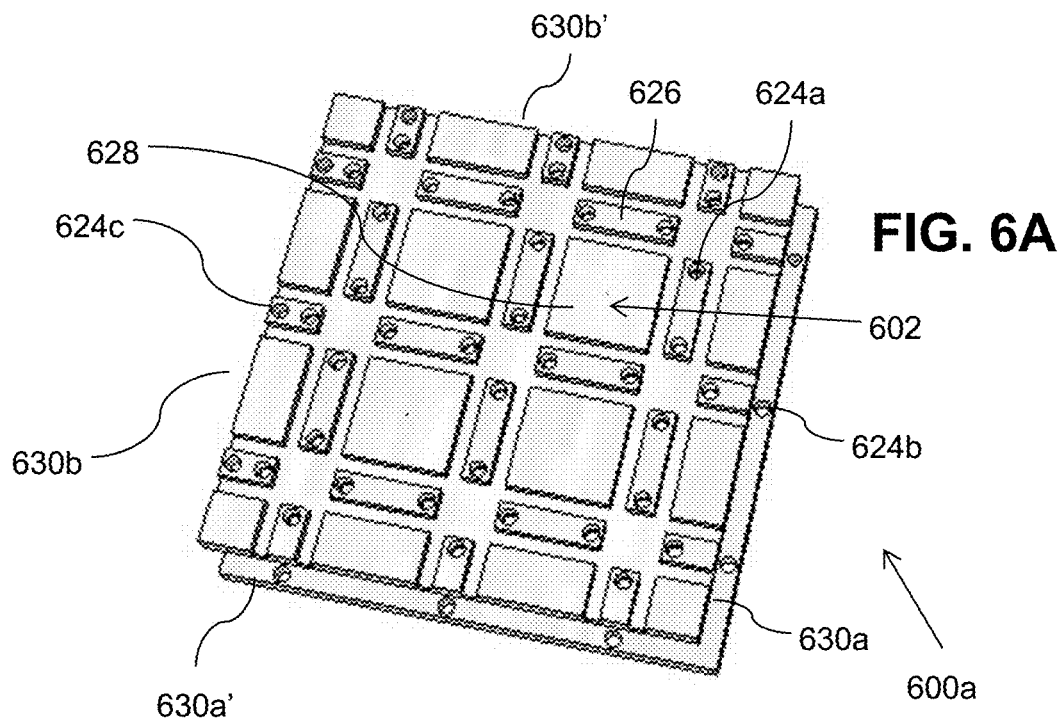
FIGS. 6A-6C are perspective drawings of joining boards in for mounting modular optical units in one plane in accordance with an embodiment of the current invention.
Figure 6B:
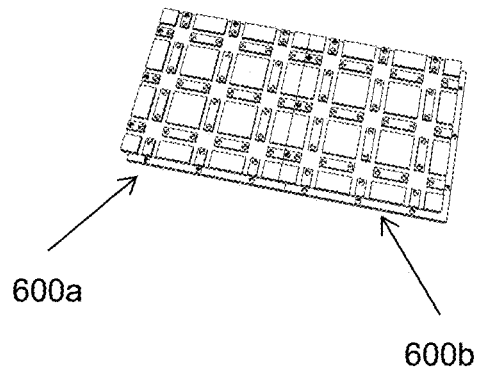
Figure 6C:
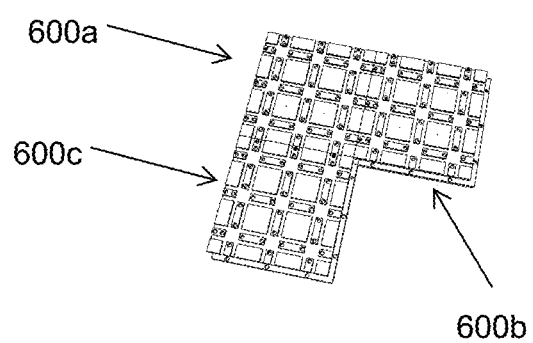

FIGS. 6A to 6C are perspective drawings illustrating joining platforms for mounting modular optical units in one plane in accordance with an embodiment of the current invention. In some embodiments, a platform has the form of an optical breadboard with a two dimension pattern of discrete fixation locations on a surface thereof. For example the surface may be planar. Optionally, an attachment interface is supplied at some or all edges of the platform. For example, the interface facilitates connecting one platform to another platform. For example, the attachment interface may be configured to constrain attachments between platforms such that the fixation locations on the two platforms form a continuous pattern.

FIG. 6A illustrates an exemplary platform 600a for attachment of modular optical units in accordance with an embodiment of the current invention. For example, platform 600a includes 4 complete fixation locations 602 in a central section and 8 half fixation locations along the edges of the platform 600a and four quarter fixation locations on the four corners of the platform 600a. For example, each fixation location includes a square female connector 628 surrounded by four rectangular male connectors 626. The male connectors optionally include holes 624a. For example, some of holes 624a may be threaded for screws and/or some of holes 624a may be configured to hold a pin. Optionally along two edges of platform there are extension flanges 630a and 630a' for connection to an extension platform (for example platforms 600b and/or 600c as illustrated for example in FIGS. 6B and 6C). Extension flanges, 630a, 630a' optionally include holes 624b. For example, some of holes 624b may be threaded for screws and/or some of holes 624b may be configured to hold a pin The other two edges of platform 600a include extension overhangs 630b and 630b'. Extension overhangs, 630b, 630b' optionally include holes 624c. Optionally, each overhang 630b, 630b' is configured to attach to a flange (for example similar to flanges 630a, 630a') of an extension board. Optionally, holes 624b are positioned and/or configured for attachment to corresponding holes (e.g. similar to 624c), for example by a screw and/or a pin.

FIG. 6B illustrates attaching a platform 600a to a platform 600b in accordance with an embodiment of the current invention. For example, an overhang of platform 600b (for example similar to overhang 630b) is placed over a flange 630a of platform 600a. A screw and/or a pin is optionally used to connect the platforms 600a and 600b. For example a screw and/or a pin may lock the two platforms together and/or the lock them into alignment. For example, a screw may be inserted through a hole in platform 600b (for example similar to hole 624c) and screwed into a hole 624b in platform 600a.

In some embodiments, holes may be arranged to allow attaching platforms together while they lie on a flat surface. For example, an extension (e.g. platform 600b) may be added to an existing breadboard (e.g. platform 600a) without disturbing the existing breadboard and/or without moving the existing breadboard and/or without disturbing modular optical units previously attached to the breadboard. For example, screws may be inserted through holes (e.g. holes 624c) from the top of platform into corresponding holes (e.g. holes 624b) of another platform while one or both platforms sit on a table.

FIG. 6C illustrates attaching a platform 600c to the combined platforms 600a and 600b in accordance with an embodiment of the current invention. Optionally the fixation location all remain with the same and/or a matching pattern. For example, modular optical units may be connected and/or optical networks built as described for example in FIGS. 1, 2 and 5.

Figure 7A:
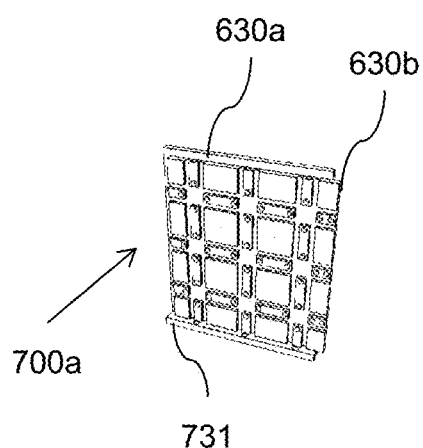
FIGS. 7A-7B are perspective drawings of joining boards for mounting modular optical units in accordance with an embodiment of the current invention.
Figure 7B:
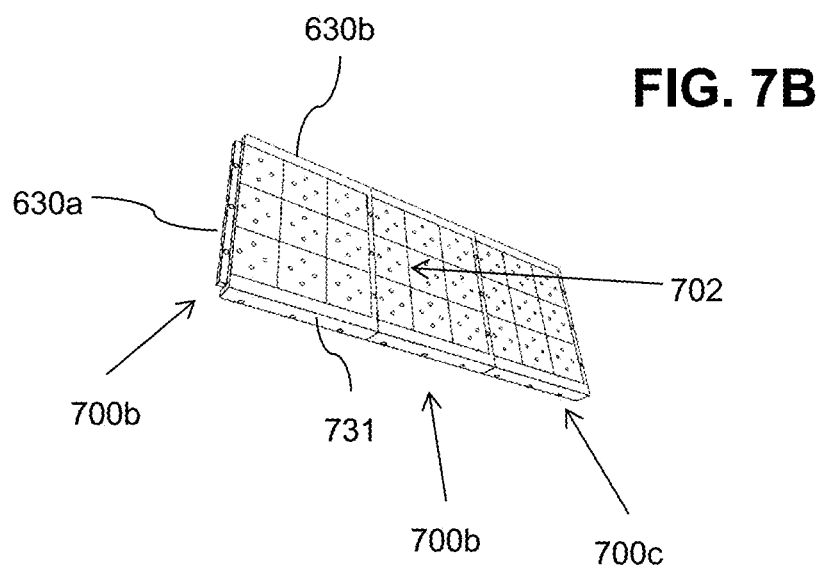

FIGS. 7A and 7B are perspective drawings joining boards for mounting modular optical units in accordance with an embodiment of the current invention. Exemplified are optional configurations for walls of the 3D box. Optionally walls may be connected with screws, pins and/or male-female connectors. Optionally a platform including for example a base, walls and/or a ceiling may be connected and or extended to any size. For example a platform 700a may include an attachment interface with an overhang 630b and/or a flange 630a. Optionally, a flange may be connected to an overhang of another platform. For example the extension may extend a platform with a coplanar extension. Alternatively, an edge of platform 700a may include an angle attachment interface 731. For example attachment interface 731 may attach to a flange to form an out-of-plane connection between two platforms. In some, embodiments, a fixation location 702 may include a flat surface and/or a pattern of holes, for example four holes. In some embodiments, a separate joiner element may be supplied. For example, two platforms may be joined into a coplanar extension by employing one joiner element and/or the two platforms may be joined into an out-of-plane extension using a different joiner element.

Figure 8A:
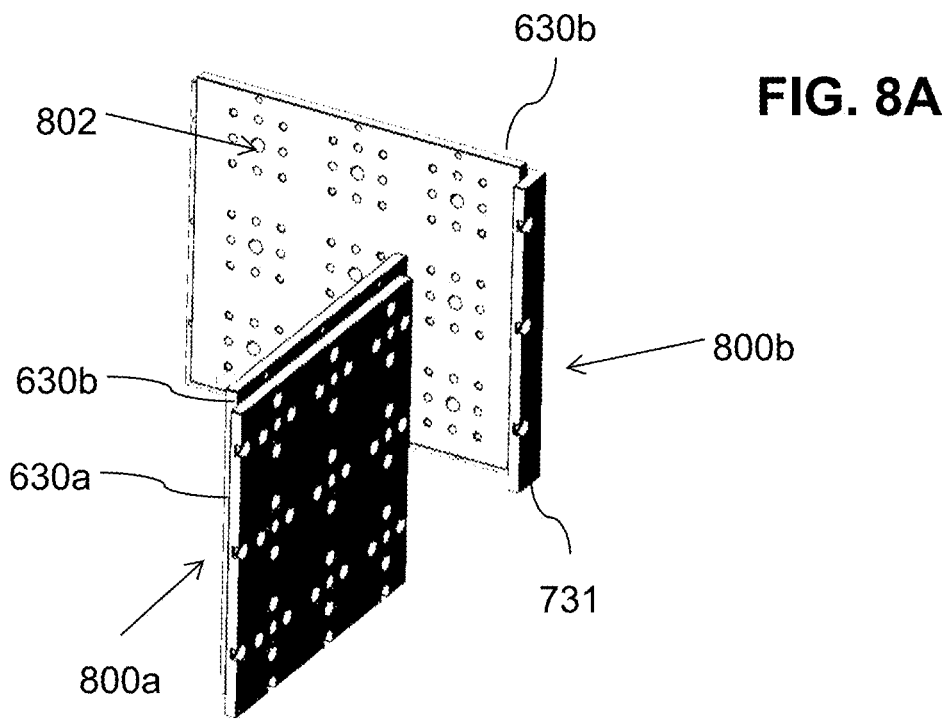
FIGS. 8A-8B are perspective drawings of joining boards for mounting modular optical units in two planes in accordance with an embodiment of the current invention.
Figure 8B:
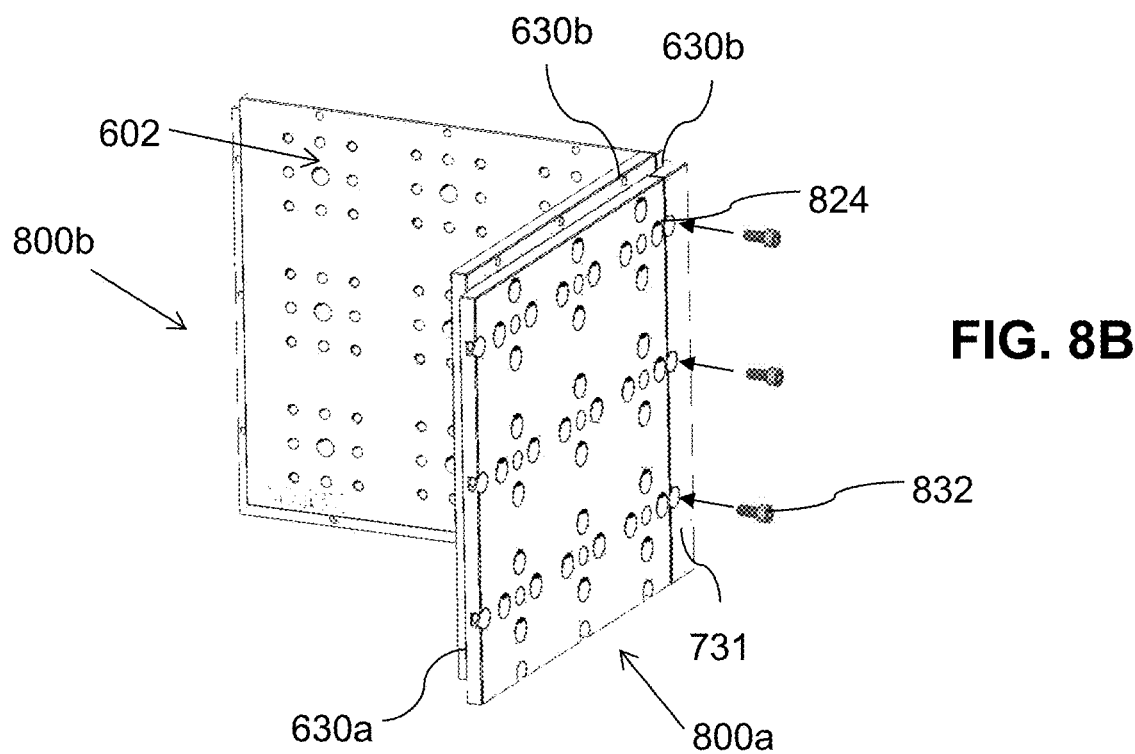

FIGS. 8A to 8B are perspective drawings illustrating joining of platforms 700a, 700b, 700c for mounting modular optical units in multiple planes in accordance with an embodiment of the current invention. In some embodiments, a platform 700a, 700b, 700c may include a built in attachment interface (for example a flange and/or an overhang) for attaching to an extension. In some embodiments, the attachment interface may be configured for extension of a platform in a single plane (for example as illustrated in FIG. 6A-6C). In some embodiments, an attachment interface may be configured for attachment of platforms in different planes. Optionally, an attachment mechanism may be in integral part of a platform. For example, some platforms may be configured for use as a base (for example including only an in-plane attachment interface). For example, some platforms may be configured for use as a wall (for example including a connector for connection to a base at a 90 degree angle). Alternatively or additionally, there may be a generic board with a generic attachment interface. For example, use of joiner elements may allow connection of generic boards at different attitudes (for example a separate corner piece may join generic platforms orthogonally (for example at 90 degree angles).

FIG. 8A illustrates two platforms 800*a* and 800*b* in accordance with an embodiment of the current invention. Optionally, each platform 800*a*, 800*b* includes three rows and three columns of fixation locations 802. Optionally, each fixation location includes holes for pins and/or screws. For example, some or all of the holes may be used to stabilize a modular optical unit. In some embodiments, some of the holes pass through the platform to the rear face and/or some holes do not pass all the way through. For example, on board 630*b* a front fixation surface is illustrated with nine holes. Some of the holes are for connection to a modular optical unit. For example, in the exemplary embodiment five of the nine holes pass through the platform to a rear face. An exemplary use of the various holes of fixation location 802 will be explained in more detail with respect to FIGS. 9 and 27A-33B.

In some embodiment a platform may include one or more attachment interfaces. For example, platform 800*a* includes flanges 630*a* and/or overhangs 630*b*. For example, similar to the embodiment of FIGS. 6A to 6C, an overhang and a corresponding flange may be used to connect together coplanar platforms. Optionally, an attachment interface may be configured to connect platforms in multiple plains. For example, attachment interface 731 fits to an overhang (for example overhang 630*b*) and to attach board 800*a* to 800*b* with surfaces at 90 degree angles.

FIG. 8B perspective drawings of boards 800*a* and 800*b* joined in two planes in accordance with an embodiment of the current invention. Optionally, platforms 800*a* and 800*b* may be attached together such that fixation locations on the two platforms 800*a*, 800*b* are aligned which each other in different planes. For example, the two platforms 800*a*, 800*b* may be connected orthogonally. Optionally one axis of platform 800*a* may be independent from the plane of platform 800*b*. Optionally along another axis boards 800*a* and 800*b* are aligned. For example, platform 800*a* joins platform 800*b* at a right angle. For example, FIG. 8B, each horizontal row of platform 800*a* is aligned to a corresponding row of platform 800*b*. Optionally, the columns of platforms 800*a* and 800*b* are independent. For example, changing a position of a modular optical unit from column to column on platform 800*a* does not change a corresponding position on plane 800*b*.

In some embodiments, screws 832 may be used to lock platforms together. Alternatively or additional, an attachment interface may include locking interference elements and/or a male/female connection and/or a track and/or a slot and/or a groove (for example a T-slot track) and/or a pin. In some embodiments, a connection may be designed to allow connection requiring access from only one side (for example this may allow extension of a bread board with the board remains supported on a surface).

Figure 9:
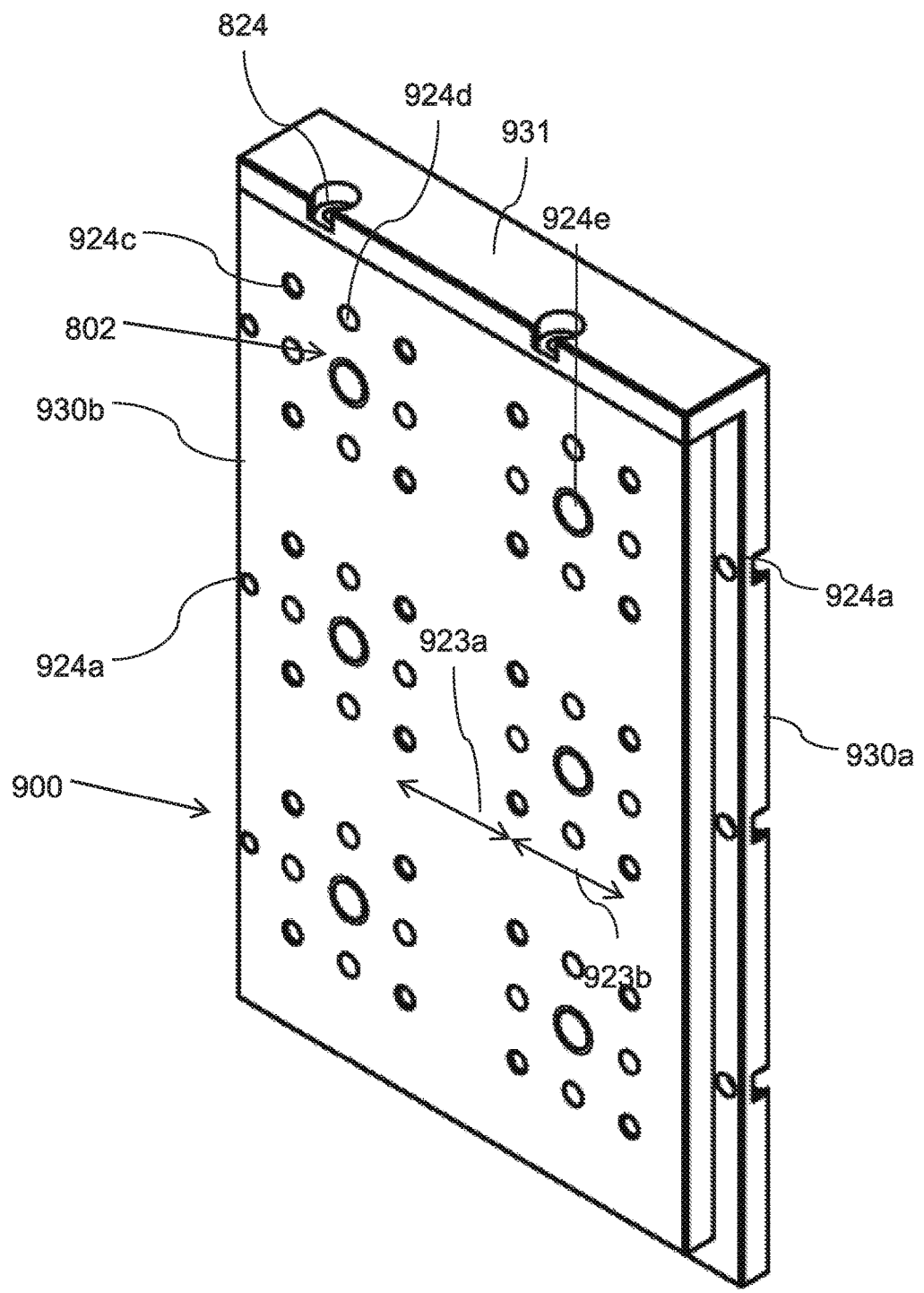
FIG. 9 is a perspective drawing of a board for mounting modular optical units in accordance with an embodiment of the current invention.

FIG. 9 is a perspective drawing of a front face of a platform for mounting modular optical units in accordance with an embodiment of the current invention. Optionally, a board may include two columns and/or three rows of fixation locations 802. Optionally a platform may include one or more attachment interfaces.

In some embodiments, an arrangement of holes in a fixation location 802 may serve multiple functions. For example, a fixation location 802 may include a hole 924*e* centered on the fixation location 802. Alternatively or additionally, a fixation location may include one or more holes 925*c* arranged at corners of the fixation location. Alternatively or additionally, a fixation location may include one or more holes 925*d* arranged at edges (for example the center of each edge) of the fixation location. For example, as seen in the rear face of board 800*a* in FIGS. 8A, 8B, holes 924*d* may pass all the way through the platform and/or holes 924*c* may not pass all the way through the platform. Optionally holes 924*d* are used for pins. Optionally, holes 924*d* are used for inserting screws, for example, from behind the board. Alternatively or additionally, screw holes may be configured for inserting screws from the front of the board. For example this may facilitate attaching units, detaching units and/or connection of platforms from the front face while the back face rests on a table without moving the platforms.

In some embodiments, a connector is invariant to rotation over a certain angle, for example 180 degrees, 90 degrees, 60 degrees 30 degrees. Optionally the connector of the fixation location 820 is invariant to 90 degree rotation. For example, each fixation location 802 includes a hole 924*c* on each of the 4 corners and/or a hole 924*d* on a center of each side. For example, a modular optical unit can be mounted to each fixation location platform 900 in any one of 4 orthogonal directions.

In some embodiments, a distance 923*a* between holes of adjacent sides fixation locations is equal to a distance 923*b* between opposite sides of a single fixation location. For example, a modular optical unit may be mounted centered on a fixation location and/or centered between two fixation locations.

In some embodiments, a platform may include an interface for mounting to an optical table. For example, an optical table may include grid of holes for screw located every one inch. Optionally, holes 924*e* are located along a 1.5 inch grid across platform. Optionally, board 900 may be attached to a table by putting a screw through a corresponding hole of the platform to a corresponding hole of the table. For example, every third hole 924*e* in the platform may correspond to every fourth hole of the grid of the table. Optionally, a spacer may be placed between the table and platform 900. For example, the space may raise the platform off the table by a measured amount. For example, distance 923*a* may be equal to 923*b* may be equal to 0.75 inches.

In some embodiments, an attachment interface may include a flange 930*a* and/or an overhang 930*b* and/or an angled connector 931. For example, an attachment interface may be on an edge of the platform.

Figure 10:
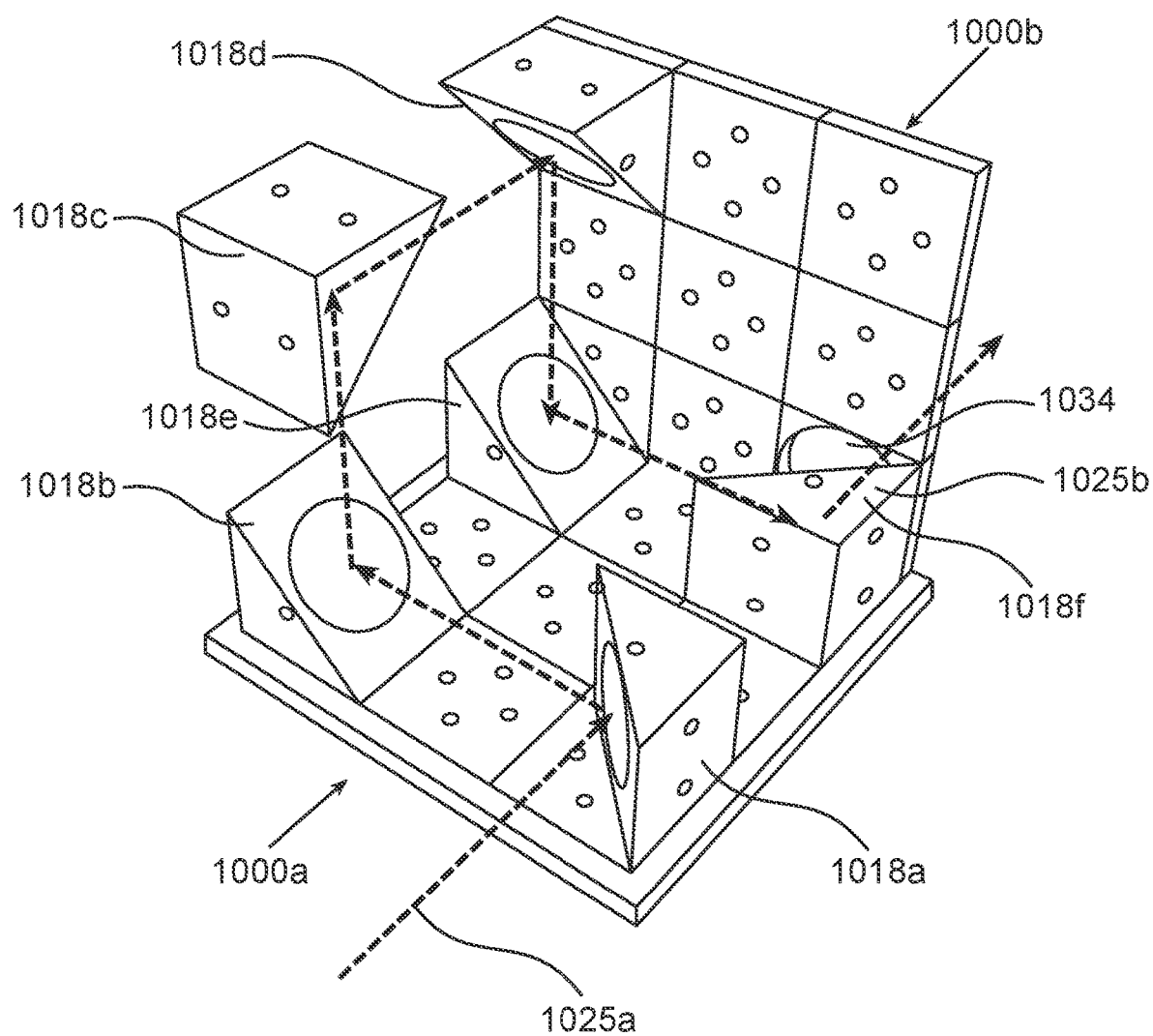
FIG. 10 is perspective drawings of a polarization inverter built of modular units in accordance with an embodiment of the current invention.

FIG. 10 is a perspective drawing of a polarization inverter built of modular units in accordance with an embodiment of the current invention. In some embodiments a platform may include an opening. For example the opening may serve to allow a light beam and/or burst to pass therethrough.

In some embodiments, a set of modular optical units are attached to discrete fixation locations on one or more platforms 1000*a*, 1000*b* to form a functional device. For example, a set of six mirrors 1018*a*-1018*f* may be used to reverse polarity of a light beam 1025*a*.

In some embodiments a mirror may be mounted on a frame to form a modular optical unit 1018*a*-1018*f*. For example, each unit 1018*a*-1018*f* may be mountable to a fixation location on one of four faces and/or each face may be mountable to the fixation location in one of four directions. For example, each unit has two square faces and two triangular faces. Optionally each fixation location includes four holes for mounting to a modular optical unit. Optionally, each square face of a unit 1018a-1018f includes two holes. For example, two pins and/or two screws may be used to attach the square side to the fixation location in one of four directions. Optionally, each triangular face of a unit 1018a-1018f includes one hole. For example, a pin and/or a screw may be used to attach the triangular side to the fixation location in one of four directions.

In some embodiments, light beam 1025a may enter the system, pass half a fixation locations and strike a first mirror 1018a. Mirror 1018a is optionally centered on the square fixation location. The modular unit is attached on a triangular side to the base platform 1000a. Optionally, mirror 1018a is oriented perpendicular to the plane of the base platform 1000a and/or is directed 45 degrees to the left. For example, the beam enters the device in a forward direction, passes half a fixation location while entering the device and hits mirror 1018a and is reflected at a 90 degree angle leftward, parallel to the base. The beam optionally crosses a total of two fixation locations and strikes mirror 1018b. Optionally the modular unit of mirror 1018b is connected on one of its square faces with mirror 1018a facing leftward and at a 45 degree angle upward. When the beam hits mirror 1018b, the beam is optionally reflected vertically upward. In some embodiments, the beam crosses a total of two fixation locations and strikes mirror 1018c. Optionally the modular unit of mirror 1018c is connected on one of its triangle faces to a left wall platform (not shown) and/or on a square face to a ceiling platform (not shown) with mirror 1018c facing forward and at a 45 degree angle downward. When the beam hits mirror 1018c, the beam is optionally reflected forward, parallel to base platform 1000a. For example, the beam crosses a total of two fixation locations and strikes mirror 1018d. Optionally the modular unit of mirror 1018d is connected on one of its square faces to a front wall platform 1000b with mirror 1018d facing backward and at a 45 degree angle downward. For example, when the beam hits mirror 1018d, the beam is reflected downward, parallel to wall platform 1000b. The beam optionally crosses a total of two fixation locations and strikes mirror 1018e. For example, the modular unit of mirror 1018e is connected on one of its triangular faces to a front wall platform 1000b with mirror 1018e facing rightward and at a 45 degree angle upward.

When the beam hits mirror 1018d, the beam is reflected rightward, parallel to base platform 1000a. The beam crosses a total of two fixation locations and strikes mirror 1018f. Optionally the modular unit of mirror 1018f is connected on one of its triangular faces to a base platform 1000a with mirror 1018f facing leftward and at a 45 degree angle forward. When the beam hits mirror 1018d, an exciting beam 1025b is optionally reflected forward, parallel to base platform 1000a. For example, the exiting beam 1025b may be along the same line as the entering beam 1025a except that the polarity has been reversed. Optionally beam 1025b crosses half a fixation location and exits the device through an opening 1034 is front wall 1000b. In the exemplary embodiment, from the time beam 1025a enters the device until the beam 1025b leaves the device, the beam has crossed exactly 12 fixation locations.

In some embodiment, a system may include 1" optics and/or every fixation location may form a 1.5" square. For example, in such an embodiment the beam has traveled exactly 18 inches from when it enters the device until it exits. The use of modular discrete optical units and fixation locations optionally makes it easy to construct a device with an exact and/or reproducible path length. Furthermore, in some embodiments the device has a three dimensional path of 18 inches but only takes up a 4.5 by 4.5 inch area on an optical table and/or fits in a box sized 4.5 inches by 4.5 inches by 4.5 inches. For example this may be much easier to move and/or to carry than a traditional 2D breadboard with a similar path length.

Figure 11:
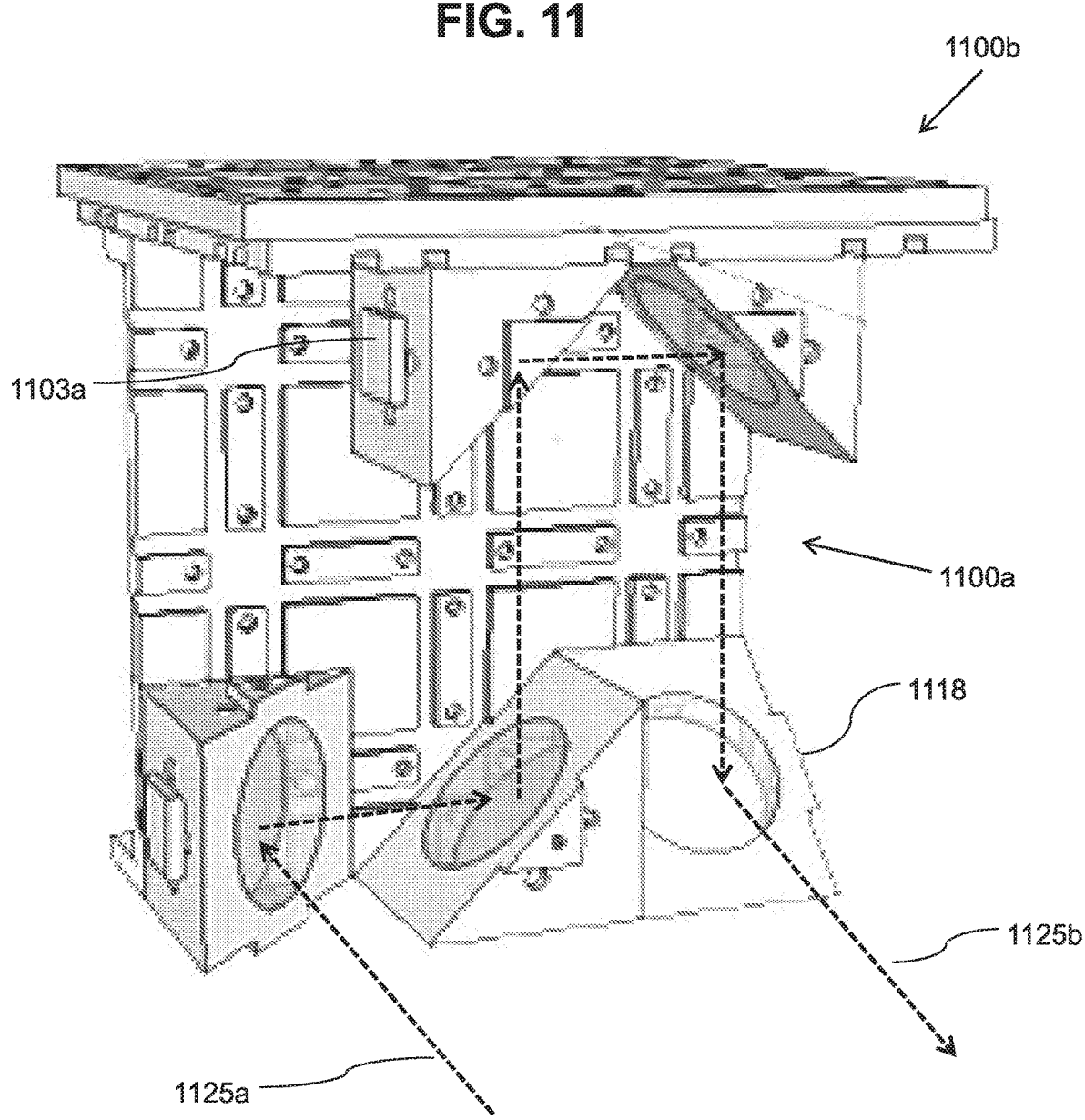
FIG. 11 is perspective drawings of an alternative polarization inverter built of modular units in accordance with an embodiment of the current invention.

FIG. 11 is perspective drawings of an alternative polarization inverter built of modular units in accordance with an embodiment of the current invention. In the exemplary embodiment, the device includes five mirrors 1118 mounted on two platforms 1100a and 1100b. For example, platform 1100a is a 3×3 rear wall and platform 1100b is a 1×3 ceiling. For example the device may have a foot print of three by one fixation locations and/or a path length of seven fixation locations. In the exemplary embodiment of FIG. 11, the exiting beam 1125b is parallel to the incoming beam 1125a and/or on a different line and/or of opposite direction and/or polarity.

In some embodiments a kit may include parts and/or instructions for building a device, for example a polarity reversing device. Alternately or additionally, a single kit may include parts for building more than one alternative device. For example a kit may include 6 mirrors and/or three 3×3 platforms and/or a 1×3 platform. The instructions may include various designs for polarity reversing devices of different foot prints, path lengths and/or input/output orientations (for example either in the geometry of the example of FIG. 10 and/or of FIG. 11.

Figure 12:
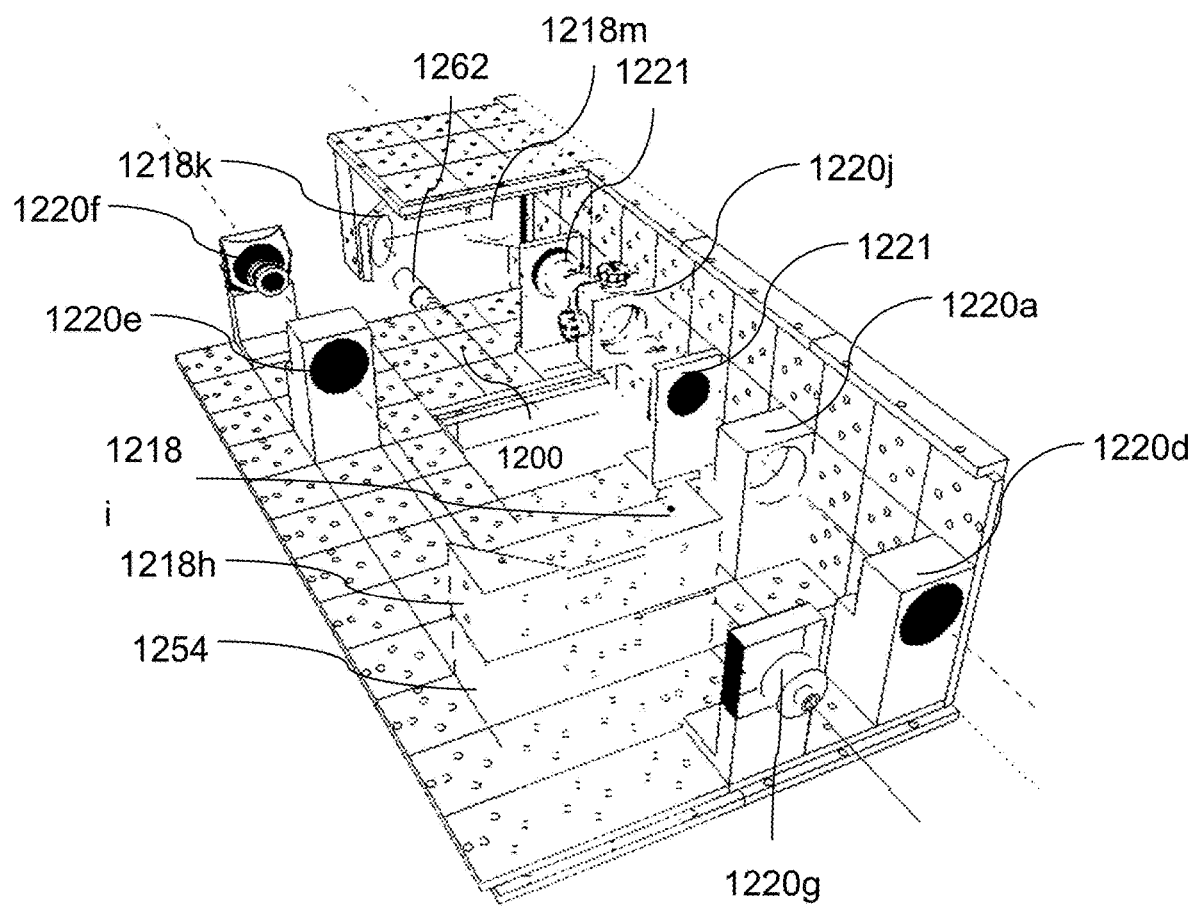
FIG. 12 is perspective drawings of a microscope built of modular units in accordance with an embodiment of the current invention.

FIG. 12 is perspective drawings of a microscope built of modular units in accordance with an embodiment of the current invention. In some embodiments, a device may include modular units of a height of two fixation locations (for example filter 1219a, lenses 1221, irises 1220d, 1220e, optical fiber mounts 1220f, and/or 1220g. Alternatively or additionally, a modular unit may be stacked on another unit, for example mirrors 1218h and 1218i are raised off a platform by block extenders 1254. Alternatively or additionally, a modular unit may be attached to a wall, for example sample holder 1220j. Alternatively or additionally, a modular unit may hang from a ceiling, for example mirrors 1218k and 1218m.

In some embodiments, a device may include a mechanically adjustable element, for example focusing stage 1200. For example, movement may be driven by a manual manipulator, for example screw knob 1262. Alternatively or movement may be driven by a motor and/or an actuator.

Multi-Layer Modular Optic System

FIGS. 13a-15 are schematic drawings of a multilayer optical devices built of modular units in accordance with an embodiments of the current invention.

Figure 13A:
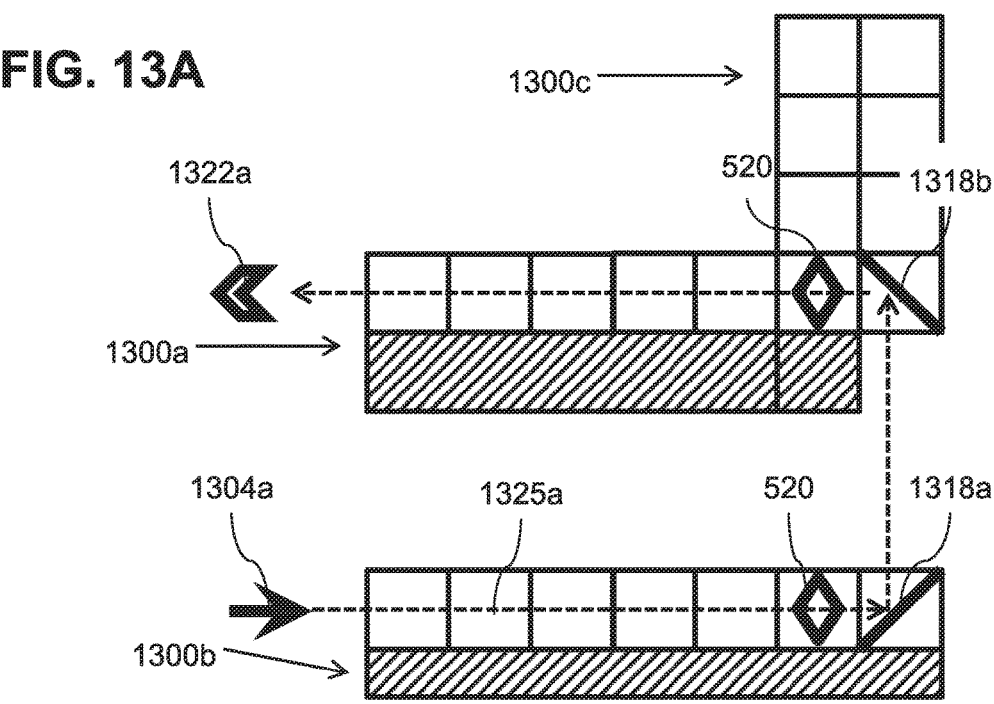
FIGS. 13A-13B are schematic drawings of a multilayer optical devices built of modular units in accordance with an embodiments of the current invention.

FIG. 13A illustrates transferring a beam from one base platform 1300b to another base platform 1300a via a mirror 1318b attached to a fixation location on a wall platform 1300c in accordance with an embodiment of the current invention. For example a beam 1325a enters at 3104a, passes through an element 520 and is transferred by a mirror 1318a upwards. The beam hits an overhanging mirror 1318b attached to wall platform 1300c beyond an edge of a second story base platform 1300b. The beam is optionally reflected from mirror 1318b along platform 1300b, across an element 520 and out an exit 1322a.

Figure 13B:
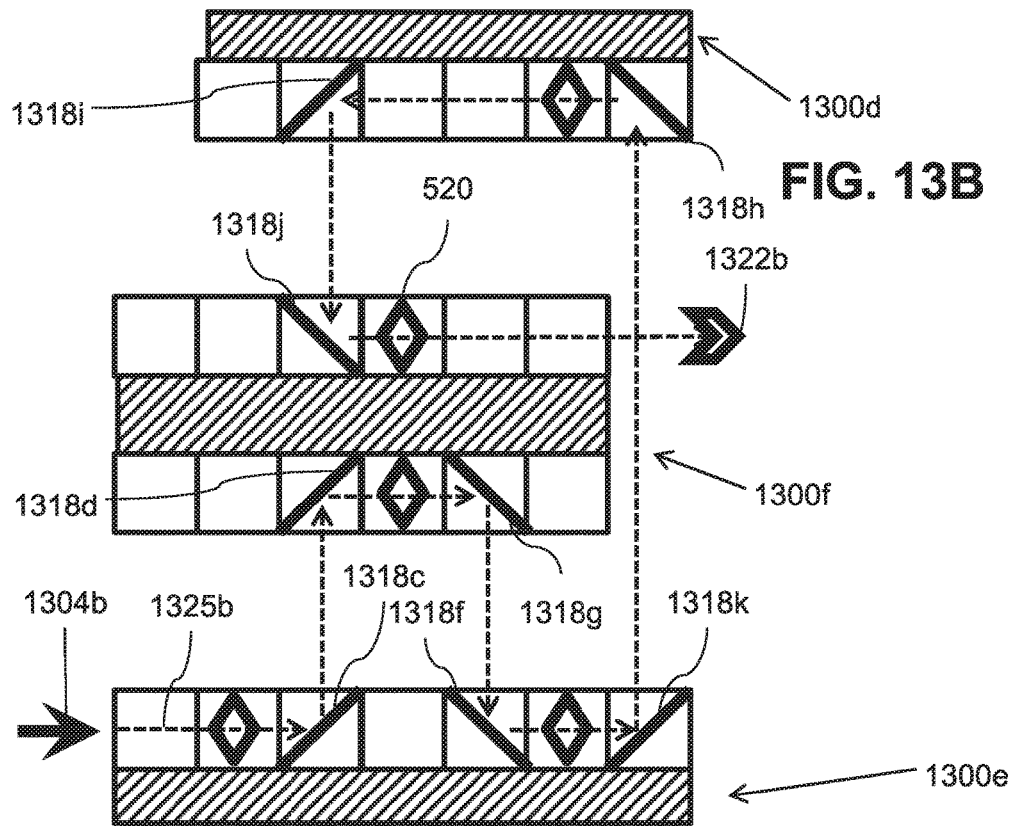

FIG. 13B illustrates transferring a beam from one base platform 1300e to another base platform 1300f via a mirror 1318k attached to a fixation location on a ceiling platform 1300*d* in accordance with an embodiment of the current invention. Optionally a platform 1300*f* may have the thickness of a whole number of fixation locations and/or have two faces for mounting modular optical units on opposite sides of the platform 1300*e*.

In some embodiments, a beam 1325*b* enters at 3104*b*, passes through an element 520 and is transferred by a mirror 1318*c* upwards. The beam optionally then hits a mirror 1318*d* attached to ceiling on a bottom face of platform 1300*f*. The beam is optionally reflected from mirror 1318*d* along a ceiling on a bottom face of a second story platform 1300*f*, across an element 520 and to another mirror 1318*g* which optionally transfers the beam back down to another mirror 1318*f* on base platform 1300*e*. For example mirror 1318*f* reflects the beam along base platform 1300*e* across an optical element 520 to a mirror 1318*k* attached to base platform 1300*e* and/or underhanging beyond an edge of platform 1300*f*. Optionally mirror 1318*k* reflects the beam upward to a mirror overhanging beyond an edge of second story platform 1300*f*. Mirror 1318*h* optionally reflects the beam along ceiling platform 1300*d* across and optical element 520 and to a mirror 1318*i*. Optionally, mirror 1318*i* reflects the beam downward to a mirror 1318*j* attached to a top face of platform 1300*f*. Mirror 1318*j* optionally reflects the beam along the top face of platform 1300*f* across an optical element 520 and/or out an exit 1322*b*.

In some embodiment a thickness of a platform 1300*f* may be a whole number of fixation location lengths (for example one). Optionally, modular units connected to a bottom face (for example mirrors 1318*d* and 1318*f*) preserve a pattern of fixation locations along with modular units (for example mirror 1318*j*) attached to a top face of the platform 1300*f*. Alternatively or additionally a path traveling on either and/or both faces of platform 1300*f* may preserve a discrete length scale, for example similar to beams passing along a single platform the length of the path may be constrained to a finite number of discrete steps. Alternatively or addition, two platforms may be positioned back to back where the combined thickness is the length a whole number of fixation locations. The opposed faces may serve as a ceiling and a base and preserve a fixation location pattern and/or retain a discretized path length.

Figure 14:
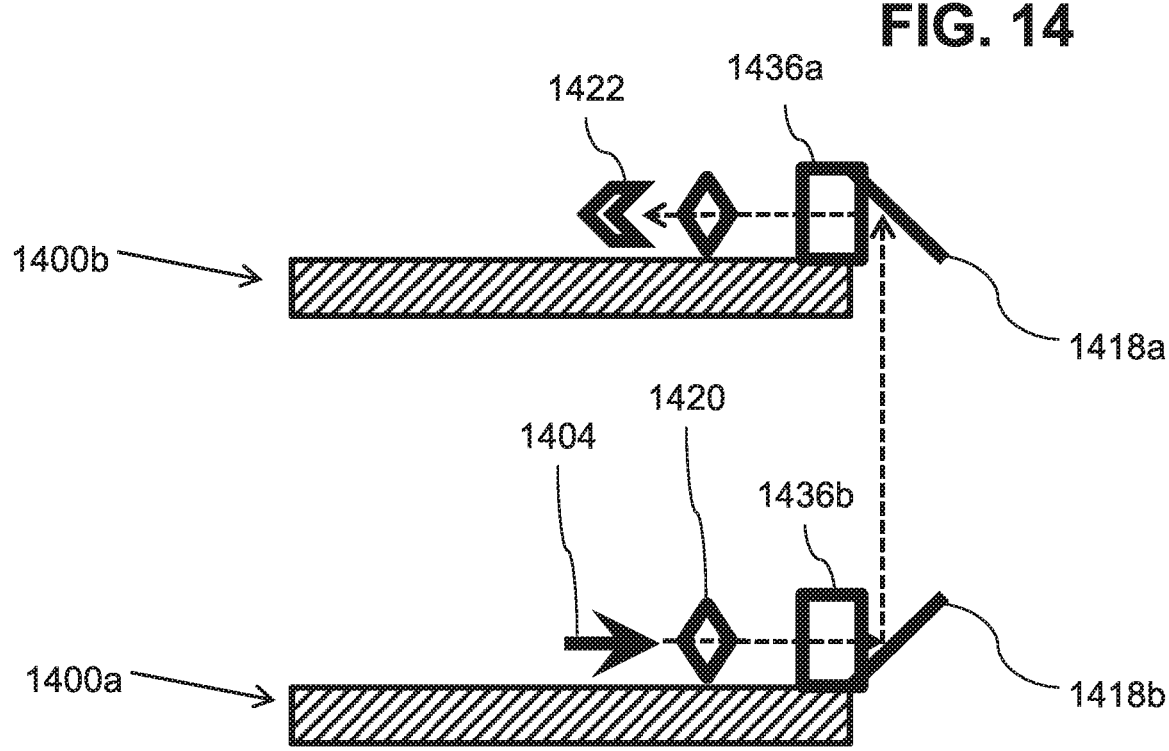
FIG. 14 is a schematic drawing of a multilayer optical devices built of modular units in accordance with an embodiments of the current invention.

FIG. 14 illustrates transferring a beam from one base platform 1400*a* to another base platform 1400*b* via overhanging mirrors 1418*a* and 1418*b* attached to the base platforms 1400*a* and/or 1400*b* via frames 1436*a* and/or 1436*b* in accordance with an embodiment of the current invention. For example a beam travels along platform 1400*a* across an optical element 1420, past an edge of platform 1500*c* and then contacts mirror 1418*a*. Optionally mirror 1418*b* reflects the beam up to a mirror 1418*a* which optionally is attached to and/or overhangs beyond a second story base platform 1418*b*. For example the beam is reflected along platform 600*b*, across element 1520 attached to platform 1418*b* and out an exit 1422.

Figure 15:
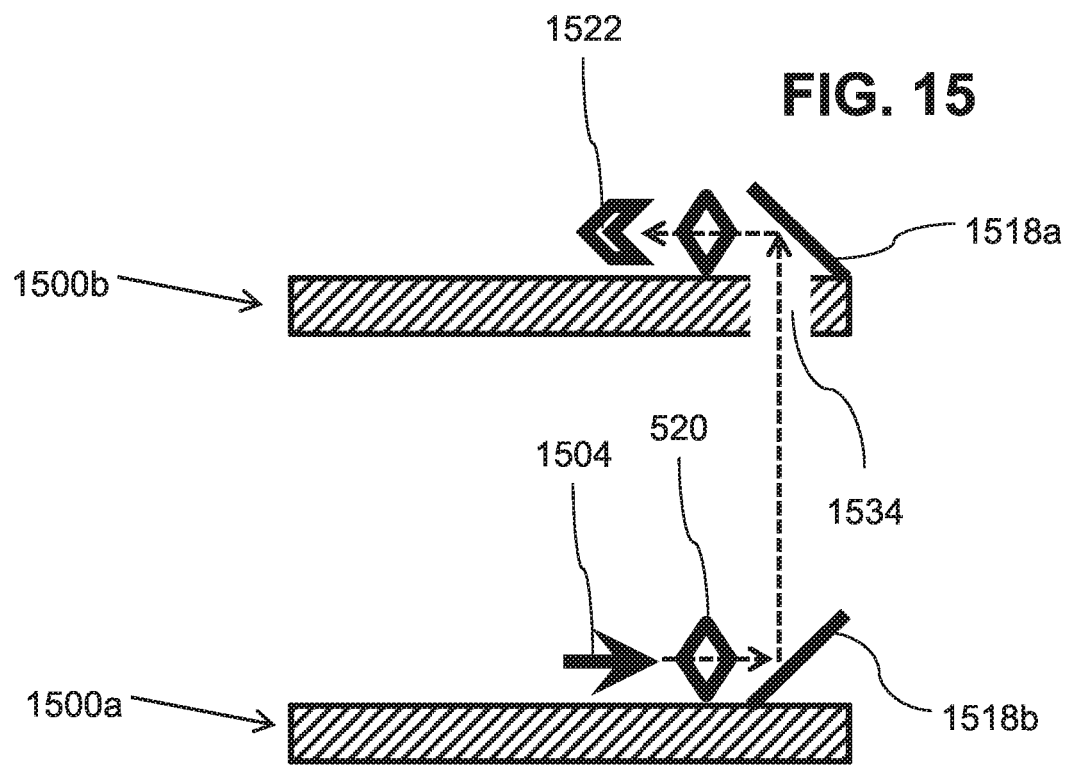
FIG. 15 is a schematic drawing of a multilayer optical devices built of modular units in accordance with an embodiments of the current invention.

FIG. 15 illustrates transferring a beam from a lower base platform 1500*a* to an upper base platform 1500*b* via an opening 1534 in the upper floor base platform 1500*b* in accordance with an embodiment of the current invention. For example a beam travels along platform 1500*a* across an optical element 520, and contacts mirror 1518*b*. Optionally mirror 1518*b* reflects the beam up through an opening 1534 in platform 1500*b* to a mirror 1518*b* which optionally is attached to platform 1500*b* and/or overhangs opening 1534. For example the beam is reflected along platform 1500*b*, across element 520 and out an exit 1522.

FIG. 16 is a perspective drawing of a front face of a board for mounting modular units in accordance with an embodiment of the current invention. In some embodiments a platform 1600 (including for example a flat board) may include fixation locations 802 arranged along a regular grid. For example, platform 1600 includes a three by three grid of locations. Optionally, connectors for modular optical units are positioned on only some of the grid points. For example, the top row and left column of platform 1600 include five fixation locations 802. Each fixation location optionally includes a connector for a modular optical unit. For example, a connector for a modular unit may include screw holes 924*c* and/or pin holes 924*d*. Alternatively or additionally, fixation locations may include a mounting hole 924*e*. For example, the mounting hole 924*e* may be used to connect to an optical table (for example as explained with reference to FIG. 9). Alternatively or additionally, some grid locations, for example the four lower right grid locations, may not include a connector for a modular optical unit. For example, the four lower right grid locations of platform 1600 include openings 1634. Optionally, openings 1634 may be used to pass a beam through the platform 1600. Alternatively or additionally, openings 1634 may be used for manual access to parts in a box and/or to pass a power cord through platform 1600 for example to power an elector mechanical part of the device.

In some embodiments, a platform may include an attachment interface. For example, an attachment interface may include a flange 1630. Flange 1630, is optionally used to attach platform 1600 to another platform. Optionally flange 1630 includes side mounting screw holes 1624. For example, when a rear face of the board is supported on a table, a wall platform may be attached to flange 1630 with screws entering holes 1624 from back of the wall on the side of the box. Optionally, inserting the screws from the side facilitates construction of a box with platform 1600 as a base while platform 1600 remains stationary and/or lying on the support surface.

Figure 17B:
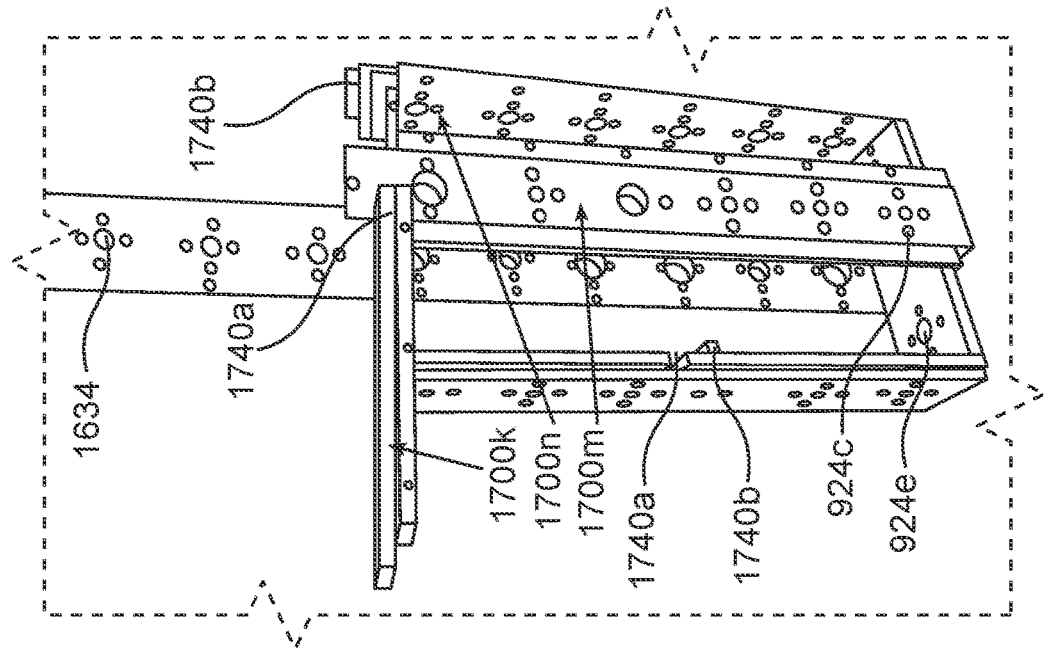
FIGS. 17A-17B are photographs of multi-layer structures for mounting modular units in accordance with an embodiment of the current invention.
Figure 17A:
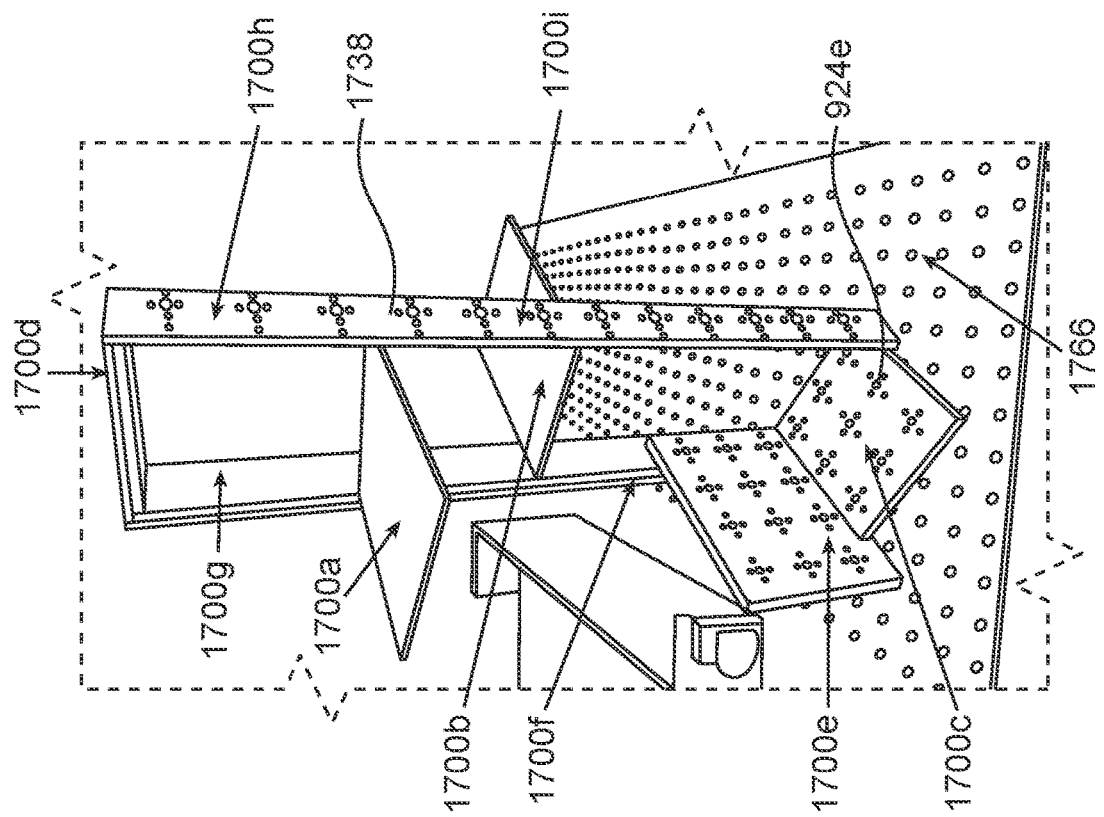

FIGS. 17A-17B are photographs of multi-layer stand for mounting modular units in accordance with an embodiment of the current invention.

For example, a stand is illustrated in FIG. 17A. A stand optionally includes a plurality of platforms 1700*a*, 1700*b*, 1700*c*, 1700*d*, 1700*e*, 1700*f*, 1700*g*, 1700*h*, 1700*i*, 1700*j*. The stand is shown, optionally supported on but not aligned to and/or not attached to an optical table 1766.

Optionally, the stand may be attached to and/or aligned with the optical table. For example, screws could be put through holes 924*e* into holes in optical table 1766.

In some embodiments a stand may include walls. For example, wall may include of set of connected 1×3 platforms including for example platforms 1700*i*, 1700*h*, 1700*f*, 1700*g*. In some locations a wall may project outward, for example, a 3×3 platform 1700*e*. In some embodiments, a ceiling may be formed having a face for mounting modular optical units facing downward. For example, the downward facing face of the ceiling may be aligned with fixation locations on a wall. For example, the 3×1 platform 1700*d* forms a ceiling. For example, the downward face of platform 1700*d* is aligned with fixation locations on walls 1700*g* and/or 1700*h*. In some embodiments, a platform may be supported on a base sitting on a surface (for example platform 1700*c* is supported for example on table 1766). A base may project at a higher level. For example, platforms 1700*a* and/or 1700*b* are base platforms with an upper surface vertically aligned to fixation locations on walls 1700*g*, 1700*h* and 1700*i*.

FIG. 17B illustrated an exemplary stand. In some embodiments, a wall may include one or more attachment interfaces, for example, attachment interfaces may facilitate connection to a base and/or a ceiling. For example, a slit 1740a and/or a flange 1740b may support a base platform and/or a ceiling platform. For example slit 1740a in platform 1700m and flange 1700b in platform 1700n support platform 1700k.

Figure 17C:
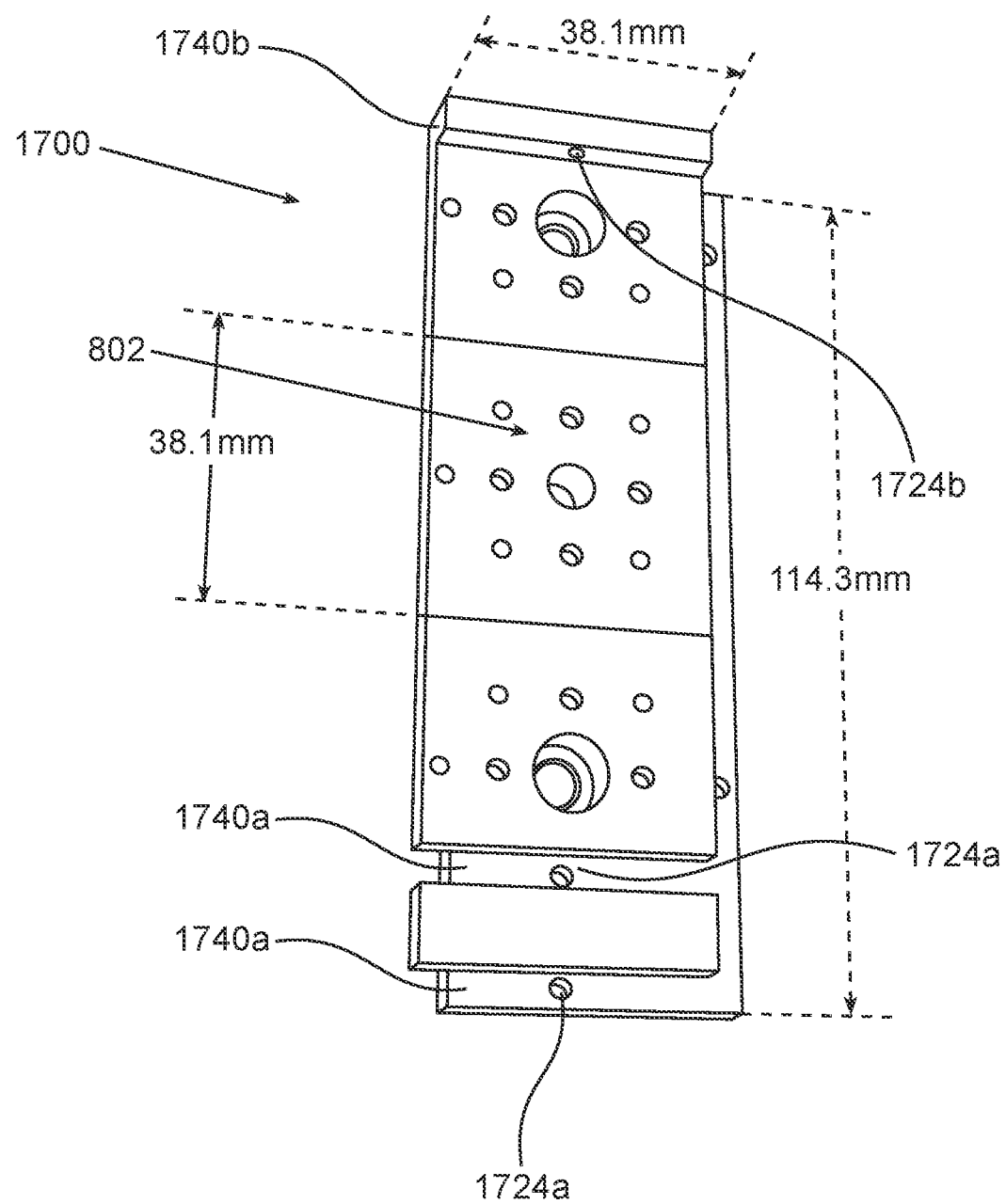
FIGS. 17C-17D are drawings of multi-layer structures for mounting modular units in accordance with an embodiment of the current invention.

FIG. 17C is a drawing of a 1×3 platform 1700o in accordance with an embodiment of the current invention. For example, platform 1700o includes three fixation locations and/or connectors 802 for attachment to modular optical units. Optionally, platform 1700o includes attachment interfaces for orthogonal attachment of platform 1700o to other platforms, for example a flange 1740b and a slit 1740a. Optionally screw holes 1724a are included through the sides of slits 1740a, for example to lock platforms together. Optionally screw holes 1724b are included through an inner surface of flange 1740b, for example to lock platforms together. For example, a screw may be inserted into hole 1724b from an inner face of a platform. For example, inserting a screw from an inner face may facilitate screwing together platforms even when an outer surface is obscured, for example by being placed on a table.

Figure 17D:
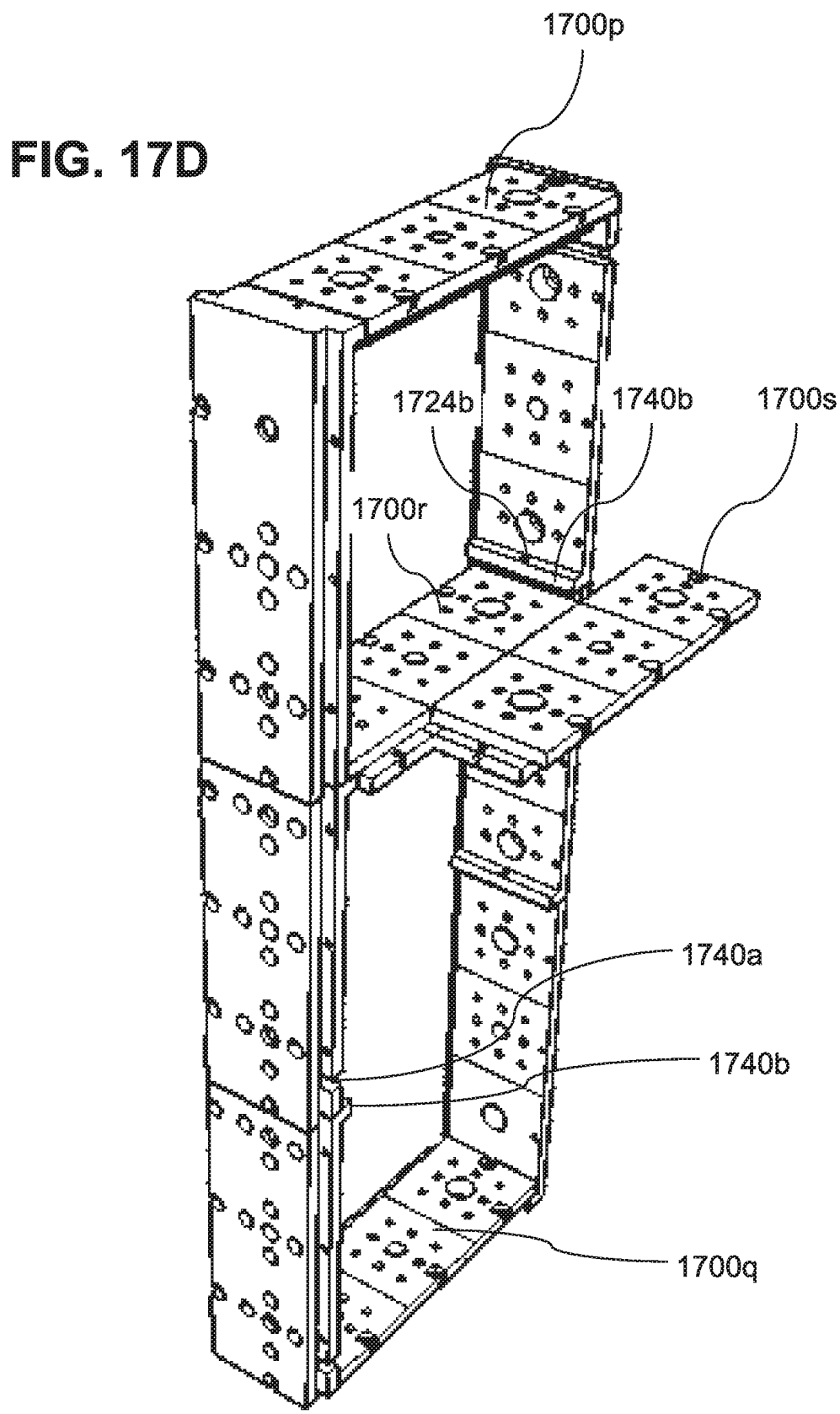

FIG. 17D is a drawing illustrating a stand including a ceiling platform 1700p, a bottom base platform 1700q, an intermediate base platform 1700r and/or a projecting base platform 1700s in accordance with an embodiment of the current invention.

Alternative Fixation Location Geometries

Figure 18:
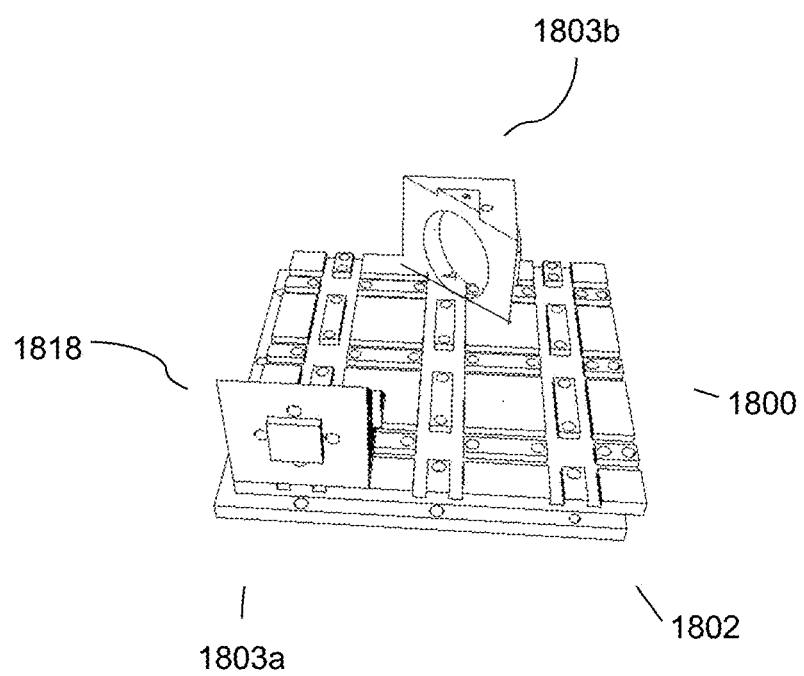
FIG. 18 is a perspective drawing of a modular unit with connectors for attaching to fixation locations in accordance with embodiments of the current invention.

FIG. 18 is a perspective drawing of connectors for attaching square and triangular faces of a modular mirror 1818 to fixation locations in accordance with an embodiment of the current invention. For example a connector 1802 at a fixation location on a platform 1800 may include a square female component and/or 4 screw holes. A square face 1803a of the modular mirror 1818 optionally includes a square male component and/or 4 screw holes. A triangular face 1803b of the modular mirror 1818 optionally includes a triangular male component and/or 2 screw holes. Optionally, the location of the center of mirror is invariant to rotation and/or which face is attached to the fixation location. For example, the center of the mirror is always centered with regard to the fixation location. Optionally other types of modular optical units may be supplied with square and/or triangular faces of the same type.

Figure 19:
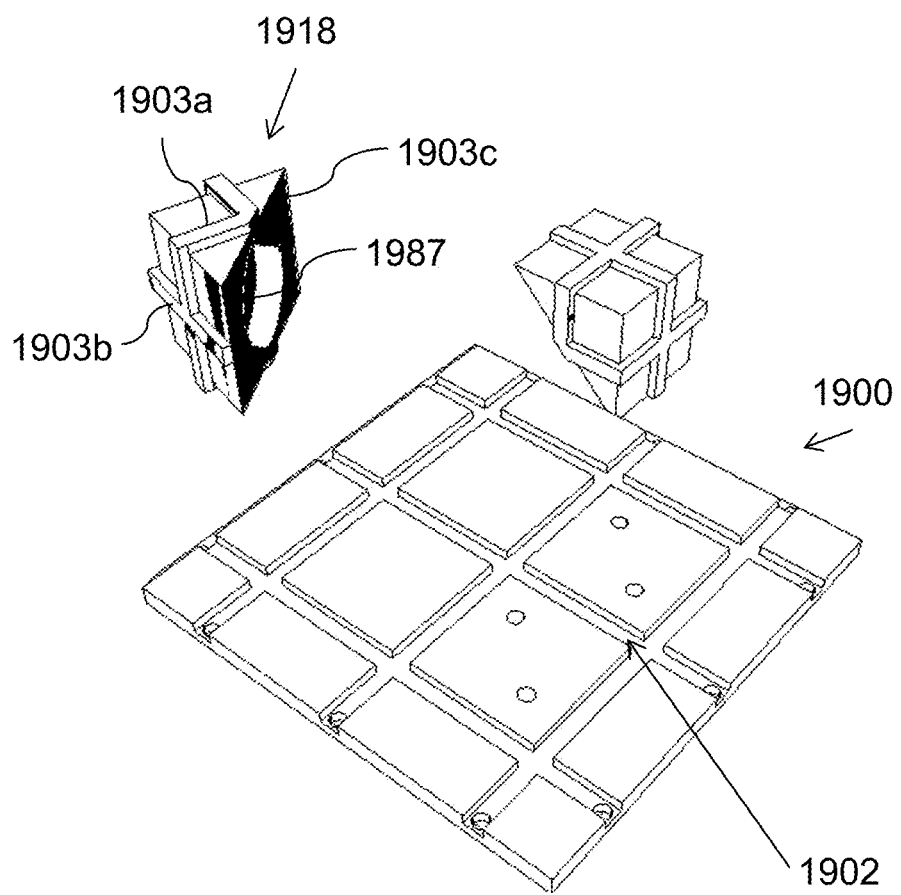
FIG. 19 is a perspective drawing of a modular unit with connectors for attaching to fixation locations in accordance with embodiments of the current invention.

FIG. 19 is a perspective drawing of connectors for attaching square and triangular faces of a prismatic modular unit 1918 to fixation locations in accordance with an embodiment of the current invention.

In some embodiments an optical unit may include an angled face 1903c. Optionally, face 1903c is at a non-square angle to at least one mounting surface (for example face 1903b) of the optical unit. For example, the non-square angle may be 45 degrees. Alternatively or additionally, the non-square angle may range between 25 to 75 degrees. Optionally the prismatic unit 1918 may include a second mounting surface (for example on a face 1903a). Optionally, angled face 1903a is perpendicular to the second mounting surface (e.g. on face 1903a). Optionally, an optical element 1987 is mounted on the angled face 1903c of unit 1918. For example the optical element 1987 may include a mirror.

In some embodiments, unit 1918 is a right triangular prism. Optionally the angled face of the prism may be perpendicular a triangular base of the prism (for example face 1903a). Optionally the angled face of the prism may be at an angle ranging between 25 to 75 degrees (for example 45 degrees) to a lateral side of the prism (for example face 1903b). Alternatively or additionally, a prismatic unit may a shape other than a right triangular prism.

In some embodiments, a connector 1902 at a fixation location on a platform 1900 may include crisscrossing tracks and two screw holes. Square face 1903a of the modular unit 1918 optionally includes a cross male component. Triangular face 1903b of the modular unit 1918 optionally includes a 90 degree angled male component. Optionally, the location of the center of optical element 1987 is invariant to rotation and/or which face is attached to the fixation location. For example, the center of the element 1987 is centered with regard to the fixation location when either face 1903a, 1903b is attached to the fixation location. Optionally, other types of modular optical units may be supplied with a prismatic unit. Optionally other types of connectors may be used to connect a prismatic unit to a platform.

Figure 20:
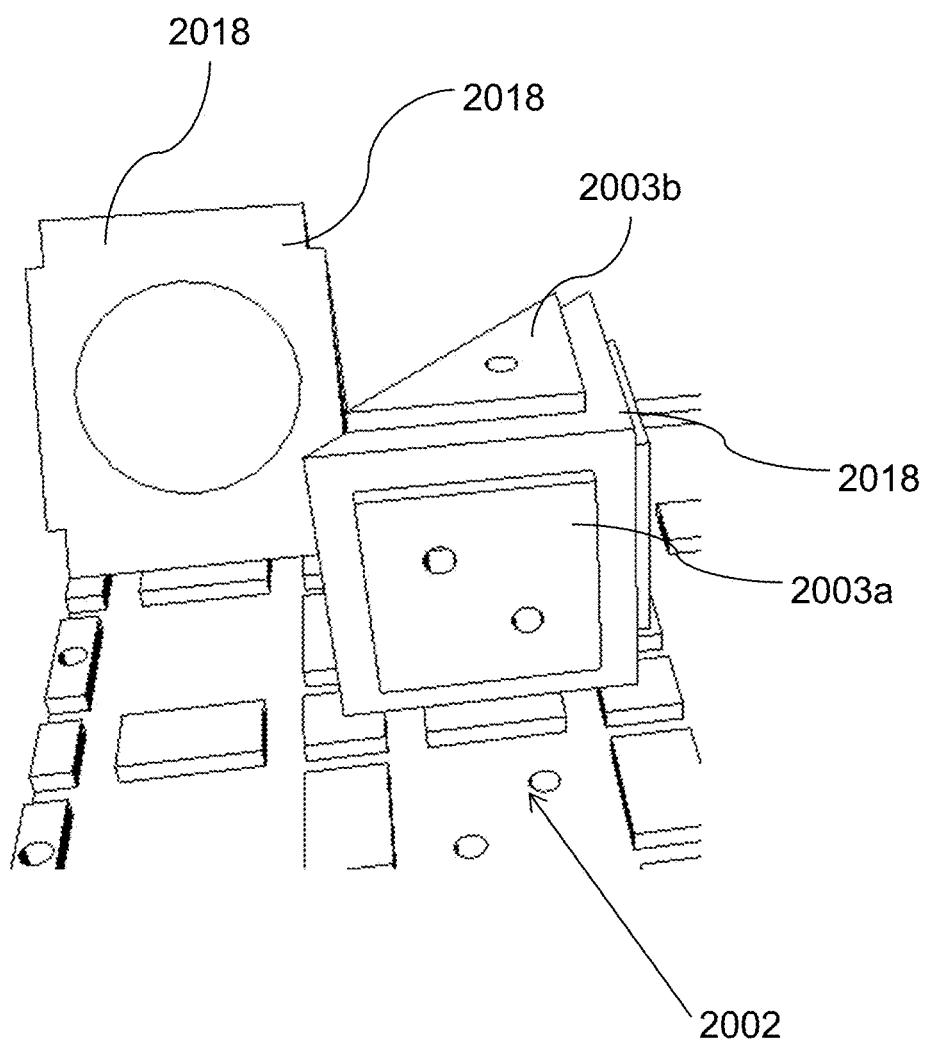
FIG. 20 is a perspective drawing of a modular unit with connectors for attaching to fixation locations in accordance with embodiments of the current invention.

FIG. 20 is a perspective drawing of connectors for attaching square and triangular faces of a modular mirror 2018 to fixation locations in accordance with an embodiment of the current invention. For example a connector 2002 at a fixation location on a platform 2000 may include a square female component and/or 2 screw holes. A square face 2003a of the modular mirror 2018 optionally includes a square male component and/or 2 screw holes. A triangular face 2003b of the modular mirror 2018 optionally includes a triangular male component and/or 1 screw holes. Optionally, the location of the center of mirror is invariant to rotation and/or which face is attached to the fixation location. For example, the center of the mirror is always centered with regard to the fixation location. Optionally other types of modular optical units may be supplied with square and/or triangular faces of the same type.

Figure 21:
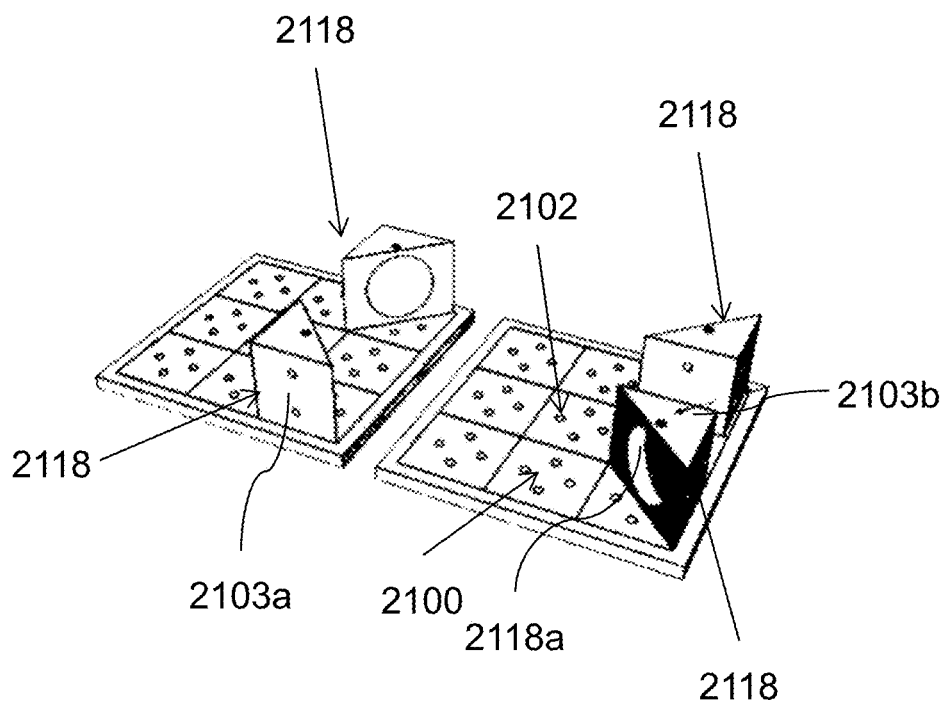
FIG. 21 is a perspective drawing of a modular unit with connectors for attaching to fixation locations in accordance with embodiments of the current invention.

FIG. 21 is a perspective drawing of connectors for attaching square and triangular faces of a modular mirror 2118 to fixation locations in accordance with an embodiment of the current invention. For example a connector 2102 at a fixation location on a platform 2100 may include 2 screw holes. A square face 2103a of the modular mirror 2118 optionally includes 2 screw holes. A triangular face 2103b of the modular mirror 2118 optionally includes 1 screw hole. Optionally, the location of the center of mirror is invariant to rotation and/or which face is attached to the fixation location. For example, the center of the mirror is always centered with regard to the fixation location. Optionally other types of modular optical units may be supplied with square and/or triangular faces of the same type.

Exemplary Modular Optical Units

Reference is now made to FIGS. 22a-26B illustrating in a way of example, some of the basic units, configurations and modular optical units which may be used with the optical set up described herein. Each unit would now be given a brief description. It is important to note that these are only a few examples of a variety of optical and mechanical components that can be incorporated in the modular design disclosed in the present invention.

FIGS. 22A and 22B are perspective drawings of fixed mirrors in accordance with embodiments of the current invention. For example, modular unit 2218a includes a 1 inch mirror mounted to a 1.5 inch frame. Optionally the mirror is centered with respect to the frame of unit 2218a. For example, modular unit 2218b includes multiple optical units in a single modular unit. For example, two ½ inch mirrors mounted to a 1.5 inch frame. Optionally the mirrors are not centered with respect to the mounting of unit 2218b. Others numbers and/or configurations of multi-optical-units are possible on a modular unit in embodiments of the current invention. In some multi-unit units, the pattern of the optical elements may be symmetric across certain planes and/or invariant to certain rotations.

In some embodiments, a basic modular optical unit is a protected mirror. In some embodiments, the optical element is in a triangle configuration. Optionally the protected mirror is non-dispersive, and/or configurable, and/or compact and/or broad (for example, spanning at a bandwidth between about 400 nm and about 25000 nm). Optionally such a protected mirror is suitable for ultrashort pulses and/or broadband light alignment.

Figure 23A:
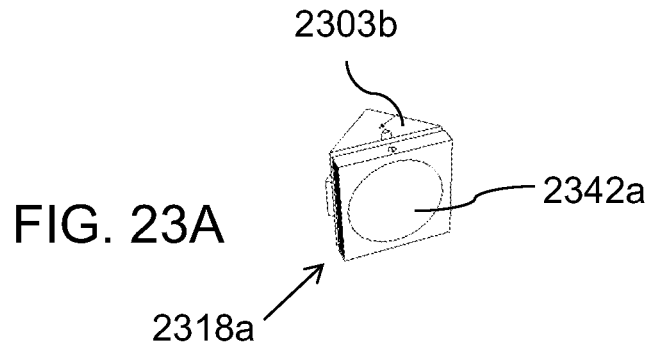
FIGS. 23A-23C are perspective views of an adjustable mirrors in accordance with embodiments of the current invention.
Figure 23B:
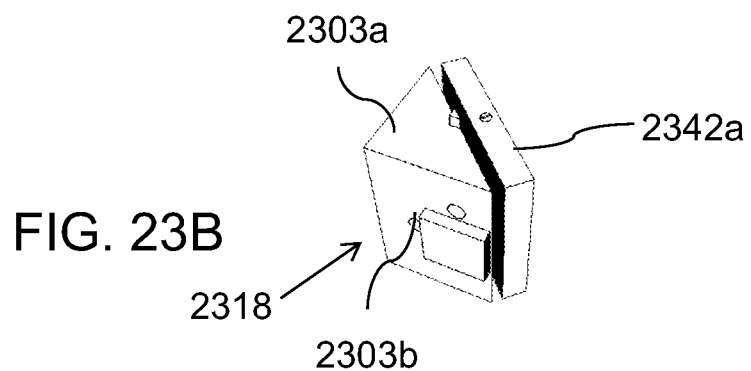

FIGS. 23A and 23B are perspective drawings of adjustable mirrors in accordance with embodiments of the current invention. For example a 1 inch mirror mount 2342a is movably connected to a prismatic unit 2318a (for example a right Triangle (45°-45°-90°) shape of prism) with a square attachment face 2303a and/or a triangular attachment face 2303b. Optionally, the angle of the mirror may be adjusted by moving the mirror mount 2342a with respect to the attachment faces 2303a and 2303b.

Figure 23C:
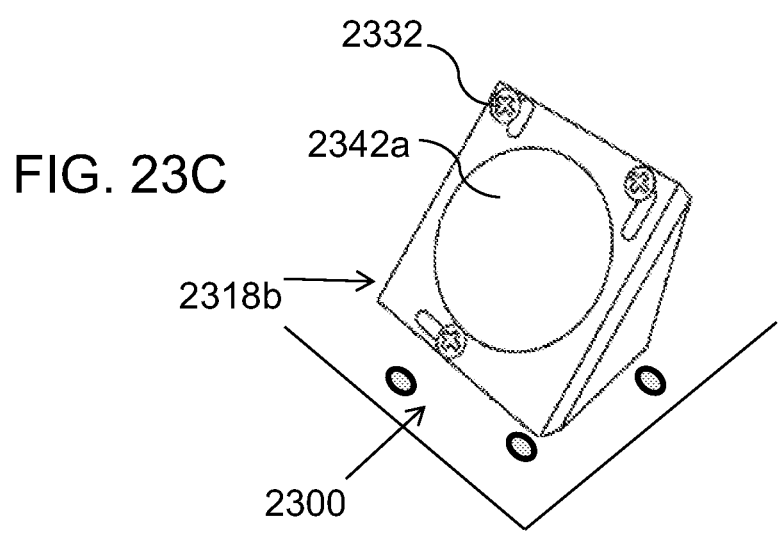

FIG. 23C is a photograph of an adjustable mirror in accordance with embodiments of the current invention. Optionally, the unit allows degrees of freedom into a reinforced structure and/or a tunable triangle mirror. For example a 1 inch mirror mount 2342b is movable connected to a prismatic unit 2318b with a square attachment face and/or a triangular attachment face. For example the attachment faces may be configured for attachment to a fixation location. Optionally, the angle of the mirror may be adjusted by moving the mirror mount 2342a with respect to the attachment faces 2303a and 2303b by means of screws 2332. Unit 2318b is shown connected to an exemplary platform 2300.

Alternatively or additionally, a modular optical unit comprises a build-in delay line, and/or beam splitter, and/or filter and/or acoustic optic modulator.

Figure 24A:
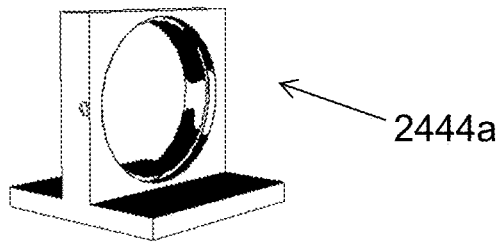
FIGS. 24A-24C are perspective drawings of optical units in accordance with embodiments of the current invention.
Figure 24B:
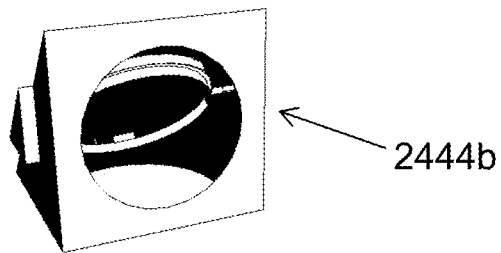
Figure 24C:
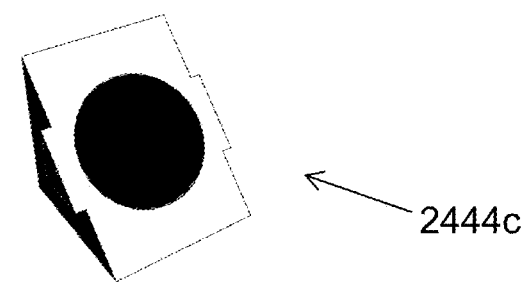

FIGS. 24A and 24C are perspective drawings of filters in accordance with embodiments of the current invention. For example, unit 2444a includes a filter on a base with a complimentary connector for a fixation location. For example, unit 2444b includes a dichroic filter on a prismatic base with a complimentary connector for a fixation location. For example, unit 2444c includes an end mirror on a prismatic base with a complimentary connector for a fixation location. In some embodiments, optical elements are standard (for example 1 inch disks). In some embodiments optical elements are reversible mounted to modular units. In some embodiments optical elements are permanently mounted to modular units.

Figure 25A:
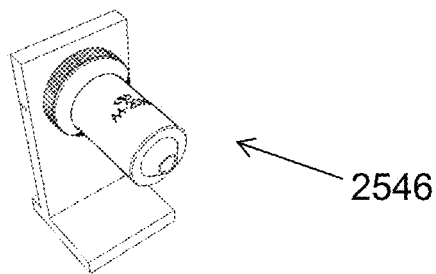
FIGS. 25A-25D are perspective drawings of modular units in accordance with embodiments of the current invention.
Figure 25B:
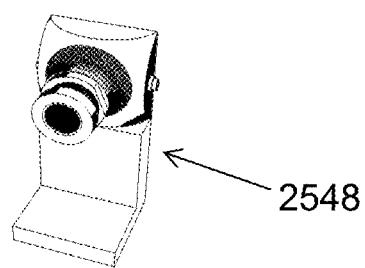
Figure 25C:
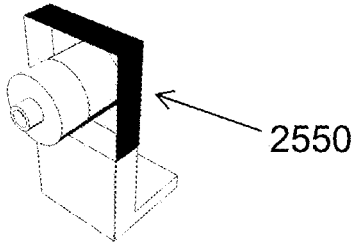
Figure 25D:
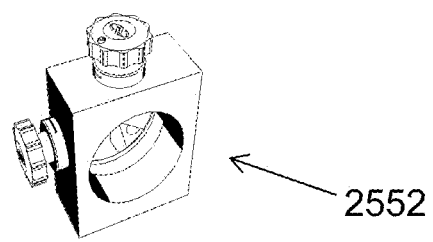

FIGS. 25A and 25D are perspective drawings of modular units in accordance with embodiments of the current invention. Optionally many commercial accessories, such as irises 2548, sample holders 2552 optionally including micrometers, objectives 2546 optical fiber modular units 2550 are mounted to modular units with complementary connectors for discrete connection to a fixation location. For example, modular units may hold a CCD camera, acoustics optic modulators, microscope objectives, crystal materials holder and other units.

Figure 26A:
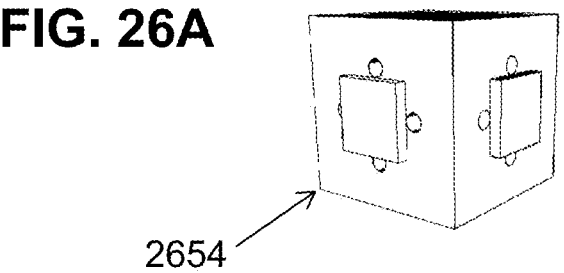
FIG. 26A-26B are perspective drawings of a modular units in accordance with embodiments of the current invention.
Figure 26B:
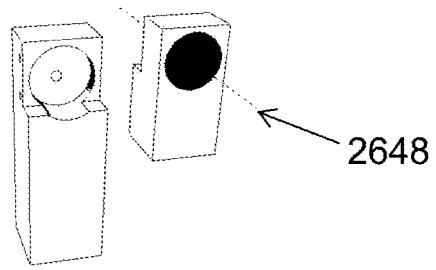

FIGS. 26A and 26B are perspective drawings of an extension block 2654 and modular units 2648 and 2650 in accordance with embodiments of the current invention. For example extension block 2654 may be used to raise a modular unit away from a fixation location. For example, the unit may be raised a distance equal to the size of the fixation unit and/or a multiple thereof. Optionally, a modular unit connected to the block extender may retain the discrete directional limitation of the fixation location.

Optical Kits

Figure 27:
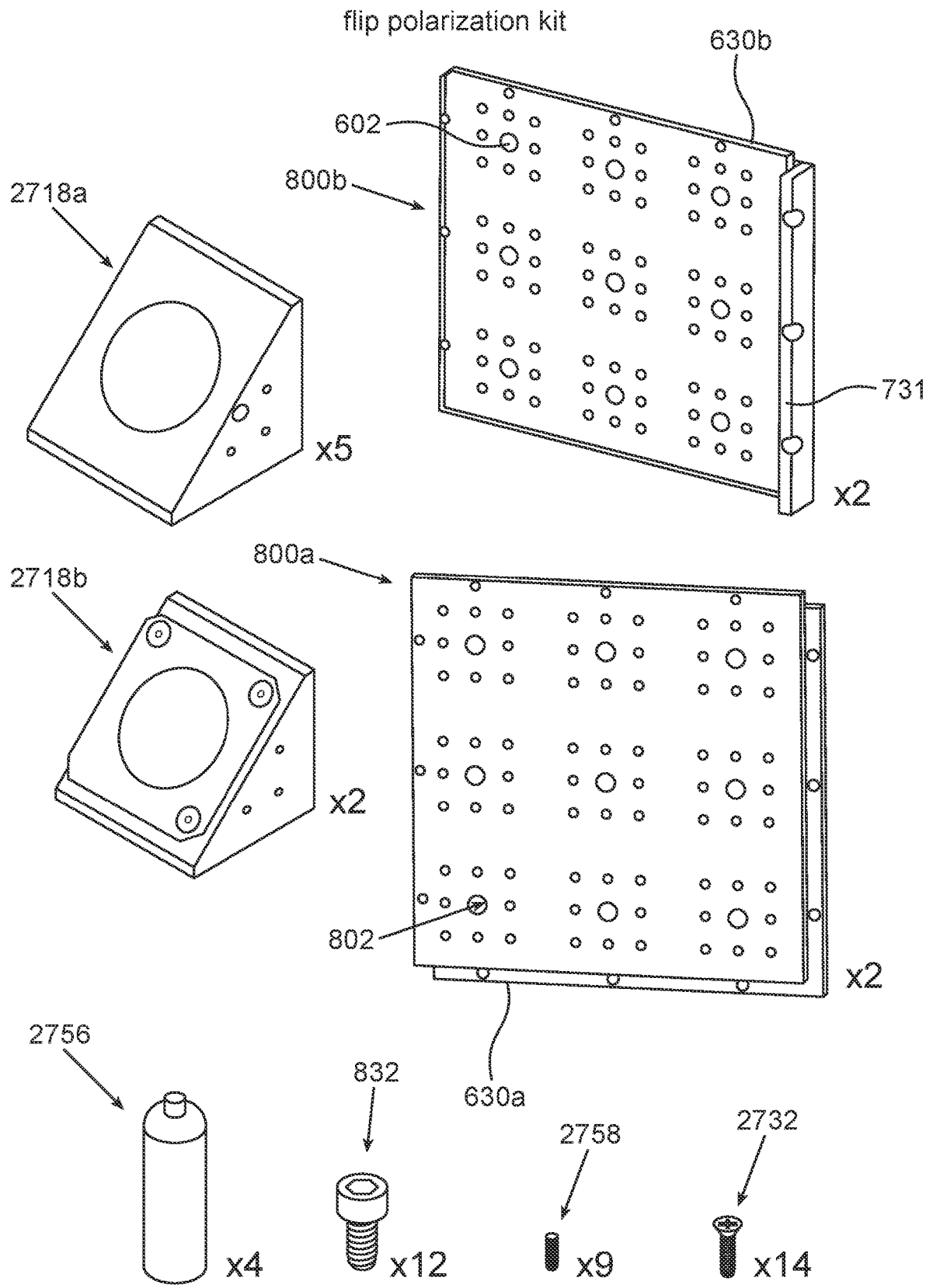
FIG. 27 is a parts list for a polarity reversing kit in accordance with an embodiment of the current invention.

FIG. 27 is a parts list for a polarity reversing kit in accordance with an embodiment of the current invention. For example a kit may contain five fixed mirror units 2718a, two adjustable mirror units 2618b, two 3×3 platforms 800b with interface for angled attachment to another platform, two 3×3 platforms 800a with interface in plane angled to an extension platform, 4 legs 2756, 12 attachment interface screws 832, nine pins 2758 and/or 14 modular optical unit mounting screws 2732.

Figure 28:
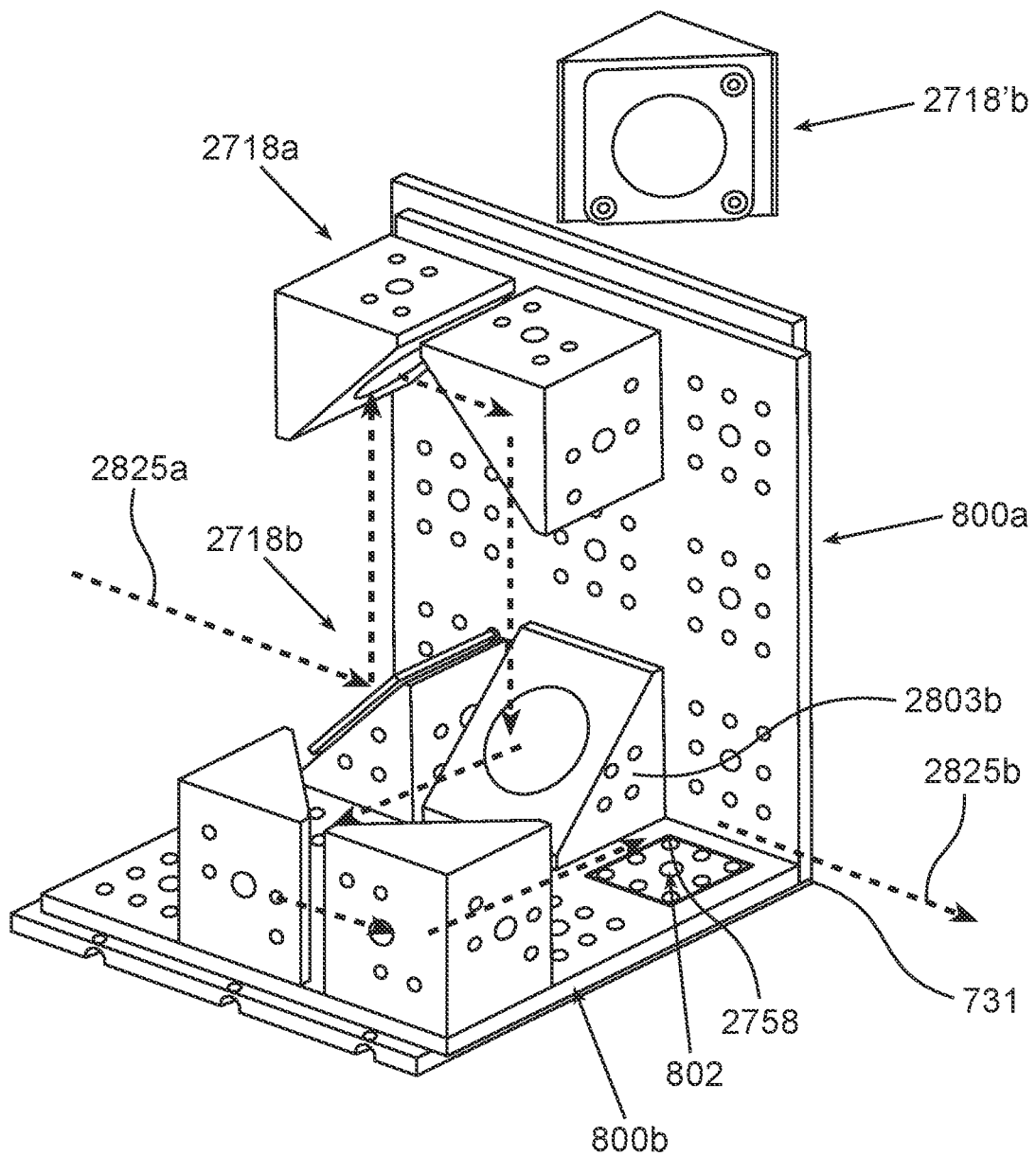
FIG. 28 is a perspective view of a polarity inversion kit and attaching a fixed mirror perpendicular to a base in accordance with an embodiment of the current invention.

FIG. 28 is a perspective view of a polarity reversing kit in accordance with an embodiment of the current invention. Optionally, instructions for the kit illustrate attaching a fixed mirror perpendicular to a base. Optionally, the device is assembled on two perpendicular platforms, for example platform 800a and 800b as illustrated in FIGS. 8A, 8B and 27. Optionally, the kit includes instructions for attaching mirrors 2718a, 2718b and 2718b' to the board as illustrated.

In some embodiments simple instructions illustrate how to assemble an optical device from modular units. Examples of instructions for assembling various (but not necessarily all) parts of a polarization reversal device are illustrated herein. An optional order of assembly of the exemplary FIGs. is as follows: assemble platforms 800a and 800b into two sides of a box as illustrated for example in FIGS. 8A and 8B; add an interface for an optical table (e.g. feet) for example as illustrated in FIG. 31; attach one by one modular optical units as illustrated for example in FIGS. 29A, 29B, 30A, 30B and 28; and add two more sides to the box, as illustrated for example in FIGS. 32A and 32B.

FIG. 28 illustrates attaching an adjustable mirror unit 2718b' to the box in accordance with an embodiment of the current invention. Optionally, instructions designate which face (e.g. a triangular face) of which modular optical unit (e.g. unit 2718b') to attach to which fixation location on the box (e.g. location 802 on platform 800b) and in which discrete direction (e.g. with the mirrored face of mirror unit 2718b' facing outward and rightward).

In some embodiments, instructions for positioning of a modular unit consist of designating a face of a finite number of attachment faces of the unit to be attached to a designated fixation location of the discrete locations on the platforms directed in a designated direction of the discrete possible directions of attachment. For example, by designating a discrete face, a discrete position and a discrete direction positioning of a modular unit, the optical axis of an optical element is entirely determined. Optionally, no calibration is necessary. For example, positioning of each mirror unit 2718a consists of placing the a designated face of the four attachment faces of a mirror unit 2718a onto a designated fixation location of the 18 discrete locations on the two platforms 800a and 800b directed in a designated direction of the four discrete possible directions of attachment.

In some embodiments, adjustable units, for example adjustable mirrors 2718b' and 2718b, are placed at the light entrance and light exit of the device. For example, the adjustable units allow the device to be calibrated according to incoming light which is optionally not limited to the discrete directions of the modular system.

In some embodiments, a designated fixation location is illustrated in an instruction manual. For example a location 802 for mirror unit 2718' is designated in FIG. 28 by a bright outline. The attachment face is designated, for example, by showing a triangular face of block 2718b' facing the designated location 802 with an arrow toward joining them. The designated direction is illustrated, for example in FIG. 28, by showing the mirrored face of mirror unit 2718b' facing outward and rightward with the face of the mirror vertical.

Figure 29A:
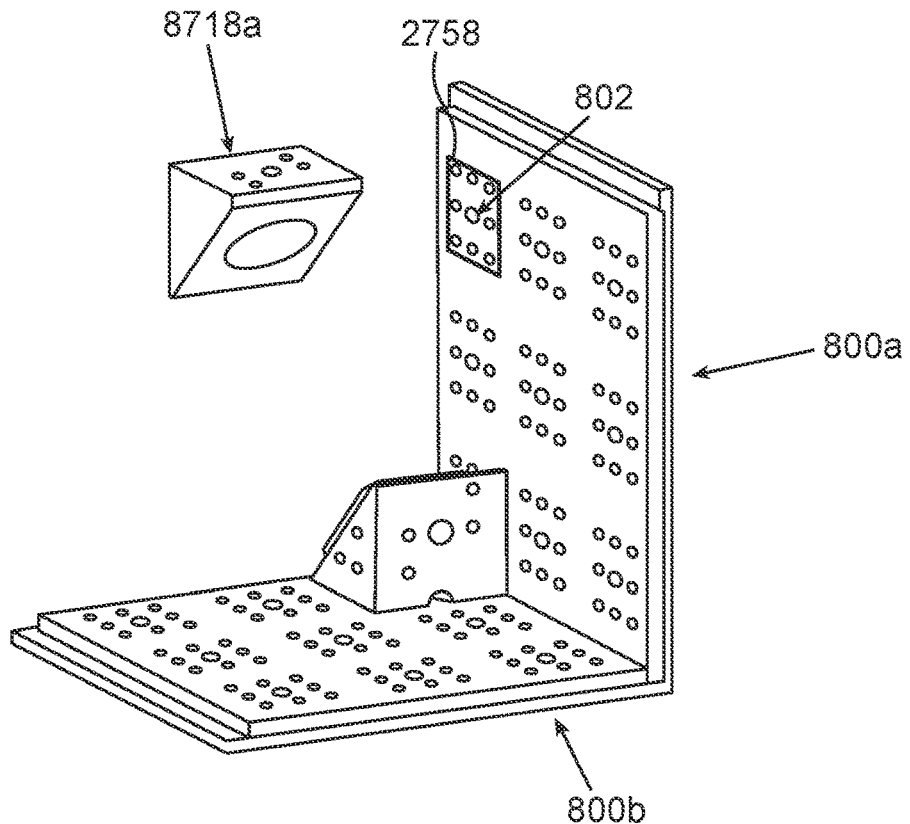
FIGS. 29A-29B are a perspective drawings of attaching a fixed mirror perpendicular to a wall in a polarity reversing kit in accordance with embodiments of the current invention.
Figure 29B:
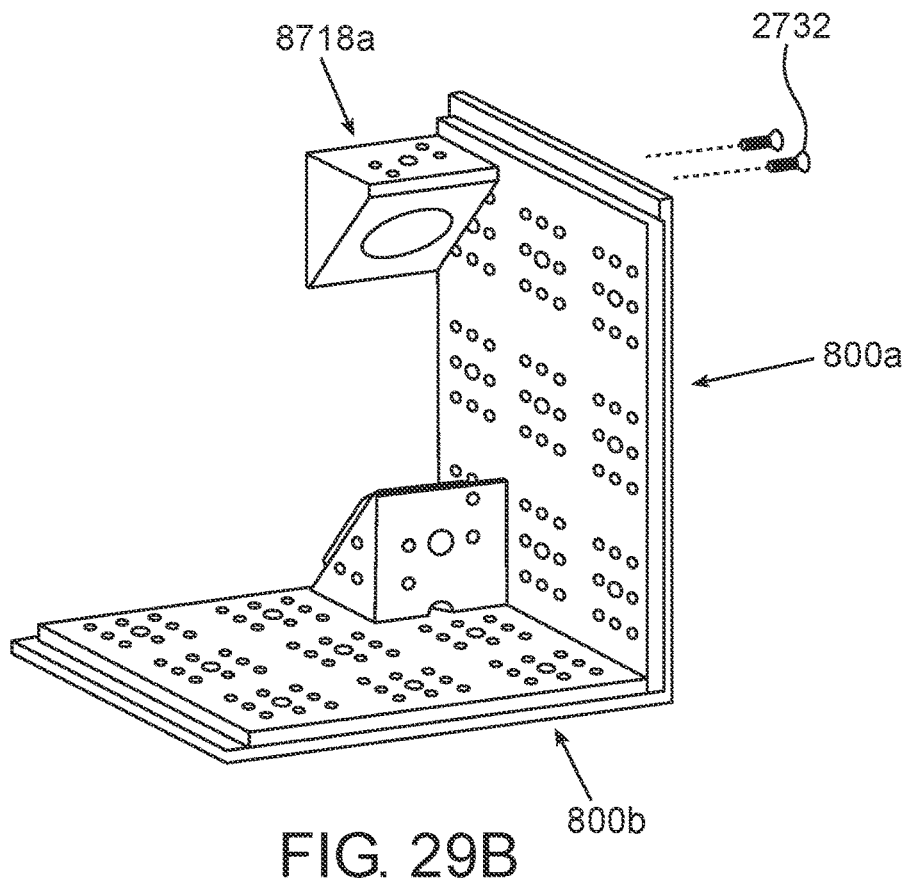

In some embodiments, the designated face of mirror unit 2718b' is optionally locked to the designated location 802 with one or more screws (for example two screws may be inserted from the bottom of platform 800b for example exactly analogous to inserting screws illustrated in FIG. 29B). In the exemplary embodiment, light output 2825b from the device is on the same line and direction as light input 2825a to the device (with possible adjustments using adjustable mirrors 2718b and 2718b') and with reversed polarity (for example due to the convoluted path through the device as illustrated by the dashed arrows in FIG. 28).

In some embodiments, connectors of multiple fixation locations and/or attachment faces of multiple modular optical units are inter compatible and/or exchangeable. For example, every attachment face of every modular unit 2718a, 2718b may be attached to any of the 18 attachment of locations of the embodiment illustrated in FIG. 28.

FIGS. 29A and 29B are perspective drawings of attaching a fixed mirror perpendicular to a wall in a polarity reversing kit in accordance with embodiments of the current invention. Optionally, the illustrated attachment of a triangular face of fixed mirror unit 2718a to wall platform 800a is exactly the same procedure as attachment of the triangular face of adjustable mirror unit 2718b' to base platform 800b as illustrated for example, in FIG. 28.

Figure 30A:
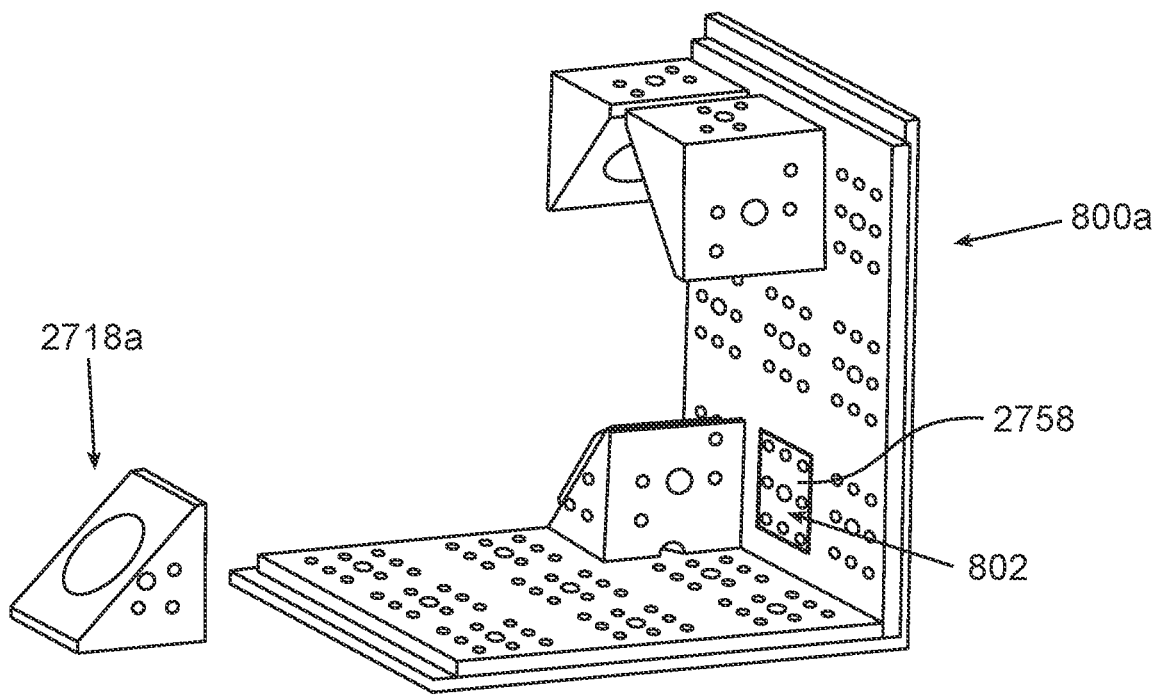
FIGS. 30A-30B are perspective drawings of attaching a fixed mirror at an angle to a wall in a polarity reversing kit in accordance with embodiments of the current invention.
Figure 30B:
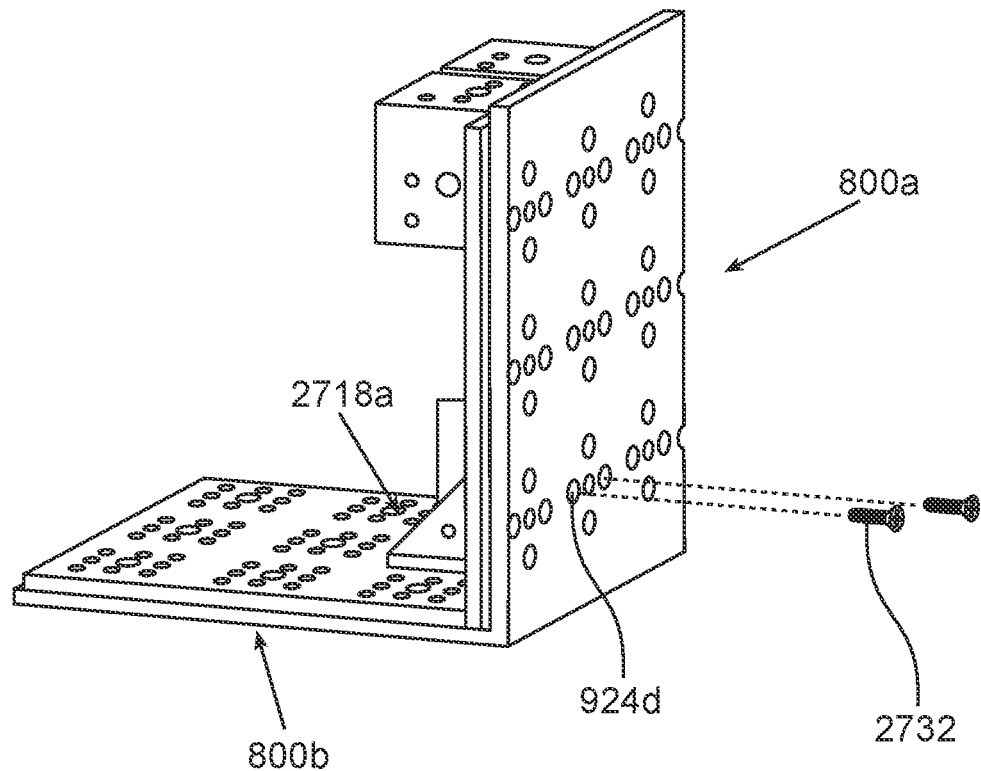
Figure 31:
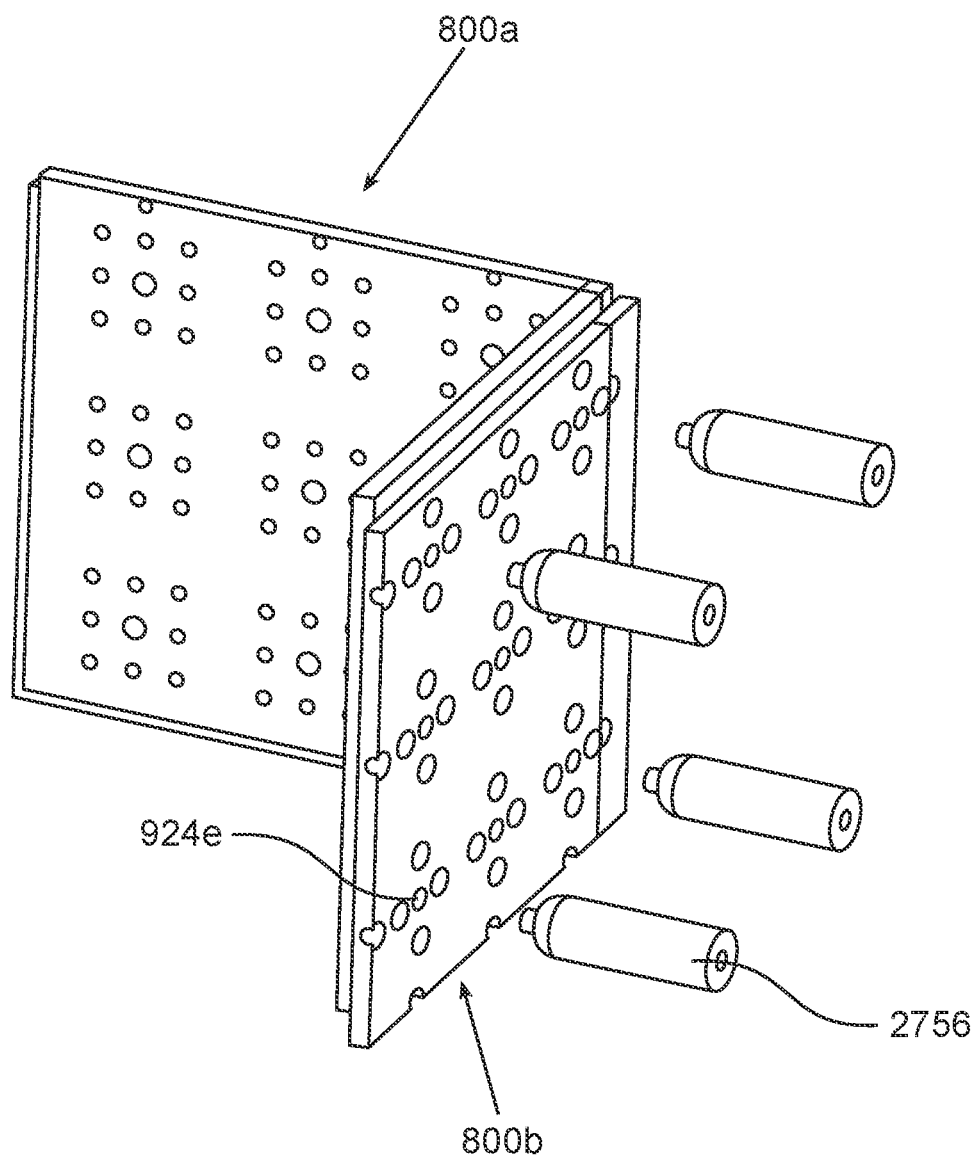
FIG. 31 is a perspective drawing of attaching feet to a polarity reversing kit in accordance with an embodiment of the current invention.
Figure 32A:
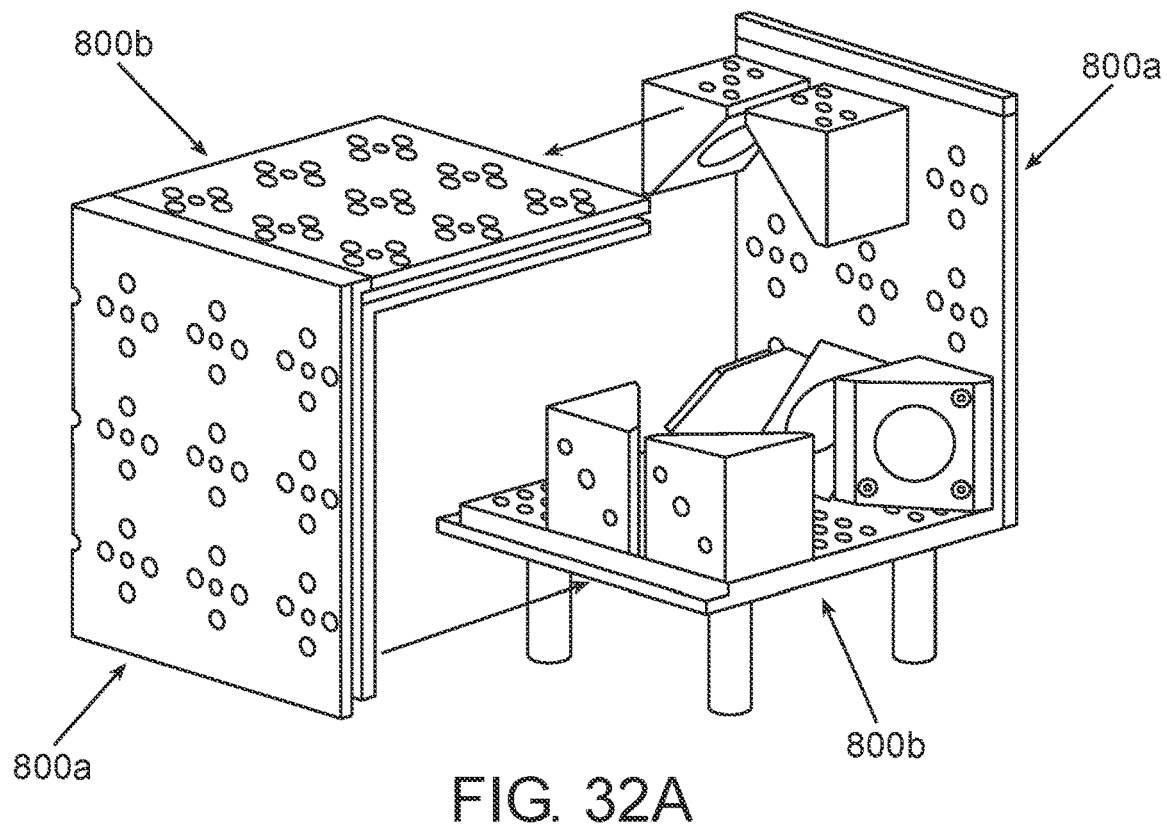
FIGS. 32A-32B are a perspective drawings of attaching further walls to a polarity reversing kit in accordance with an embodiment of the current invention.
Figure 32B:
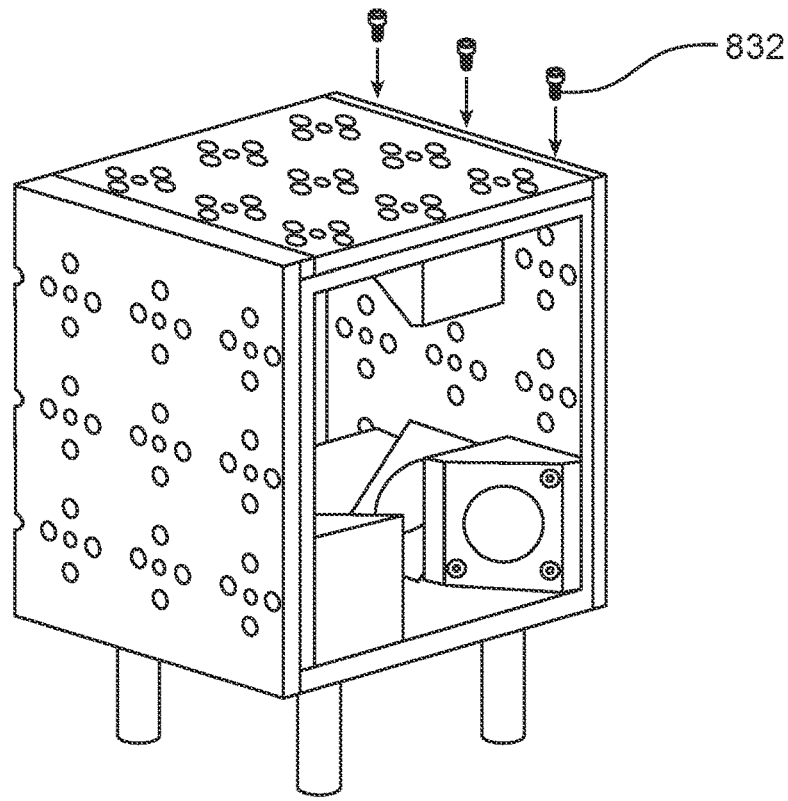

FIGS. 30A and 30B are perspective drawings of attaching a fixed mirror to a wall in a polarity reversing kit in accordance with embodiments of the current invention. For example, FIGS. 30A and/or 30B illustrated attaching a square face of a mirror unit 2718a to wall platform 800a with two pins 2758 and two screws 2732.

FIG. 31 is a perspective drawing of attaching feet 2756 to a polarity reversing kit in accordance with an embodiment of the current invention. Optionally feet 2756 are positioned, matching the positions of holes in a standard 1 inch optical table (for example at 3 inch intervals). Optionally, feet 2756 are a designated length for easy integration of the exemplary polarity reversing device with other devices. For example, feet 2756 may raise platform 800b by exactly the width of one fixation location 802. Optionally, feet 2756 are configured for attachment to an optical table (for example each foot 2756 includes a threaded hole in the bottom with may be attached via a screw to the table).

FIG. 32 is a perspective drawing of attaching extra walls to a polarity reversing kit in accordance with an embodiment of the current invention. The extra walls optionally protect a user from exposure to dangers laser light and/or add rigidity to the box and/or may be used to add more optical units to the device, for example to interface with another device.

Figure 33A:
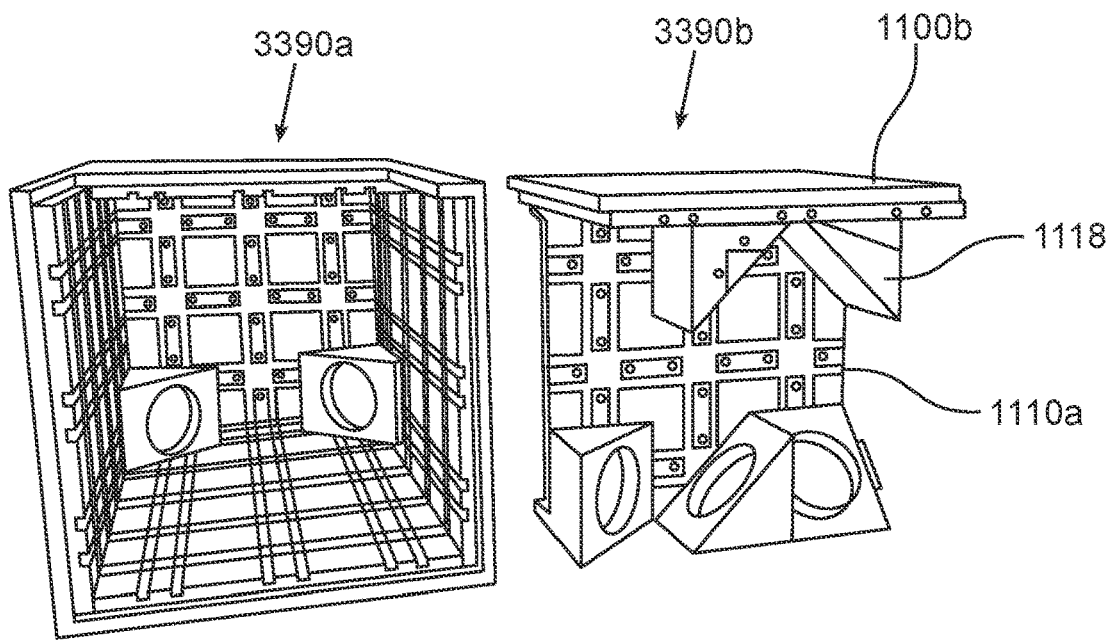
FIGS. 33A-33B are a perspective drawings of a dual path polarity retraining, polarity reversing kit in accordance with embodiments of the current invention.
Figure 33B:
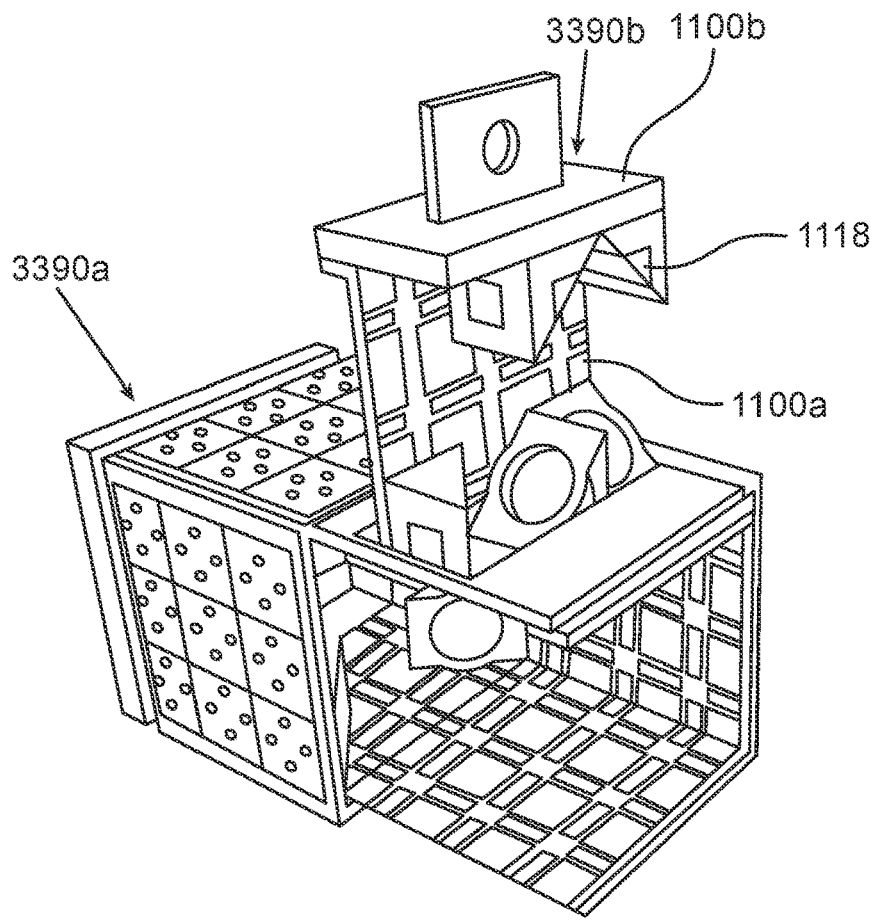
Figure 34A:
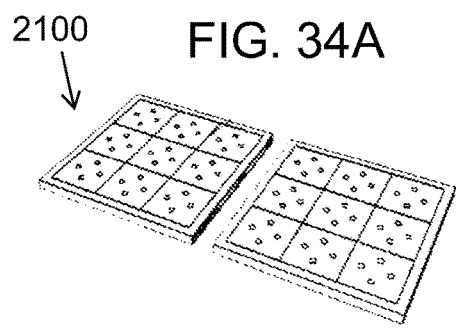
FIGS. 34A-34H are perspective drawings of assembly of an autocorrelator kit in accordance with embodiments of the current invention.
Figure 34B:
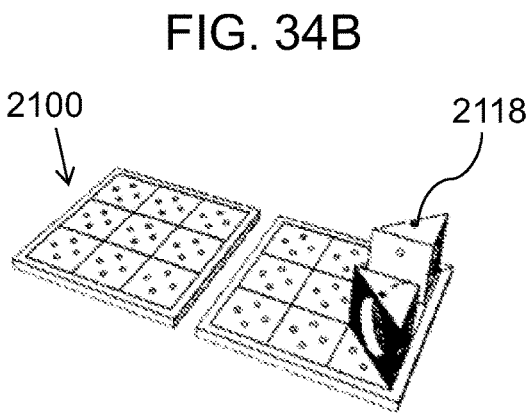
Figure 34C:
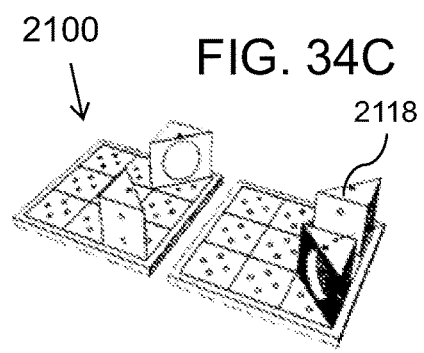
Figure 34D:
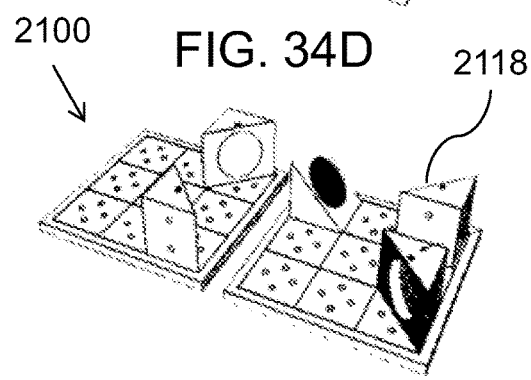
Figure 34E:
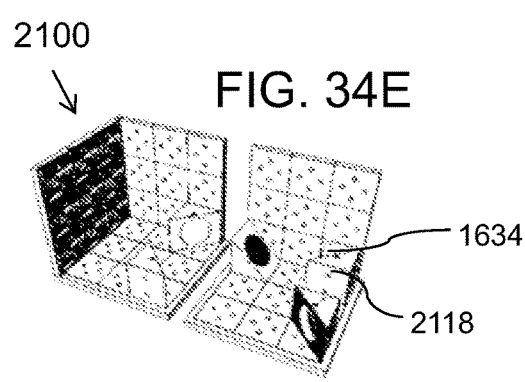
Figure 34F:
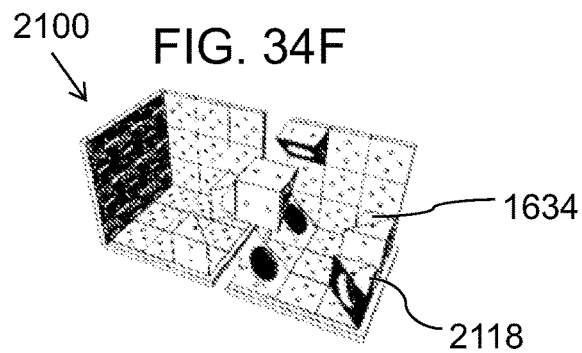
Figure 34G:
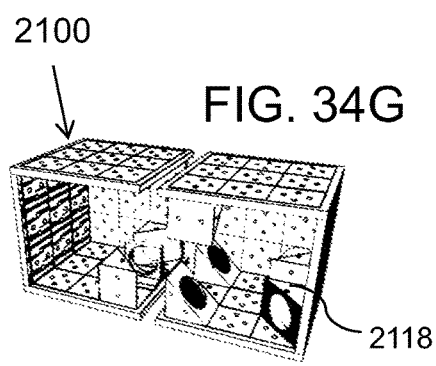
Figure 34H:
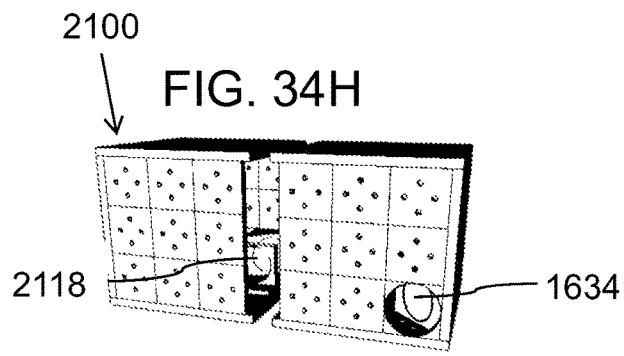

FIGS. 33A and 33B are perspective drawings of a dual path polarity retaining, polarity reversing kit in accordance with embodiments of the current invention. For example, device 3390b includes the polarization reverser device illustrated in FIG. 11. For example, device 3390a includes a device with a path length exactly equal to device 3390b, but which does not reverse polarity. For example, an ultra-short laser pulse is split into two partial pulses. One partial pulse is put through device 3390a and another partial pulse is put through device 3390b. The two partial pulses remain synchronized, but have opposite polarities. In some embodiments, preserving synchronization of the partial pulses (for example due to the equal path lengths) may facilitate recombining of the partial pulses. In some embodiments, discretization of path length in accordance with the current invention may facilitate producing multiple devices with the same path length and/or facilitate conditioning and/or recombining laser pulses.

FIGS. 34A through 34H are perspective drawings illustrating assembly of an autocorrelator (e.g. pump probe) kit in accordance with embodiments of the current invention.

FIGS. 35A-35E illustrate assembly of a Michelson interferometer kit in accordance with an embodiment of the current invention.

Figure 35A:
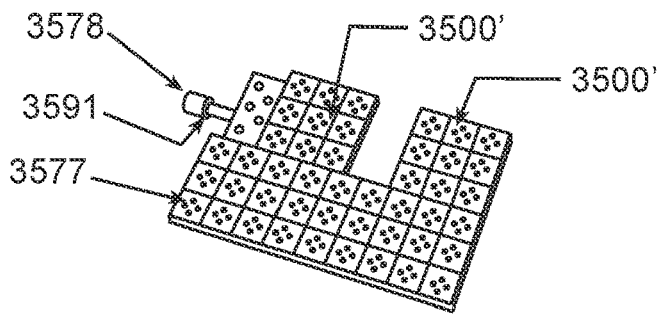
FIGS. 35A-35E is a perspective drawing of assembly of an interferometer kit in accordance with embodiments of the current invention.

FIG. 35A illustrates assembling a base in accordance with an embodiment of the current invention. The base optionally includes a fixed platform 3577 and a mobile platform 3578. For example, the fixed platform 3577 includes four boards of 3×3 fixation locations interconnected and interaligned into an L-shape. The mobile platform optionally includes one 3×3 board 3500 which is mounted via a linear translator 3591. Linear translator move board freely 3500 horizontally such that rows of board 3500 remain aligned with row of a board 3500' which forms the leg of the L of platform 3577.

Figure 35B:
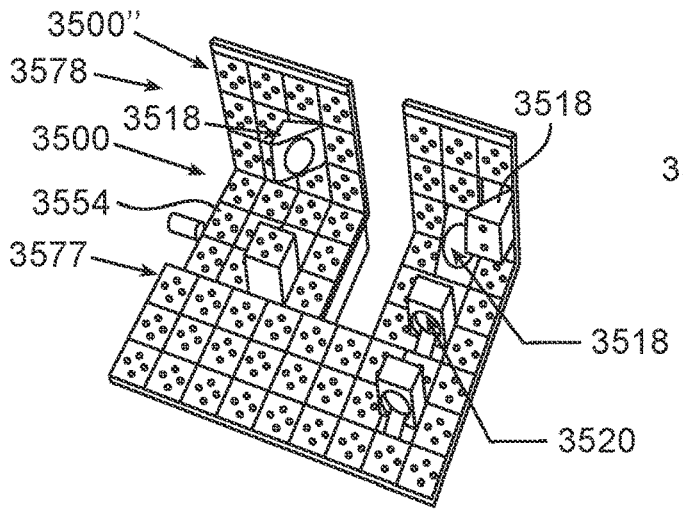

FIG. 35B illustrates further assembly of the interferometer in accordance with an embodiment of the current invention. For example, a wall 3500" is attached to base 3500 of mobile platform 3578 and a second wall 3500'" is attached to base 3500' of fixed platform 3577. Angled mirror units 3518 are optionally attached to board 3500'" and board 3500", for example as illustrated and/or two iris units 3520 are attached to fixed platform 3577. A block extender 3554 is optionally attached to mobile platform 3578.

Figure 35D:
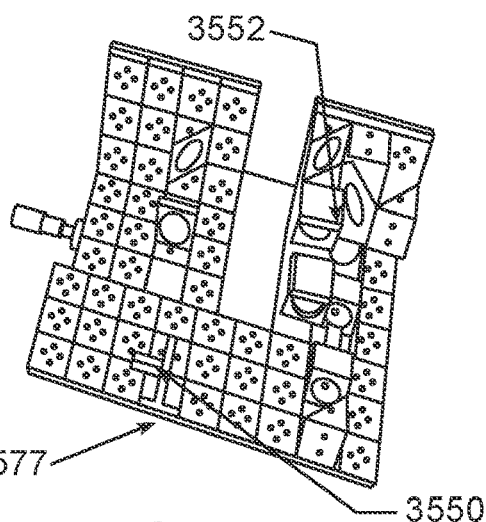
Figure 35C:
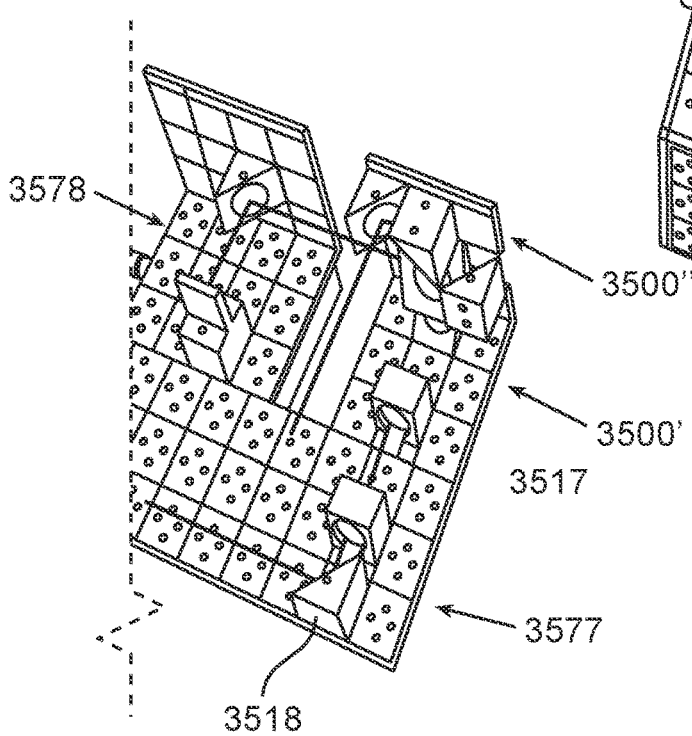
Figure 35E:
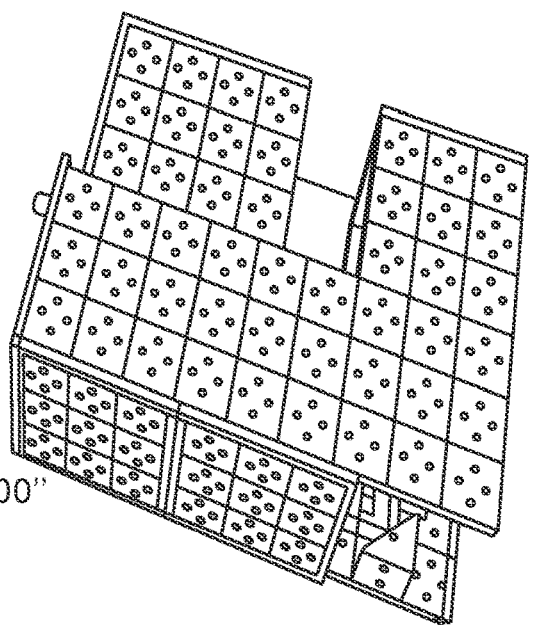

FIG. 35C illustrates further assembly of the interferometer in accordance with an embodiment of the current invention. For example, another angled mirror is attached to fixed platform 3577. A flat mirror 3518' unit is optionally placed on block extender 3554. Optionally, a beam splitter 3517 is attached to board 3500'".

FIG. 35D illustrates further assembly of the interferometer in accordance with an embodiment of the current invention. For example, a photodetector 3550 and sample mount 3552 are attached to fixed platform 3577 and wall board 3500'" respectively. For example, an incoming beam is split into a fixed and a variable path length portion. The fixed length portion optionally passes through a fixed length path and/or the variable length portion optionally passes to mirror 3518'. The length of the variable length portion is optionally changed by moving movable platform 3578. Light from both portions is recombined reflected off of a target. The resulting reflected light and interference due to the recombining is optionally measured by detector 3550.

Figure 36:
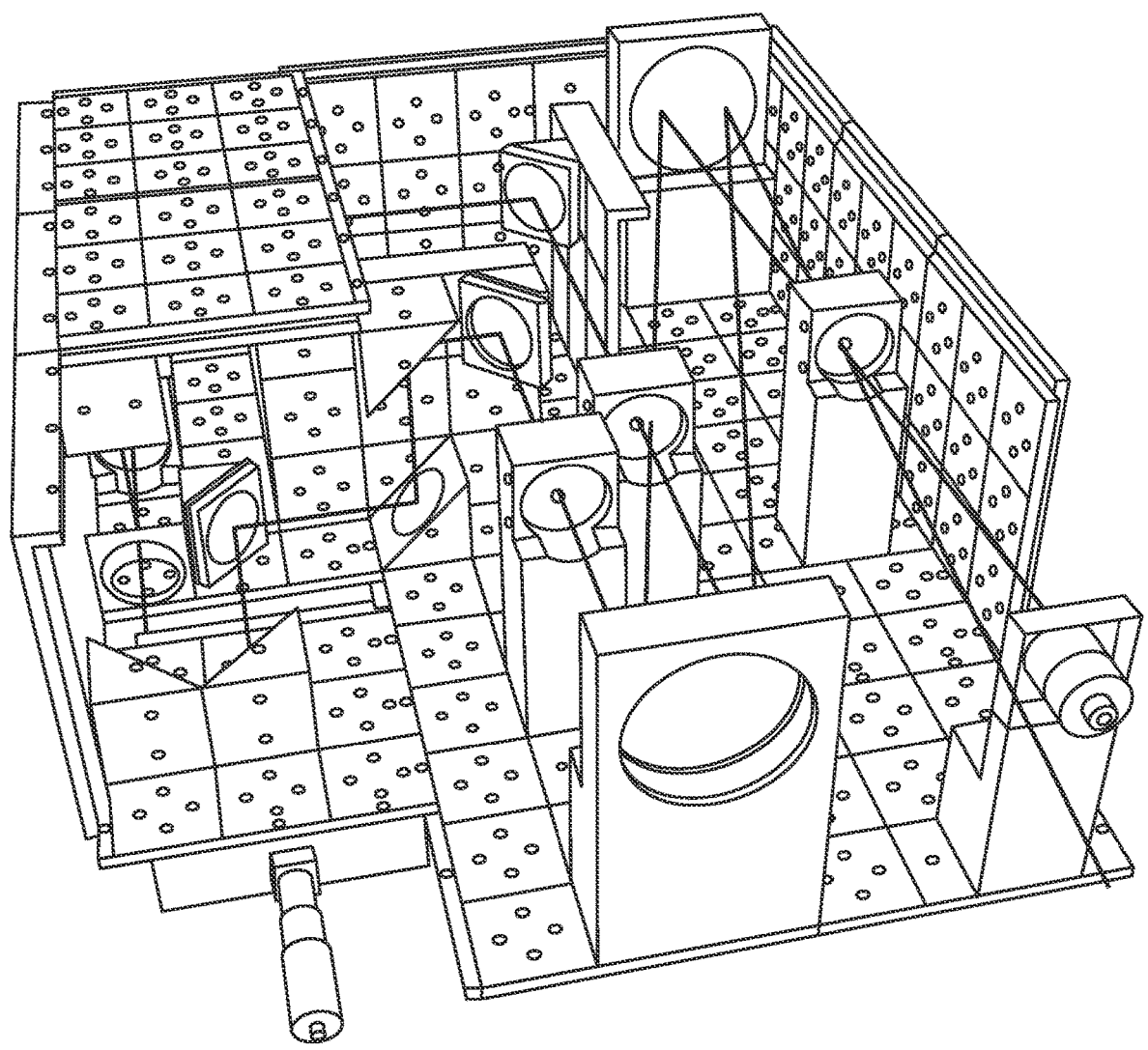
FIG. 36 is a perspective drawing of a frequency resolved optical gating (FROG) kit in accordance with embodiments of the current invention.

FIG. 36 is a perspective drawing of a frequency resolved optical gating (FROG) kit in accordance with an embodiment of the current invention.

Figure 37:
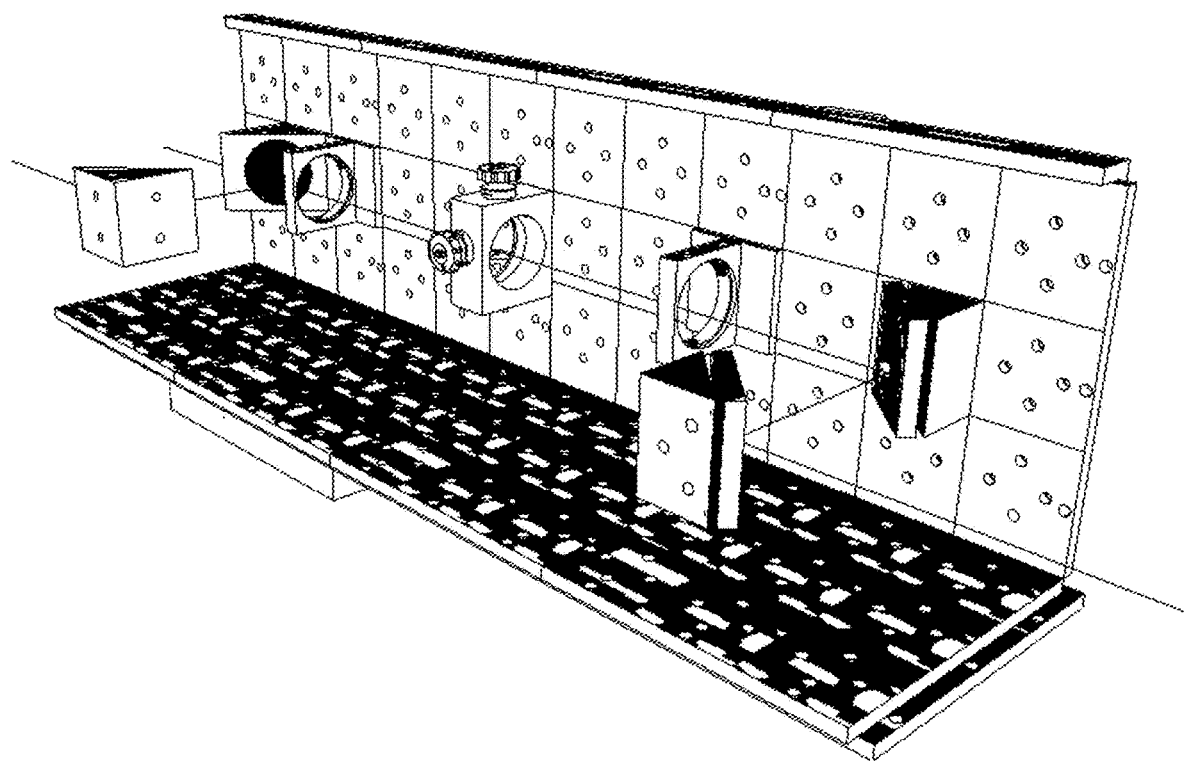
FIG. 37 is a perspective drawing of a nonlinear optical generation-Focusing apparatus kit in accordance with an embodiment of the current invention.

FIG. 37 is a perspective drawing of a nonlinear optical generation-Focusing apparatus kit in accordance with an embodiment of the current invention.

Interface to Other Optical Mounting Systems

Figure 38:
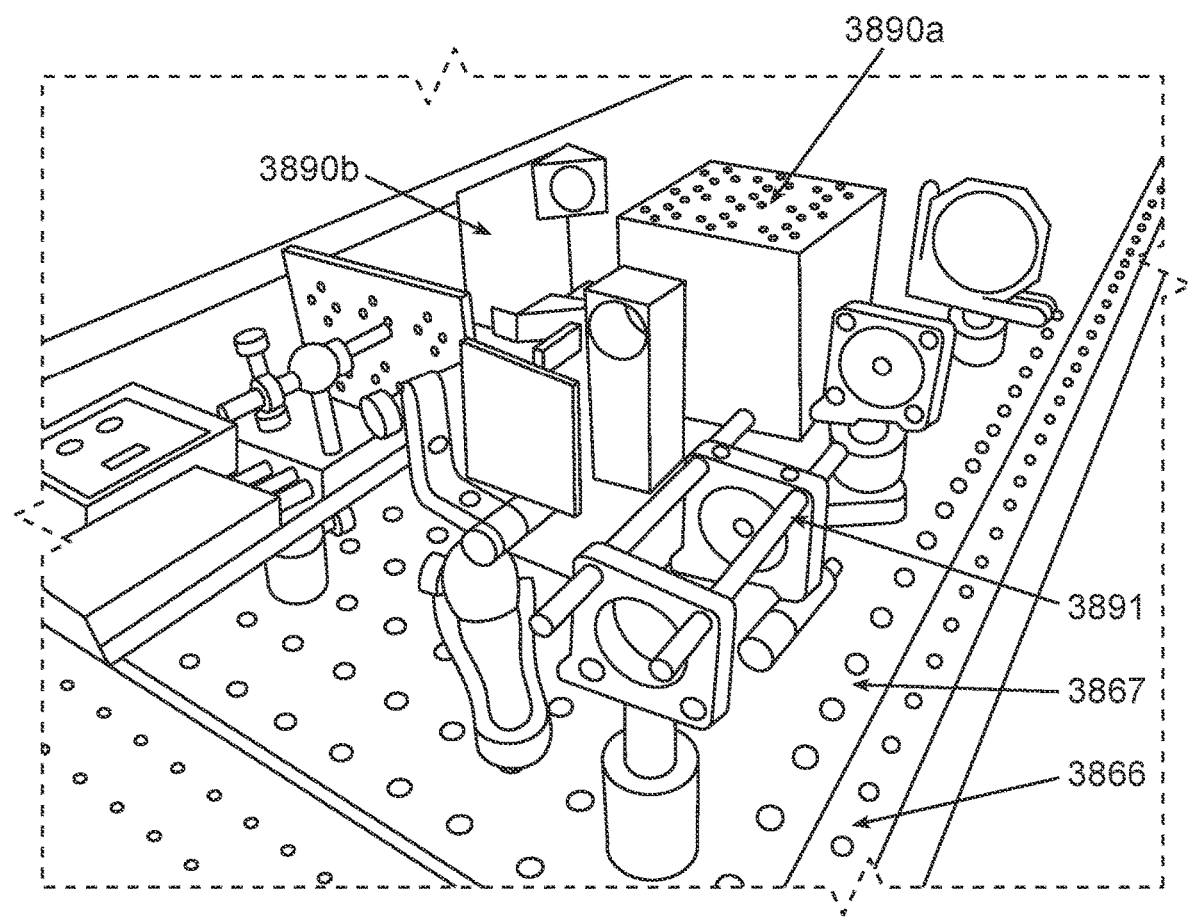
FIG. 38 is a photograph of modular devices integrated with conventional optical devices on an optical table in accordance with an embodiment of the current invention.

FIG. 38 is a photograph of a device attached to an optical table in accordance with an embodiment of the current invention. For example, optical devices 3890a and 3890b are attached to a standard optical table 3866 and/or optical bread board 3867. The modular device 3890a and/or 3890b are optionally aligned to table 3866. Optionally, table 3866 aligns device 3890a to device 3890b. For example there may be a shared optical axis between device 3890a to 3890b. For example, output of device 3890a may serve as input to device 3890b. For example, a laser pulse may be split into two sub pulses, one sub pulse may be conditioned by device 3890a and/or another sub pulse may be conditioned by device 3890*b*, and/or the sub pulses may be recombined. Optionally, optical table 3866 aligns device 3890*a* and/or 3890*b* with another device 3891.

Figure 39:
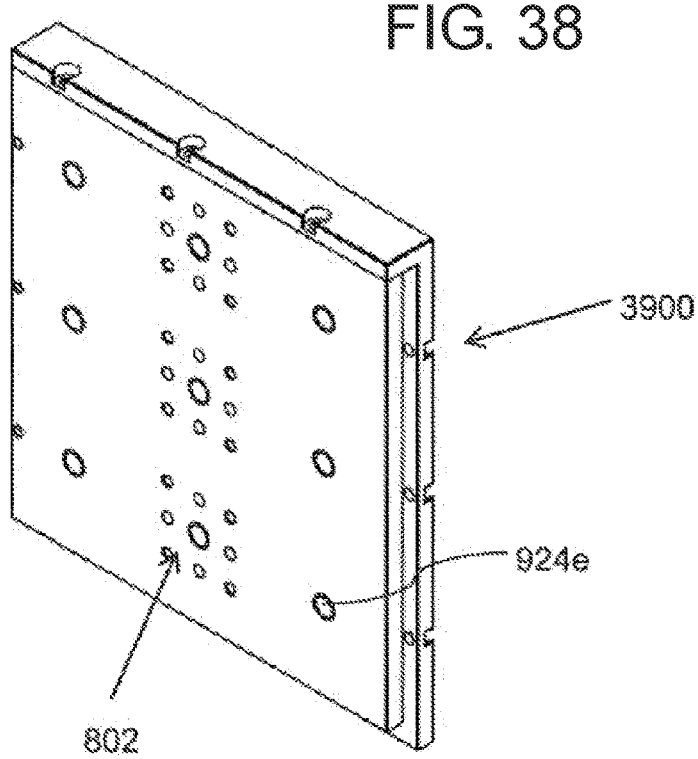
FIG. 39 is a perspective drawing of a board for fixing modular units to a conventional optical table in accordance with an embodiment of the current invention.

FIG. 39 is a perspective drawing of a platform 3900 configured for attachment to a standard 1" optical table in accordance with an embodiment of the current invention. For example, platform 3900 includes three equally spaced rows and three columns equally of grid points (for example spacing may be 1.5 inches). The inner column optionally includes three fixation locations and connectors 802 for modular optical units. Each connector 802 may optionally include an interface for an optical table, for example as explained with regards to FIG. 9. Optionally, the two outer columns of platform 3900 include six holes 924*e* configured to interface to an optical table. For example, the four corner holes are all 3 inches apart and/or facilitate connection to a one inch optical table.

Figure 40:
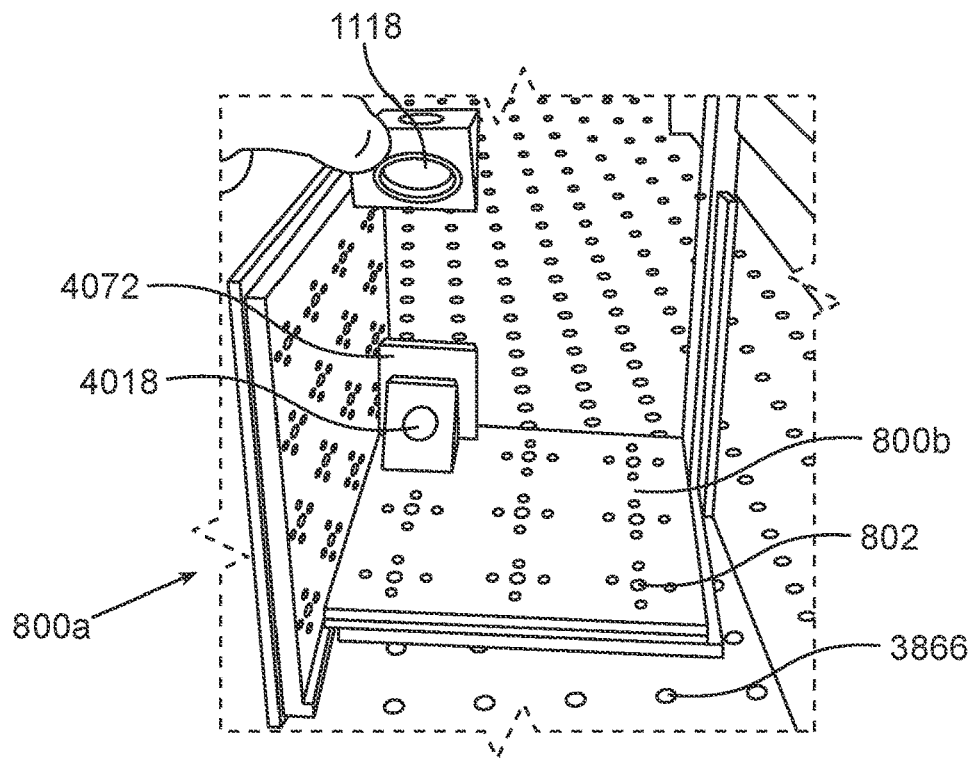
FIG. 40 is a photograph of an optical device for transferring a beam from a 1 inch optical element to a ½ inch optical element in accordance with an embodiment of the current invention.

FIG. 40 is a photograph of transferring a beam between 1 inch and ½ inch optics in accordance with an embodiment of the current invention. In some embodiments, system for optics of different sizes may include spacing of modular units that differs. For example, modular units in a system for 1 inch optics may be spaced 1.5 inches apart in both the horizontal and vertical axes. For example, modular units for ½ inch optics may be spaced 1.0 inches apart on the vertical and horizontal axes. In some embodiments, an adapter will fit to a system of optics of a first size and/or transfer a beam at a position that fits a different system. For example, the embodiment of FIG. 40 includes two platforms 800*a*, 800*b* with fixation locations and connectors 802 for module units with 1 inch optics. For example, the distance between fixation locations may be 1.5 inches. A module mirror unit 1118 of 1" optics is illustrated connected to platform 800*a*. Optionally, a modular mirror unit 4018 is configured for a ½ inch mirror. For example, unit 4018 has a width of 1 inch and includes a complementary connector to fit a platform of 1 inch fixation locations. Optionally, an adapter 4072 connects between unit 4018 to connector 802. Optionally, adapter 4072 moves unit 4018 over 0.25 inches such that the mirror of unit 4018 is centered in the 1.5 inch fixation location in the horizontal direction. For example, unit 4018 catches a light beam from unit 1118 and reflects it parallel to the surface of platform 800*b* at a height of 0.5 inches off the board (fit for a board of 1 inch fixation locations that may be receive the beam).

In some embodiment an adapter may transfer a beam between systems of other sizes. For example, an adapter may transfer a beam between systems based on 1" and 2" optics and/or between 25 mm and 12.5 mm and/or between 1" and 12.5 mm and/or any other combination thereof. In some embodiments, a ½" unit and/or adapter may be used with a 12.5 mm optical system. In some embodiments, a 1" unit and/or adapter may be used directly with a 25 mm optical unit and/or system or vice versa. In some embodiments, a ½ inch adapter may be used directly with a 12.5 mm optical unit and/or system.

Figure 41:
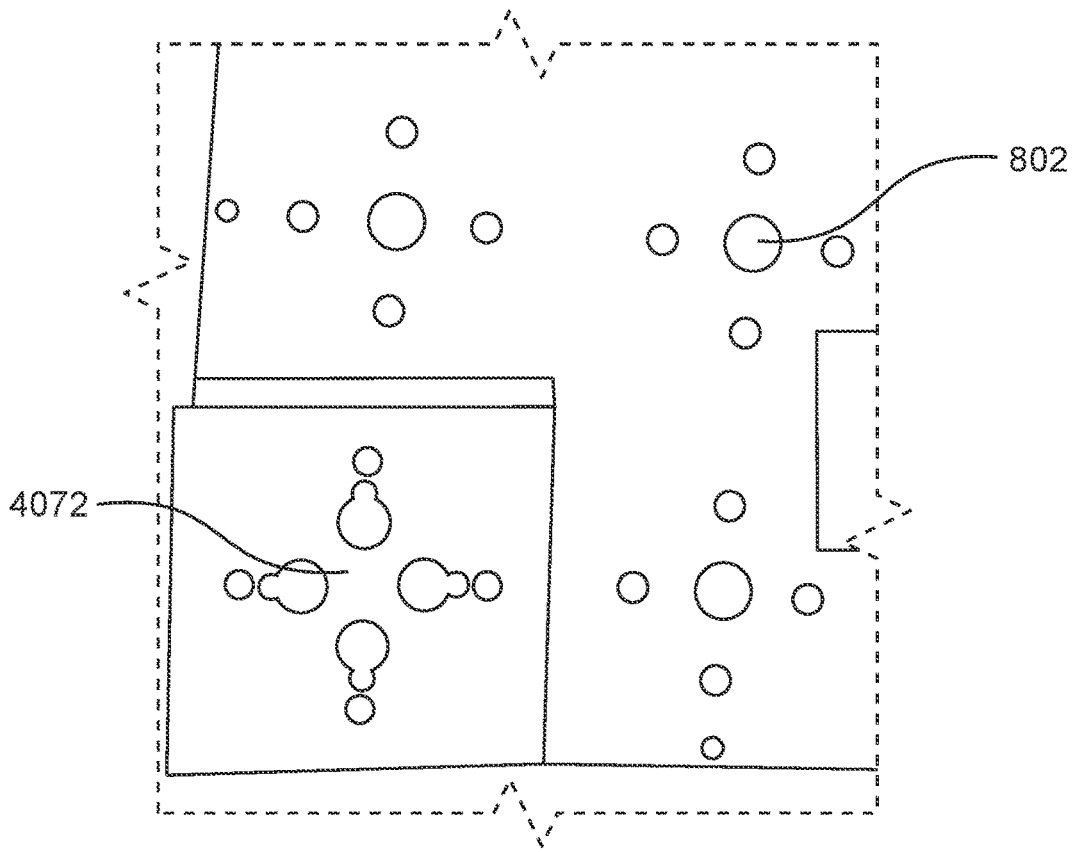
FIG. 41 is a photograph of an adapter for transferring a beam from a 1 inch optical element to a ½ inch optical element in accordance with an embodiment of the current invention.

FIG. 41 is a close up view of adapter 4072 in accordance with an embodiment of the current invention. For example, adapter 4072 may include connectors for both 1" modular optical units and/or ½" modular optical units.

Figure 42A:
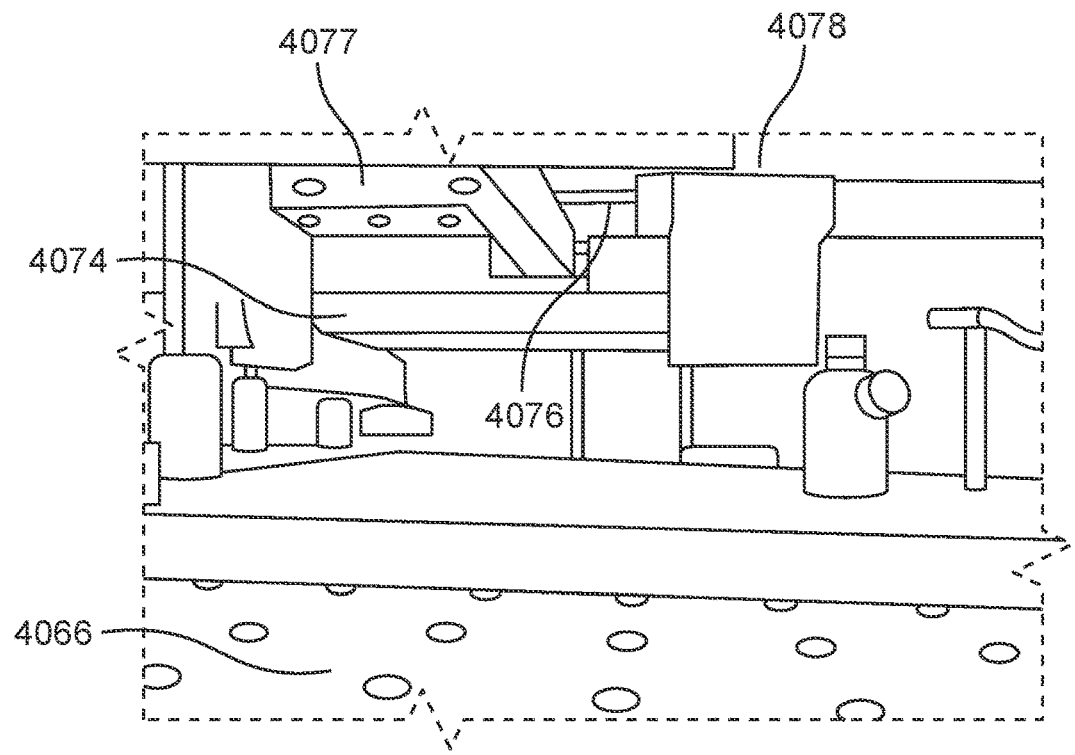
FIGS. 42A-42B are a photographs of an electro-mechanical-optical device for adjusting a path length in accordance with an embodiment of the current invention.
Figure 42B:
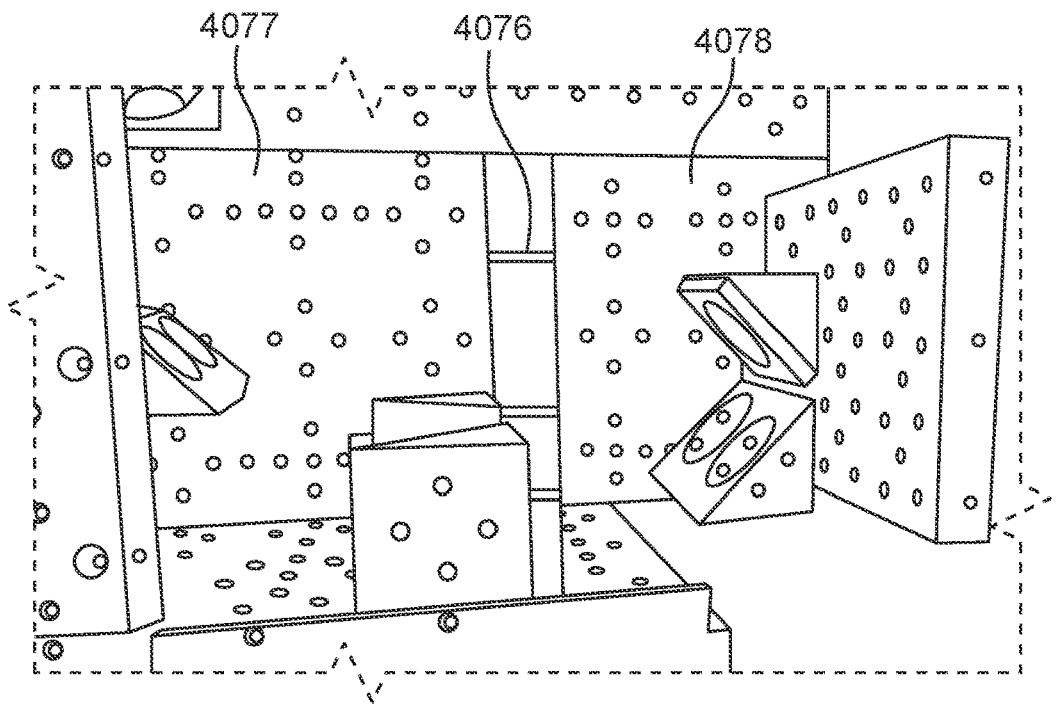

FIGS. 42A and 42B are photographs of an electro-mechanical-optical device for adjusting a path length in accordance with an embodiment of the current invention. For example a motorized actuator may be used with a modular optical system in accordance with an embodiment of the current invention. Alternatively or additionally, a manual actuator may be used (for example as illustrated in FIG. 12).

For example, a standard actuator 4076 and/or motor 4074 may be used to move a mobile platform 4078 with respect to a fixed platform 4077 and/or a table 4066. Optionally the system will include clips and/or a guide for wires (for example for a power cord and/or control wires). Alternatively or additionally, modular actuators, controllers and/or motors may be supplied. In some embodiments a cooling element such as a fan and/or a heat sink and/or a channel for cooling fluid may be added.

Figure 43:
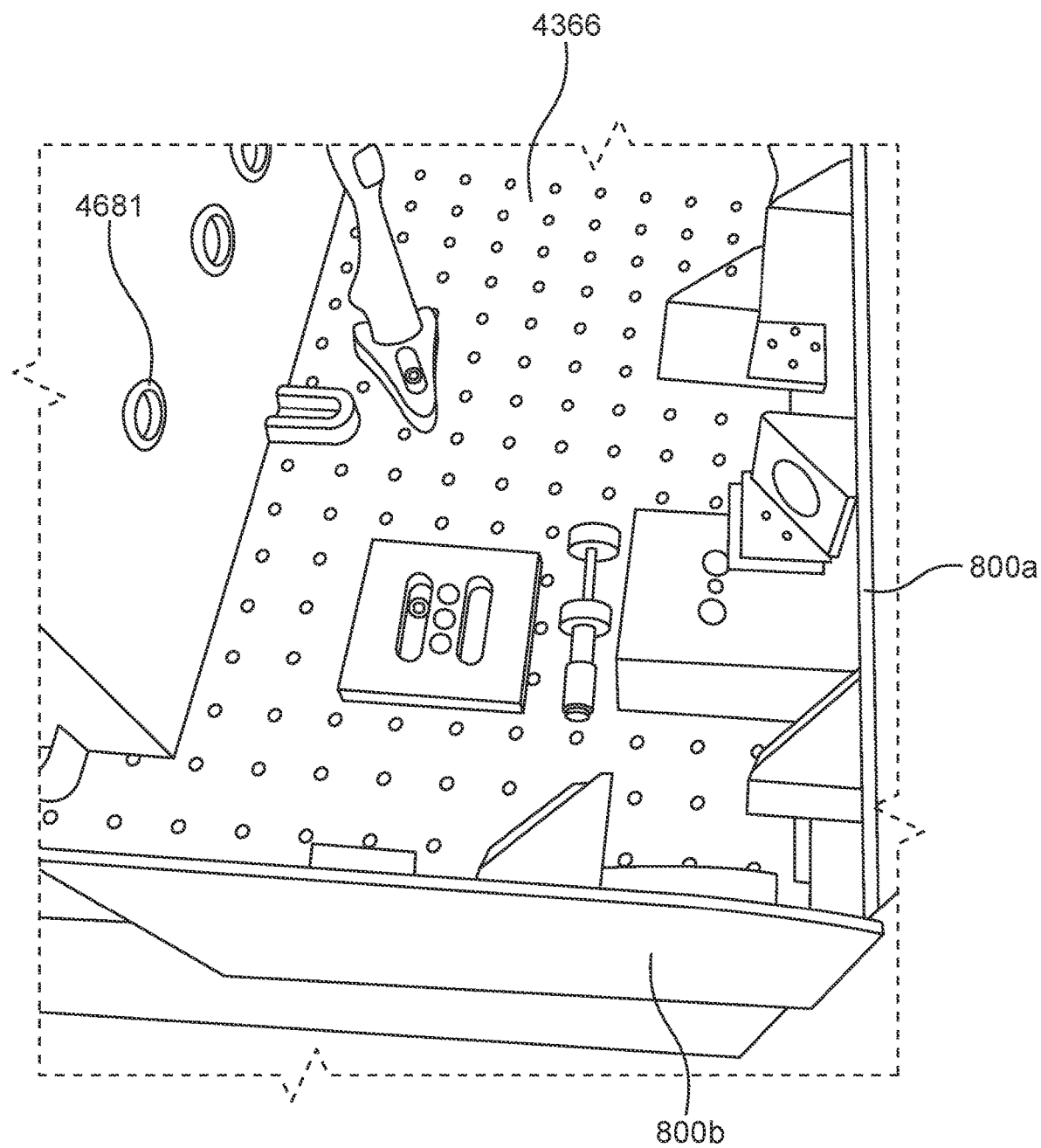
FIG. 43 is a photograph of a wall to an optical table in accordance with an embodiment of the current invention.

FIG. 43 is a photograph of an addition to an optical table in accordance with an embodiment of the current invention. In some embodiments, modular optical units may be included in an optical table. Optionally units may be mounted reversibly and/or permanently to the table.

In some embodiments, a wall including connectors for modular optical units may be positioned on an optical table. Optionally, a platform 800*a* including fixation locations and/or connectors is mounted vertically on an edge of an optical table 4366. For example, platform 800*a* is located directly in front an outlet of an ultrashort pulsed laser light source 4681. Optionally, platform 4681 may prevent laser light from passing beyond an edge of an optical table and injuring a passerby. In some embodiments, platform 4681 is a convenient place to add preliminary conditioning to a laser pulse. For example, paths of known length can be defined easily to various parts of the table. Optionally this may facilitate using a larger portion of the table. Optionally, by moving a few module units a laser pulse may be redirected to another part of the table and/or by replacing the modular units, the pulse may be returned to the previous location with the same path length and optical parameters as previously. For example this may facilitate setting up multiple devices and/or experiments on a single table and/or switching back and forth between different apparatuses when needed.

In some embodiments, a platform may be connected permanently or temporarily to an optical table. For example, platform 800*b* may be attached to a side wall of the table. For example, adding a platform may add to the useful space of the table. In some embodiments the platform may include a fixation location and/or a connector for a modular optical unit in accordance with embodiments of the current invention. In some embodiments, a platform for a modular system according to the current invention may be added as an extra level (e.g. a floor and/or ceiling) to an optical table. Alternatively or additionally, a fixation location and/or a connector for a modular optical unit in accordance with embodiments of the current invention may be added permanently or reversible to the surface of an optical table.

Assembly of a Modular Optical Unit

Figure 44A:
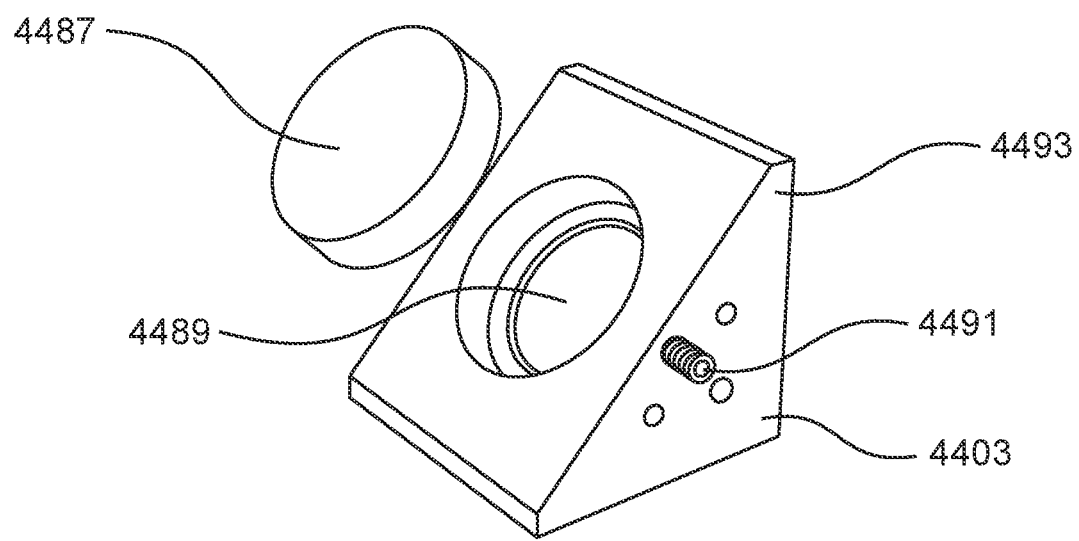
FIGS. 44A-44B are perspective drawings illustrating insertion of an optical element into a mount of a modular unit in accordance with an embodiment of the current invention.
Figure 44B:
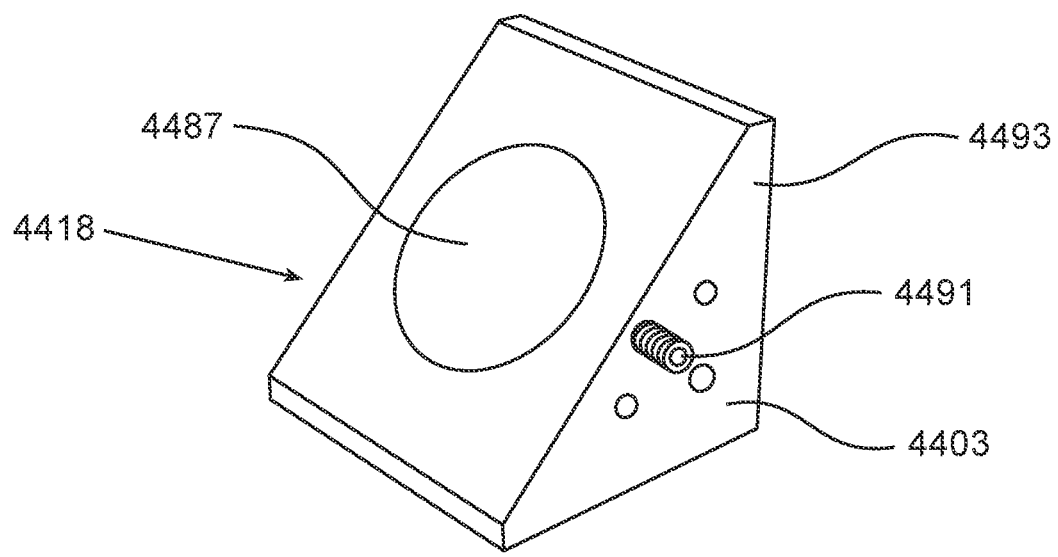

FIGS. 44A-B illustrates assembly of a modular optical unit in accordance with an embodiment of the current invention. In some embodiments an optical element 4487 may be attached to a modular frame. Optionally, an optical element may include a standard optical element. Optionally, the frame may include a standard mount for the optical element and/or one or more complementary connectors to for connection to a connector of a fixation location. Optionally the optical element may be reversibly mounted to the frame. Alternatively or additionally the optical element may be permanently mounted to the frame.

Figure 45A:
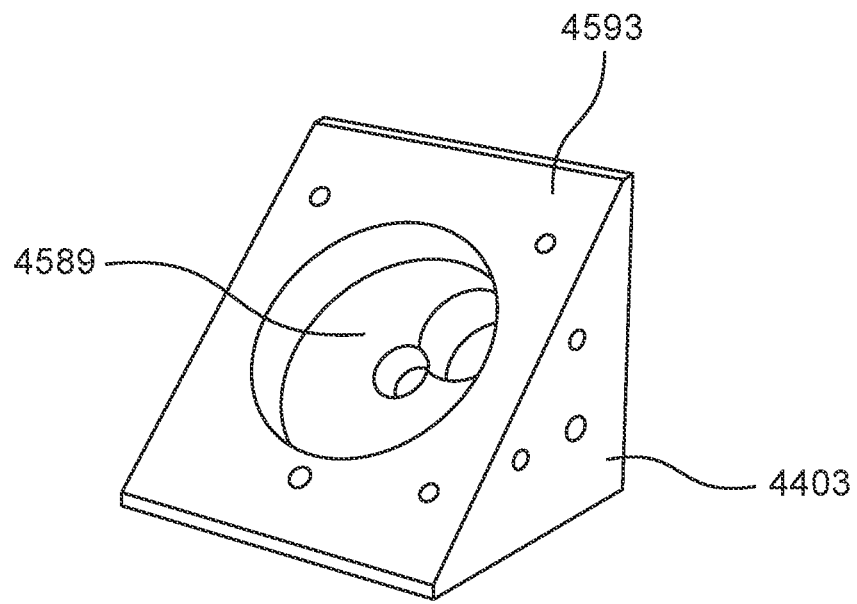
FIG. 45A-45D are a perspective drawings illustrating insertion of an optical element into a mount of a modular unit in accordance with an embodiment of the current invention.
Figure 45B:
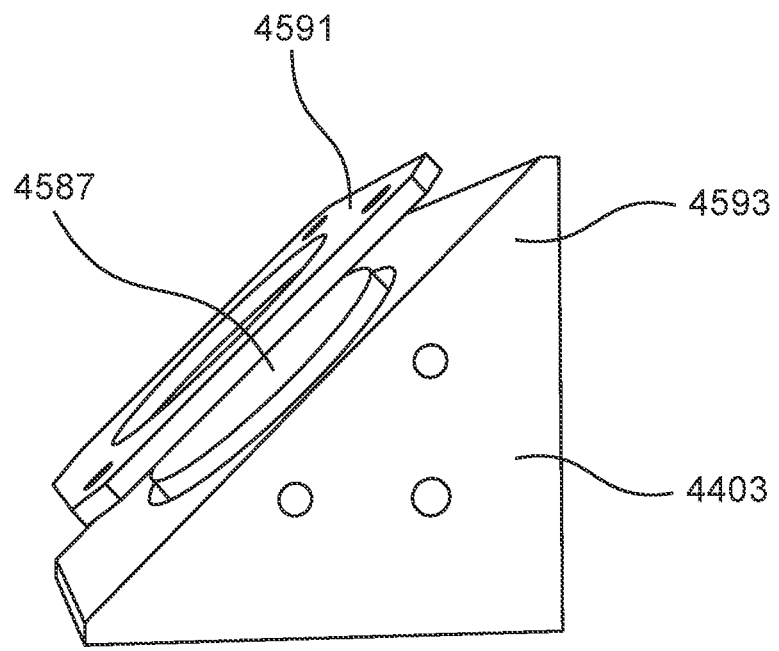
Figure 45C:
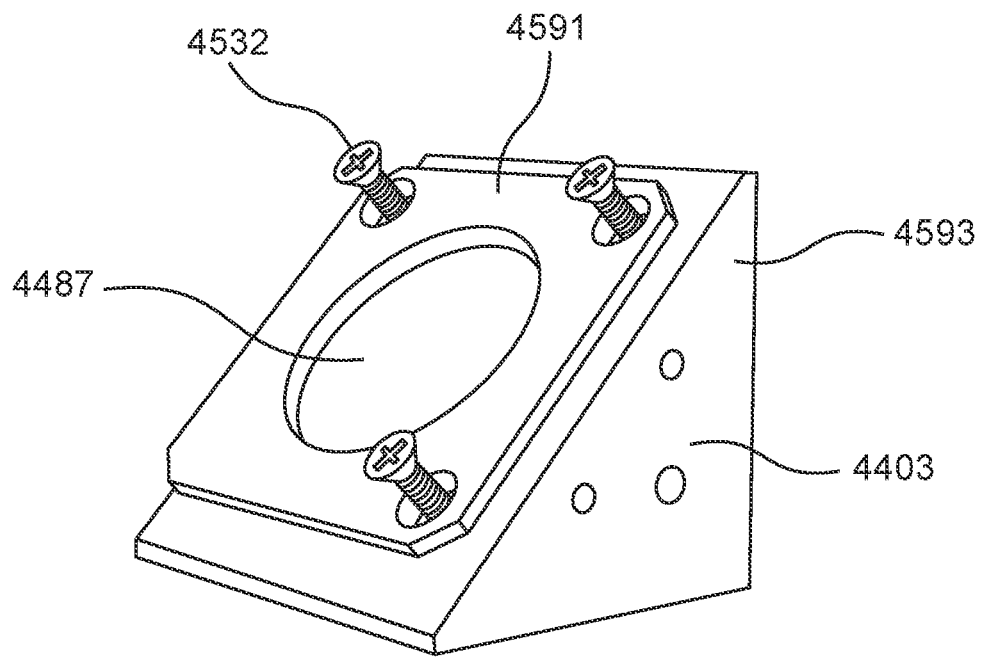
Figure 45D:
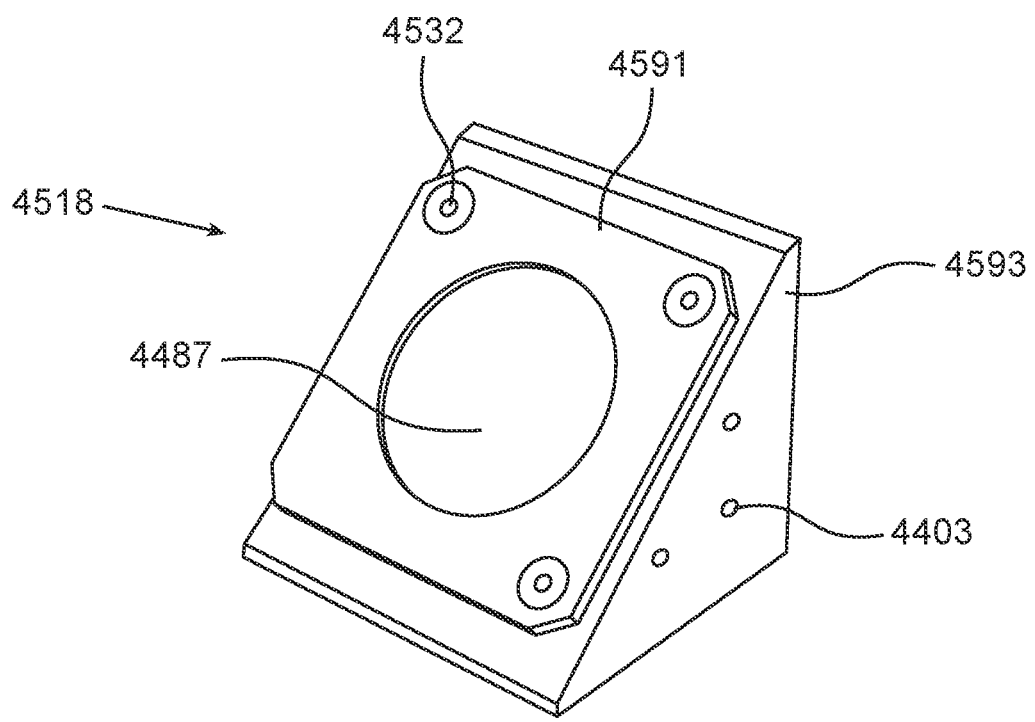

In some embodiments, a disk shaped optical element 4487 (for example a mirror) having a standard diameter and/or thickness may be mounted to a modular frame 4493. Optionally, the frame may include one or more complementary connectors for connection to a connector 4403 at a fixation location. In some embodiments a locking element may be included, for example an adjustment screw 4491 that facilitates tightening and/or adjusting element 4487 in mount 4489. For example element, 4487 may be locked into mount 4489 such that the element oriented and/or positioned with respect to a complementary connector 4403 such that optical element 4487 is centered with respect to a fixation location when complementary connector 4403 is connected to a connector at the fixation location. Optionally, a tightening and/or adjustment element may include a screw and/or a locking ring and/or adhesive and/or a chuck. In some embodiments, a tightening and/or adjustment element may be configured to avoid interfering with connection to a fixation location. For example, screw 4491 may be shorter than the hole into with it is inserted such that after tightening, screw 4491 is optionally sunk into the frame and/or does not protrude from the frame. In some embodiments, a tightening and/or adjustment element protrude from a face of the device that is not mounted to a fixation locations, for example similar to adjustment screws 4532, for example as illustrated in FIG. 45C and/or adjustment screws 2332 for example as illustrated in FIG. 23C. In some embodiments, a tightening and/or adjustment element protrude from a location on a face that corresponds to a hole in the fixation location. In some embodiments mount 4489 is configured to retain the optical element 4487 positioned in a way that is independent of the angle of fixation of the frame 4493 to the fixation location. For example the optical element 4487 may be centered on a fixation location. In some embodiments, element mount 4489 is made to hold optical element in a precise position and orientation without calibration.

FIGS. 45A-45D illustrate assembly of a modular optical unit including an adjustable element in accordance with an embodiment of the current invention. For example an adjustable element may allow the degrees of freedom, for example for calibration with another modular unit and/or with an external optical device. Optionally a mirror 4487 is mounted into a reinforced structure, to produce a unique tunable triangle modular mirror unit 4518. For example, mirror 4487 is inserted into a mount 4589. Optionally, a face plate 4591 may retain and/or fix mirror 4587 in mount 4589. In some embodiments, adjusting screws 4532 may hold face plate 4591 in place and/or adjust the angle of mirror 4487.

Figure 46:
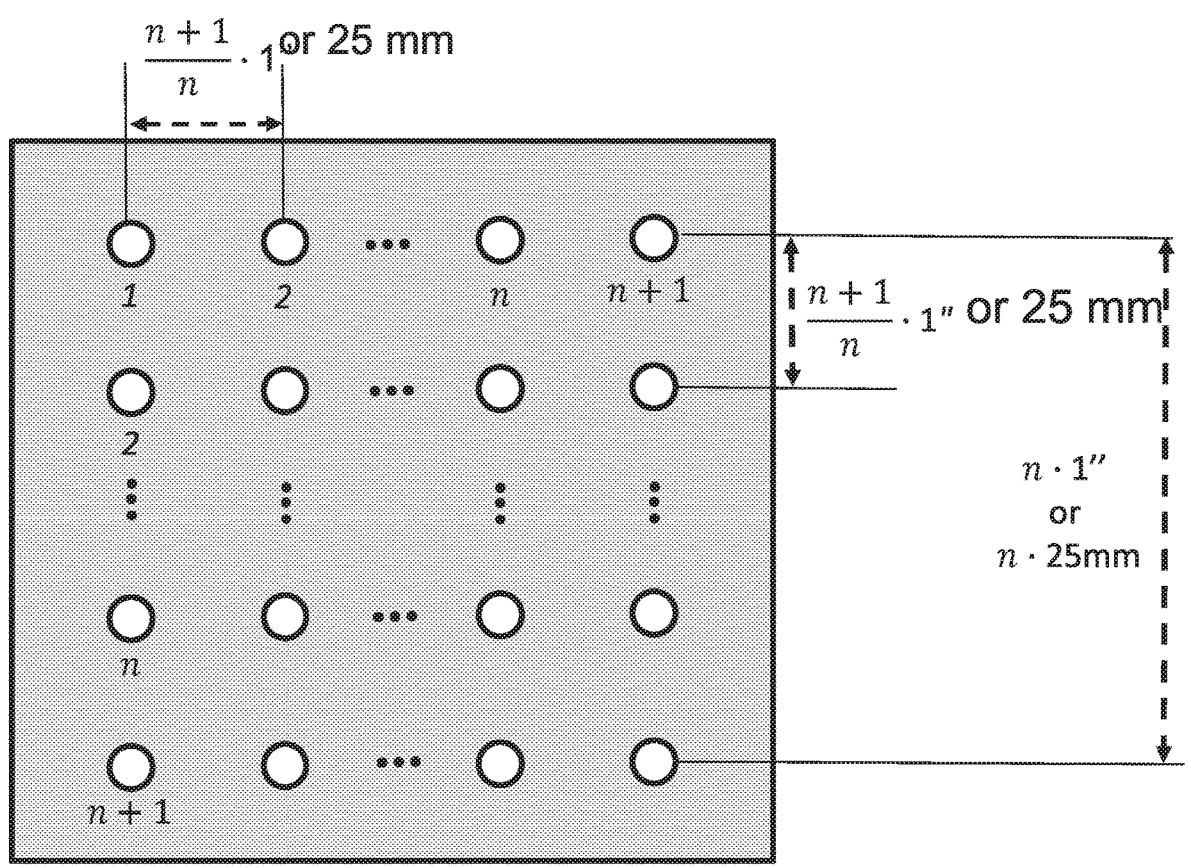
FIG. 46 illustrates a discretization pattern for a platform configured for attachment to an optical table in accordance with an embodiment of the current invention.

FIG. 46 illustrates a discretization pattern for a platform configured for attachment to an optical table in accordance with an embodiment of the current invention. Optionally, regularly spaced rows and/or columns of fixation locations coincide with rows and/or columns of attachment locations of the optical table. Optionally the spacing between fixation locations will be greater that the width of an optical element. Alternatively or additionally, a modular optical unit may straddle more than one fixation location and/or include an optical element that is larger than the spacing between fixation locations.

FIG. 46 illustrates a scheme for an optical table with attachment locations (e.g. fixations locations for example holes) spaced on a regular square grid with grid spacing of 1" in accordance with an embodiment of the current invention. Optionally, the distance between every n+1 rows or columns is an even number of inches (the spacing between attachment locations on the optical table). In this embodiment, this means that each set of n+1 rows or columns will have the same relationship to the attachment locations on the table. For example every n+1 row or column of fixation locations on the platform will by coaxial with a row or column of the table. For example, every n+1 fixation location will be centered on a hole in the optical table. For example, the distance between n+1 rows and/or columns of fixation locations on the platform will be an even number of inches. Optionally the distance between fixation locations will be greater than the width of an optical element. For example, for 1" inch optical elements and 1" hole spacing on an optical table the discretization distance between fixation locations may be (n+1)/n*1" for n and integer greater or equal to 1. For example, (as illustrated for example in FIGS. 8A, 8B, 9, 16, 17A, 31, 38 and 39) for n=1 the fixation locations are 1.5" apart and every third fixation location will correspond to every fourth row or column on the table. For example, for n=2 the fixation locations are 1.333" apart and every fourth fixation location will correspond to every fifth row or column on the table. Alternatively for 25 mm optics and a 25 mm optical table the discretization distance between fixation locations may be given by (n+1)/n*25 mm. In some embodiments it may be desired that rows and columns of the table and the modular platform coincide over small distances (for example, a smaller coincidence distance may facilitate using smaller platforms and/or give more flexibility in placement and/or alignment of platforms on the table). For example, in some embodiments, n may be kept less than 4 and/or less than 8.

In some embodiments, different sized optical elements may be used with the same platform or optical table. For example, 25 mm optics may be used with a table having 1" spacing between holes. Alternatively or additionally, 1" optics may be used with a 25 mm table. For example, a modular optical unit including connectors for a platform having 1.5 inch fixation location spacing may include a mount for an optical element of any size. The optical element may for example, be held centered on the fixation location and/or distanced from the surface of the platform to center the optical element with regard to a fixation location on an orthogonal platform.

In some embodiments, a system may be designed for ½ inch optical element on a 1" optical table. For example, the spacing of fixation locations may be (n+1)/n*0.5". Alternatively or additionally, the fixation location scale described above for 1" optics can also be used for ½" optics (in some embodiments using the 1" scale has the advantage of facilitating the use of 1" and ½" optics together, in some embodiments using the smaller ½" scaling has the advantage of allowing more optical units in a smaller space, for example facilitating a more compact device).

Submodules

In some embodiments, a sub-platform will be provided. For example, a group of optical elements may be mounted on a sub-platform that can be added or removed from a platform as a single unit. Optionally, elements on the sub-platform may be mounted outside of the discrete pattern of the platform. Alternatively or additionally, optical axes within the sub-platform may be outside of the discrete scheme of directions and/or positions of the platform. Optionally the sub-platform will have an input and/or output optical axis that conforms to the discrete pattern of locations and/or directions of the platform. In some embodiments elements may be added removed and/or replaced in the sub-platform without changing the position of the sub-platform on the platform and/or without changing other elements of the platform and/or without changing the input/output axis of the sub-platform. Optionally the direction of an input and/or output of the platform may be changed. For example, a direction of the input and/or output axis may be changed without changing the platform and/or the elements within the sub-platform and/or the position of the sub-platform on the platform. Optionally, the sub-platform includes a complementary connector for connection to a fixation location of the platform.

Markings

In accordance with some embodiments of the current invention, a modular optical system may include a marker. For example, a marker may be non-functional and/or not include an optical element. For example, a marker may not affect an optical path passing the marker position. Optionally a marker may be permanently placed on a fixation location. Alternatively or additionally, a marker may be reversibly connected to a fixation location.

In some embodiments, a kit for building a device may include a marker. For example, one or more platforms within the kit may be marked. For example, a fixation location may be marked for connection to a modular unit and/or the mark may indicate which modular unit is connected to the location and/or in which direction the optical axis is pointed. Optionally, a modular unit may be marked and/or differentiated from other modular units. Alternatively or additionally, a marking on a platform may differentiate one platform from another platform and/or may show where an attachment interface connects to one platform to another platform and/or to which platform the interface is to be attached. In some embodiments, a platform may include multiple sets of marking, for example each set may be part of instructions to assemble different devices. Optionally a marker may show a location of other aspects of a system. For example, a marker may indicate an input and/or output location and/or a location of a cord (for example a power cord) and/or a preferred path for a connection (for example a wire).

In some embodiments, marker may be reversibly connected to a platform. For example, when designing a system, a user may place markers in various places to envision the system before assembling optical units. Optionally, the user may change the geometry of the markers to arrive at a desired assembly. For example, subsequently the user may assemble the device according to the markers.

In some embodiments, a marker may be used to mark a transitory element in a system and/or a location where a transitory element may be placed. For example, in some assemblies a transitory element may include a debug element. For example, the debug element may be used for initial testing and/or subsequent error correction (for example, a debug element may include a status indicator and/or an output port). Alternatively or additionally, a transitory element may include a transition element that transforms a function of a device and/or redirects an optical path. Optionally the transitory element may be marked to facilitate its identification and/or removal. Optionally, the place of a transitory element may be marked to facilitate addition of the transitory element when desired.

In accordance with some embodiments of the current invention, a naming convention may facilitate reference to a fixation location and/or modular optical unit. For example, an indicator may indicate a reference point (for example an origin) and/or a direction (for example a direction of an axis and/or a positive direction on an axis). Alternatively or additionally an indicator may differentiate platforms and/or modular optical units. Additionally or alternatively, fixation locations on a board and/or a box and/or a platform may be indexed. For example, the naming convention may facilitate to description of a system and/or defining positioning of optical units orally and/or textually. For example, the naming convention may be used by a user to describe a system to an assistant. For example, the naming convention may be used by an assistant to describe changes to the system (for example repairs and/or improvements) to a user. For example, the naming convention may be used for communication between an automated design system and a user.

Computerized Planning, Design and/or Analysis

In some embodiments, a modular optical system may include features to facilitate computer assisted planning, design and/or analysis. For example, locations on a platform may be marked and/or modular optical units may be marked for automated recognition. For example, markings may be visible and/or there may be an automated image processing procedure. For example, the procedure may identify a structure of the optical system from an image of the system. Alternatively, non-visible markers may be included, for example magnetic markers and/or wireless markers (for example an RFID) and/or a platform may include a logically addressable system to identify locations and/or connections and/or identities of modular units. Optionally, a control system may facilitate an automated control and/or adjustment of an optical element.

In some embodiments, a processor may be configured to assist in design and/or analysis of a modular optical system. For example, the processor may be programmed to output a plan for a system to fulfill a required functionality under a set of constraints (for example constraints may include space limitations and/or budgetary limitations and/or availability of parts and/or time constraints for assembly of the system and/or time constraints for running of programs (experiments) and/or constraints on external resources for example cooling and/or input light sources and/or sensors).

In some embodiments, a processor may be programmed for debugging a system. For example when a fault occurs the processor may supply suggested tests to determine the source of the problem and/or suggested interventions for fix the problem. For example input to the debug program may include the structure of the optical system and/or behavior of the system. Optionally, the processor may include inventory control functions. For example the processor may track the location and/or availability of modular units and/or schedule their use and/or remind a user when and/or where to return a part. For example, the processor may track the availability and/or demand of parts. For example, the processor may recommend substitutes for missing parts and/or acquisition of high demand parts. Optionally the inventory functions may be linked to security systems (for example tracking presence of personnel to a room and/or a storage area and/or the presence of equipment).

General

It is expected that during the life of a patent maturing from this application many relevant light pipes will be developed and the scope of the term light pipe is intended to include all such new technologies a priori.

As used herein the term "about" refers to ±25%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A 3D optical setup, comprising:
at least one base and at least one wall, each of said at least one base and at least one wall having a plurality of fixation locations repeatedly arranged, wherein each base is connectable to each wall at a zero and/or at a non-zero angle for forming any desired 3D multilayer structure made of at least one wall and at least one base, the 3D multilayer structure defining a discrete 3D position coordinate system; and
a plurality of modular optical units, each comprising at least: at least one mount for mounting thereto an optical element, and at least one connector having at least one mounting surface, each mounting surface of each modular optical unit comprising complementary geometry to said fixation locations, for releasably connecting to any one of the at least one wall and at least one base, wherein a releasable connection of a plurality of said modular optical units to a 3D multilayer structure at said fixation locations, creates a 3D optical path for at least one optical beam directed through and by at least some of the optical elements of the connected modular optical units, by forming multiple optical axes crossing different geometrical planes.

2. The 3D optical setup of claim 1, wherein each base and each wall are connectable to one another in at least one manner selected from fixedly and reversibly.

3. The 3D optical setup of claim 1, wherein said base and said wall are releasably connected.

4. The 3D optical setup of claim 1, wherein said angle is at least one of 90 degrees and 45 degrees.

5. The 3D optical setup of claim 1, wherein at least one face at least one unit of said plurality of modular optical units is directed at 45 degrees to at least one said mounting surface of said at least one unit and wherein said at least one unit includes at least one other mounting surface and wherein said at least one face is perpendicular to said at least one other mounting surface and wherein said mount of said at least one unit is on said at least one face.

6. The 3D optical setup of claim 1, further comprising at least one ceiling, connected at a second angle to said at least one wall.

7. The 313 optical set-up of claim 1 wherein said attachment centers said mount with respect to at least one of said fixation location.

8. The 3D optical setup of claim 1, wherein said base is configured for connection to an optical table with a regular pattern of said plurality of fixation locations of the base coinciding with respective attachment locations of the optical table.

9. The 3D optical set-up of claim 1, wherein said mount is configured to hold n 1" optical elements and a distance between fixation locations that is an integral multiple $1"*n/(n-1)/4$ where $n>1$, of at least one of 0.375" and 0.333".

10. The 3D optical set-up of claim 1, wherein said mount is configured to hold at least one of 0.5" optical elements and 1.5" and 2" and 2.5" and 3" optical elements and a distance between fixation locations that is an integral multiple of 0.125".

11. The 3D optical set-up of claim 1, wherein said mount is configured to hold at least one of n 25 mm optical elements, 12.5 mm, 37.5 mm, 50 mm and 75 mm optical elements and the distance between fixation locations that are an integral multiple of $25 mm* n/(n-1)/4$ of at least one of 9.375 mm and 8.333 mm.

12. The 3D optical set-up of claim 1, further including an optical element attached to said mount with an optical axis of send optical element corresponding to said optical axis of said mount.

13. The 3D optical setup of claim 1, wherein a synchronization light between a first path and a second path is preserved when said first path and said second path traverse an equal number of said fixation locations.

14. The 3D optical setup of claim 1, further comprising at least one mobile platform connectable to at least one of the multiple modular optical units for enabling adjusting optical path length of an optical beam by moving the at least one modular optical unit.

15. A method of preserving synchronization of a first light source pulse and a second laser pulse, the method comprising:

providing at least one base and at least one wall, each of said at least one base and at least one wall having a plurality of fixation locations repeatedly arranged, wherein each base is connectable to each wall at a zero and/or at a non-zero angle providing a plurality of modular optical units, each comprising at least: at least one mount for an optical element, and at least one connector having at least one mounting surface, each mounting surface of each modular optical unit comprising complementary geometry to said fixation locations, for releasably connecting to any one of the at least one wall and at least one base, forming a desired 3D multilayer structure made of connected walls and bases defining a discrete 3D position coordinate system; and selecting suitable modular optical units and optical element to be mounted thereto and connecting the selected modular optical units to the 3D multilayer structure, such that the first light source pulse is directed through a first optical path and the second light source pulse is directed through a second optical path wherein the first optical path and the second optical path have an equal number of grid spaces, wherein a releasable connection of a plurality of said modular optical units to the formed 3D multilayer structure at said fixation locations, creates a 3D first and/or second optical path, by forming multiple optical axes crossing different geometrical planes.

16. The method of claim 15, further comprising:
centering on a respective fixation location an optical element of each of said plurality of optical units.

17. A method for forming a 3D optical setup, the method comprising at least:

providing at least one base and at least one wall, each of said at least one base and at least one wall having a plurality of fixation locations repeatedly arranged, wherein each base is connectable to each wall at a zero and/or at a non-zero angle providing a plurality of modular optical units, each comprising at least: at least one mount for an optical element, and at least one connector having at least one mounting surface, each mounting surface of each modular optical unit comprising complementary geometry to said fixation locations, for releasably connecting to any one of the at least one wall and at least one base, forming a desired 3D multilayer structure made of connected walls and bases defining a discrete 3D position coordinate system; and selecting suitable modular optical units and optical element to be mounted thereto and connecting the selected modular optical units to the 3D multilayer structure to form at least one desired 3D optical path, by forming multiple optical axes crossing different geometrical planes, for at least one optical beam to be passed through and/or directed by the optical elements of the selected and connected modular optical units.

* * * * *